(12) United States Patent
Layne et al.

(10) Patent No.: US 11,639,271 B2
(45) Date of Patent: May 2, 2023

(54) MOUNT FOR ADJUSTABLE CONVEYOR BELT GUIDERAIL AND RELATED METHODS

(71) Applicant: SPAN TECH LLC, Glasgow, KY (US)

(72) Inventors: James L. Layne, Bowling Green, KY (US); Stephen C. Fye, Glasgow, KY (US); Aaron Cotton, Glasgow, KY (US); Nathan Lasley, Bowling Green, KY (US)

(73) Assignee: SPAN TECH LLC, Glasgow, KY (US)

( * ) Notice: Subject to any disclaimer, the term of this patent is extended or adjusted under 35 U.S.C. 154(b) by 0 days.

(21) Appl. No.: 17/462,357

(22) Filed: Aug. 31, 2021

(65) Prior Publication Data

US 2022/0063922 A1 Mar. 3, 2022

Related U.S. Application Data

(60) Provisional application No. 63/072,300, filed on Aug. 31, 2020.

(51) Int. Cl.
| | |
|---|---|
| *B65G 21/10* | (2006.01) |
| *B65G 21/22* | (2006.01) |
| *B65G 39/18* | (2006.01) |
| *B65G 47/28* | (2006.01) |
| *B65G 21/20* | (2006.01) |

(52) U.S. Cl.
CPC ............ *B65G 21/22* (2013.01); *B65G 21/10* (2013.01); *B65G 21/2072* (2013.01); *B65G 39/18* (2013.01); *B65G 47/28* (2013.01); *B65G 2201/02* (2013.01); *B65G 2812/02069* (2013.01)

(58) Field of Classification Search
CPC ........ B65G 21/18; B65G 21/22; B65G 39/18; B65G 47/28
USPC .................................. 198/836, 836.1, 836.3
See application file for complete search history.

(56) References Cited

U.S. PATENT DOCUMENTS

| | | | | |
|---|---|---|---|---|
| 1,898,662 | A * | 2/1933 | Dawson | B65G 21/2072 198/836.3 |
| 2,156,020 | A * | 4/1939 | Lathrop | B65G 21/2072 198/836.3 |
| 2,229,605 | A * | 1/1941 | Snyder | B65G 21/2072 198/836.3 |
| 4,470,499 | A * | 9/1984 | Sijbrandij | B65G 21/06 403/312 |

(Continued)

FOREIGN PATENT DOCUMENTS

| | | |
|---|---|---|
| EP | 1840051 A1 | 10/2007 |
| JP | S5922218 U | 2/1984 |

*Primary Examiner* — Douglas A Hess
(74) *Attorney, Agent, or Firm* — Dickinson Wright PLLC; Andrew D. Dorisio

(57) ABSTRACT

An apparatus for supporting a guiderail for guiding one or more articles conveyed along a conveyor having a conveying path in a conveying direction. The apparatus includes a mount for mounting to the conveyor. The mount includes a support rail for supporting the guide rail, which support rail may have a length in the conveying direction less than a length of the conveyor. The support rail may include one or more stops for engaging one of a pair of movable supports. The supports may be slidably mounted to the support rail for adjusting a position of the guiderail relative to the conveyor in a direction transverse to the conveying direction. Related methods are also disclosed.

15 Claims, 46 Drawing Sheets

(56) References Cited

U.S. PATENT DOCUMENTS

| | | | | |
|---|---|---|---|---|
| 5,291,988 A * | 3/1994 | Leonard | ............. | B65G 21/2072 |
| | | | | 198/836.3 |
| 5,692,596 A * | 12/1997 | Ledingham | ........ | B65G 21/2072 |
| | | | | 403/396 |
| 5,967,295 A * | 10/1999 | Ledingham | ........ | B65G 21/2072 |
| | | | | 198/836.3 |
| 6,305,528 B1 * | 10/2001 | Leonard | ............. | B65G 21/2072 |
| | | | | 198/836.3 |
| 6,378,695 B1 * | 4/2002 | Rinne | ................ | B65G 21/2072 |
| | | | | 198/836.3 |
| 6,578,702 B2 * | 6/2003 | Falkowski | ......... | B65G 21/2072 |
| | | | | 198/836.3 |
| 7,530,453 B2 * | 5/2009 | Ingraham | ........... | B65G 21/2072 |
| | | | | 198/817 |
| 8,025,141 B1 * | 9/2011 | Bouldin | ................... | B26D 1/11 |
| | | | | 198/836.3 |
| 8,490,780 B2 * | 7/2013 | Bell | ................... | B65G 21/2072 |
| | | | | 198/836.3 |
| 8,695,787 B2 * | 4/2014 | Bell | ................... | B65G 21/2063 |
| | | | | 198/836.3 |
| 8,770,392 B2 * | 7/2014 | Berger | ................... | B65G 21/16 |
| | | | | 198/813 |
| 8,776,997 B2 * | 7/2014 | Spence | ................. | B65G 21/20 |
| | | | | 198/836.3 |
| 9,670,001 B2 * | 6/2017 | Doherty | ............. | B65G 21/2072 |
| 9,725,246 B2 * | 8/2017 | Pawelski | ............ | B65G 21/2072 |
| 9,828,186 B2 * | 11/2017 | Weickert | ............ | B65G 21/2072 |
| 10,753,785 B2 * | 8/2020 | Merz | ..................... | B65G 47/28 |
| 10,836,583 B2 * | 11/2020 | Layne | .................... | B65G 47/28 |
| 10,988,317 B2 * | 4/2021 | Schuesslburner | .. | B65G 21/2072 |
| 11,034,521 B2 * | 6/2021 | Ax | ..................... | B65G 21/2072 |
| 11,097,901 B2 * | 8/2021 | Layne | ............... | B65G 21/2072 |

\* cited by examiner

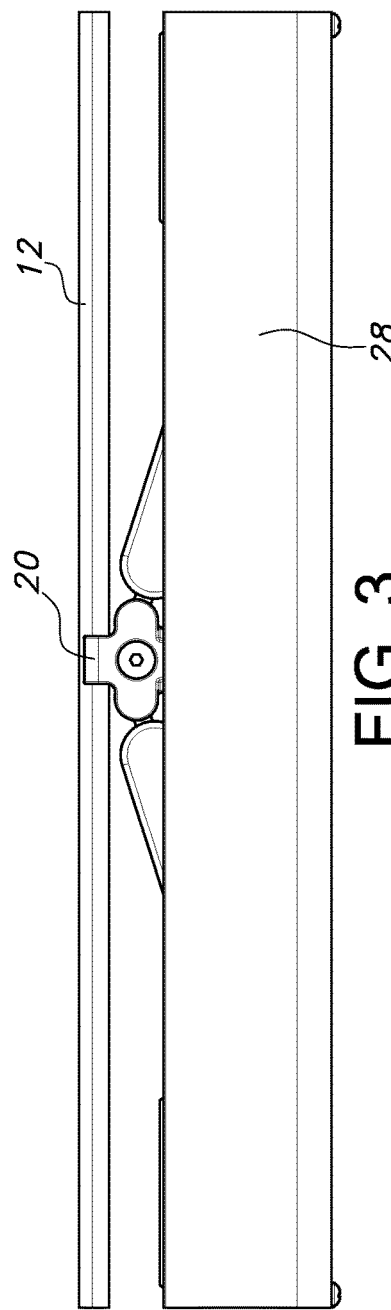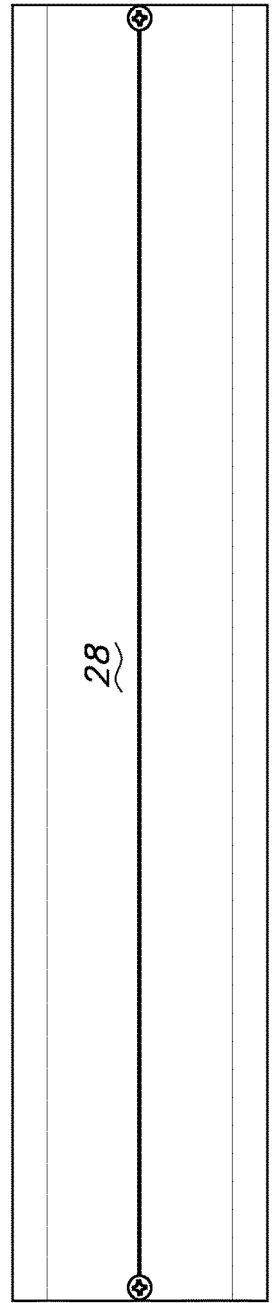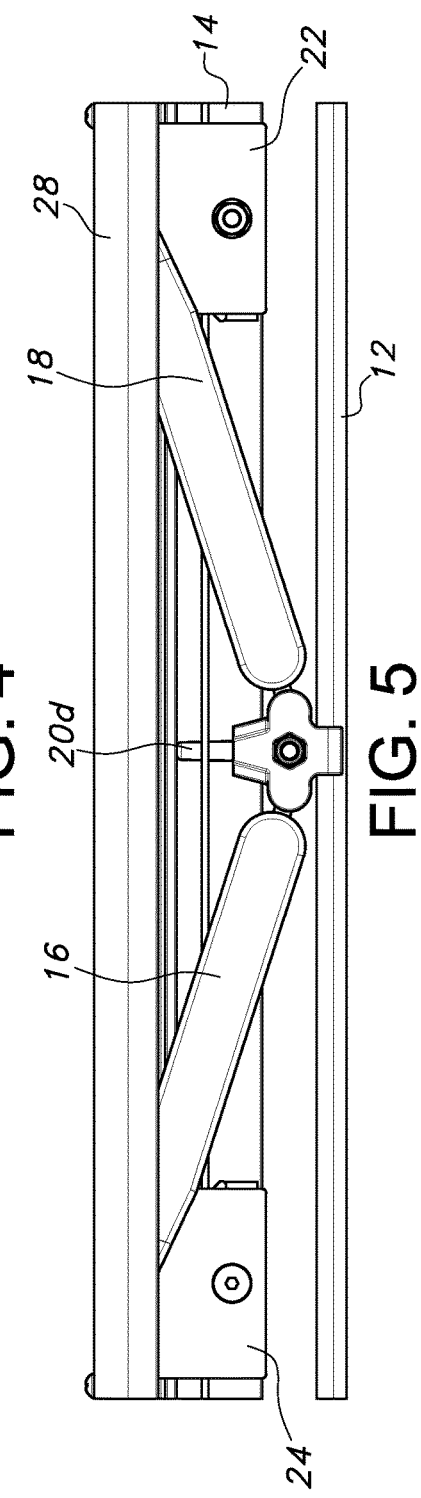

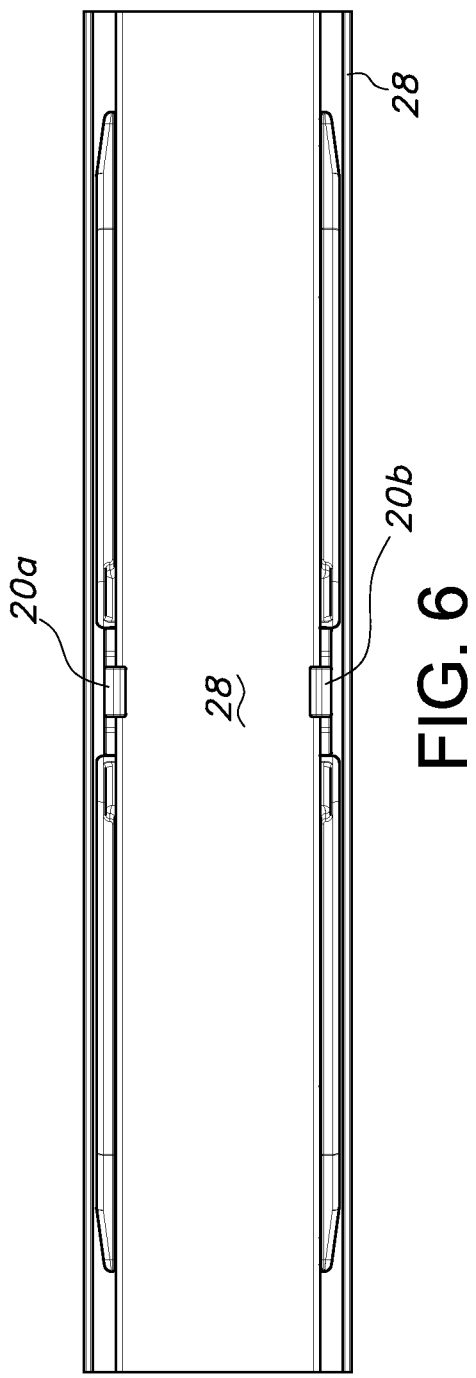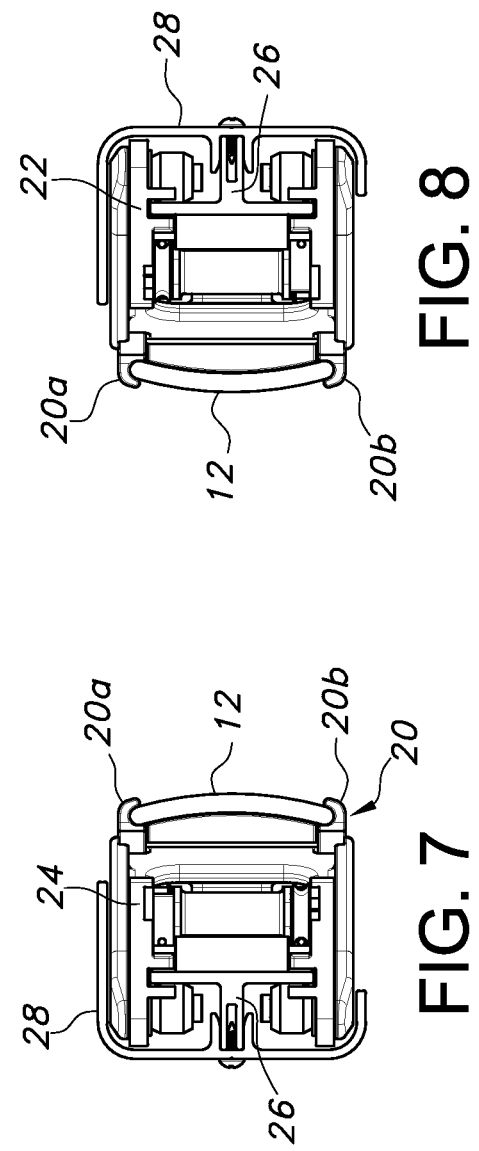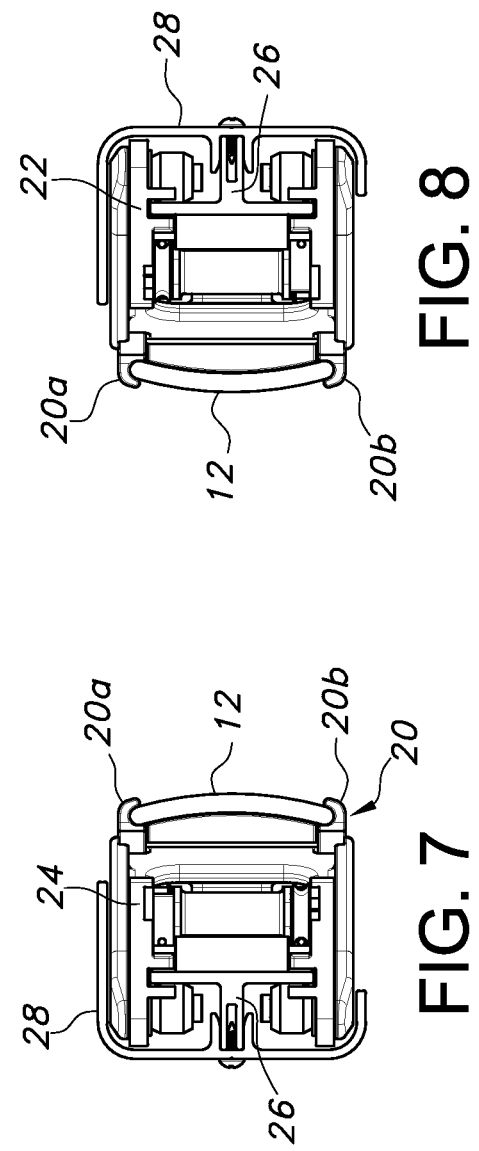

MOUNT FOR ADJUSTABLE CONVEYOR BELT GUIDERAIL AND RELATED METHODS

This application claims the benefit of U.S. Provisional Patent App. Ser. No. 63/072,300, filed Aug. 31, 2020. This application is related to International Application No. PCT/US20/037707, U.S. Provisional Patent Application Ser. No. 62/861,633, filed Jun. 14, 2019, and is also related to U.S. Provisional Patent Application Ser. No. 62/508,700, filed May 19, 2017, U.S. Provisional Patent Application Ser. No. 62/550,023, filed Aug. 25, 2017, International Application Ser. No. PCT/US18/33665, filed May 21, 2018, and U.S. patent application Ser. No. 16/281,889, filed Nov. 13, 2019. The disclosures of all of the foregoing applications are fully incorporated herein by reference.

TECHNICAL FIELD

This disclosure relates to the article conveying arts and, in particular, to a mount for an adjustable conveyor belt guiderail and related methods.

BACKGROUND

Conveyors typically have rails positioned along each side of the conveyor chain or belt to guide an article along a conveying path. Articles travel between the rails, which are positioned to ensure that the articles remain on the conveying path. When a larger or smaller article is conveyed, or the width of the conveying path otherwise needs to be adjusted to accommodate an increased or reduced article flow, the guiderails must be adjusted to fit the situation.

Conventional guiderail adjustment systems use extending guide rods, which support a bracket attached to the guiderail. These guide rods also protrude outwardly away from the conveyor and into the surrounding area, thus increasing the overall width and footprint of the conveyor. The guiderails including rigid rods also create an unappealing look, since the extended portions of the rods project from the conveyor sides. Some also require motorized adjustments, which can add to the cost and complexity.

Accordingly, a need is identified for an arrangement that overcomes the foregoing limitations and possibly other problems that have yet to be realized.

SUMMARY

According to a first aspect of the disclosure, an apparatus for supporting a guiderail for guiding one or more articles conveyed in a conveying direction along an entire conveying path of a conveyor is provided. The apparatus comprises a mount for mounting to the conveyor. The mount includes an upper portion forming a support rail having and a lower portion adapted for connecting to the conveyor. A pair of movable supports are mounted to the support rail for supporting and adjusting a position of the guiderail relative to the conveyor in a direction transverse to the conveying direction.

In one embodiment, the upper portion has a length in the conveying direction less than a length of the conveyor. The upper portion may be generally horizontal and the lower portion may be generally vertical. When the conveyor is curved, the upper portion may be bent to correspond to the curvature of the conveyor. In such case, the upper portion may include a first angled portion for receiving a first movable support of the pair of movable supports and a second angled portion for receiving a second movable support of the second movable support.

In this or other embodiments, the upper portion of the mount comprises a stop at each end. The length of the mount in the conveying direction may correspond to a maximum extension distance of the guiderail in the direction transverse to the conveying direction. The upper portion and lower portion may be arranged in different vertical planes, such that in one example, the upper portion is closer to the conveying path than the lower portion.

According to another aspect of the disclosure, an apparatus for supporting a guiderail for guiding one or more articles conveyed along a conveyor having a conveying path in a conveying direction is provided. The apparatus comprises a plurality of mounts for mounting to the conveyor, each mount including a support rail. A pair of movable supports is mounted to each support rail of the plurality of mounts for supporting and adjusting a position of the guiderail relative to the conveyor in a direction transverse to the conveying direction.

In one embodiment, each mount comprises an upper portion forming the support rail and a vertical portion adapted for connecting to the conveyor. The upper portion of the mount may comprise a stop at each end. A length of the mount in the conveying direction may correspond to a maximum extension distance of the guiderail in the direction transverse to the conveying direction.

Still a further aspect of the disclosure pertains to an apparatus for supporting a guiderail for guiding one or more articles conveyed in a conveying direction along an entire conveying path of a conveyor. The apparatus comprises a mount including a support rail having an upper portion with opposed end portions and a lower portion depending from the upper portion and adapted for mounting to the conveyor. A pair of movable supports is mounted to the upper portion of the support rail for supporting and adjusting the guiderail relative to the conveyor in a direction transverse to the conveying direction.

The pair of movable supports includes a maximum spacing at or near the opposed end portions of the upper portion corresponding to a position of the guide rail closest to the support rail and a minimum spacing at or near the lower portion of the support rail. At least one of the opposed end portions of the upper portion includes a stop for preventing further movement of at least one of the pair of movable supports.

A further aspect of the disclosure relates to an apparatus for mounting to a conveyor including a conveying surface for conveying articles. The apparatus comprises a guiderail for guiding articles along the conveying surface of the conveyor. A plurality of pairs of adjustable supports are provided for adjusting the guiderail position. A support rail for supporting each pair of adjustable supports, the support rail including a depending portion for connecting to the conveyor.

In one embodiment, the depending portion includes one or more openings for receiving one or more fasteners for fastening the support rail to the conveyor. Each support rail may comprise a stop for engaging at least one of the adjusters supported thereon.

Yet another aspect of the disclosure pertains to an apparatus for supporting a guiderail for guiding one or more articles conveyed along a conveyor having a conveying path in a conveying direction. The apparatus comprises a mount for mounting to the conveyor, the mount including a support rail having a first end portion including a first stop. A pair of movable supports is mounted to the support rail for supporting and adjusting a position of the guiderail relative to the conveyor in a direction transverse to the conveying direction.

In one embodiment, the support rail includes a second end portion including a second stop. The mount may comprise a upper portion extending in the conveying direction forming the support rail and a lower transverse portion adapted for connecting to the conveyor. The length of the mount in the conveying direction corresponds to a maximum extension distance of the guiderail in the direction transverse to the conveying direction.

A further aspect of the disclosure pertains to an apparatus for supporting a guiderail for guiding one or more articles conveyed along a conveyor having a conveying path in a conveying direction. The apparatus comprises a mount for mounting to the conveyor, the mount including a support rail having a bent portion. A pair of movable supports are mounted to the bent portion of the support rail for supporting and adjusting a position of the guiderail relative to the conveyor in a direction transverse to the conveying direction.

In one embodiment, the bent portion includes a first angled portion for receiving a first movable support of the pair of movable supports and a second angled portion for receiving a second movable support of the second movable support. The bent portion may have a length in the conveying direction less than a length of the conveyor. The bent portion may be located between an upper portion of the support rail supporting the pair of movable supports and a lower portion of the support rail adapted for connecting to the conveyor. When the conveyor is curved, the upper portion of the support rail may be bent to correspond to the curved conveyor.

Still another aspect of the disclosure relates to an apparatus for guiding one or more articles conveyed along a curved conveyor having a conveying path in a conveying direction. The apparatus comprises a mount for mounting to the conveyor, the mount including a support rail having a first portion having a bend in the conveying direction corresponding to the curved conveyor and a second portion adapted to connect to the curved conveyor. A guiderail is supported by the support rail.

In one embodiment, the mount further includes a third portion having a bend for connecting the first portion and the second portion. The apparatus may further include a pair of movable supports mounted to the first portion of the support rail for supporting and adjusting a position of the guiderail relative to the conveyor in a direction transverse to the conveying direction.

Yet a further aspect of the disclosure relates to an apparatus for supporting a guiderail for guiding one or more articles conveyed in a conveying direction along an entire conveying path of a conveyor. The apparatus comprises a mount for mounting to the conveyor, the mount including an upper portion comprising a support rail and a lower portion for attaching to the conveyor. A pair of interconnected supports are repositionable along the support rail for supporting and adjusting a position of the guiderail relative to the conveyor in a direction transverse to the conveying direction, the lower portion of the mount being located at least partially between the pair of interconnected supports.

This disclosure also relates to a method of adjusting a position of a guiderail for guiding one or more articles conveyed along a conveyor having a conveying path in a conveying direction. The method comprises mounting a support rail including a pair of movable supports for supporting the guiderail to the conveyor by a mount extending transverse to the conveying direction.

The method may further comprise the step of fixing the position of the at least one of the movable supports on the support rail. The method may also comprise manually moving a first movable support along a first support rail mounted to the conveyor, and may further include the step of manually moving a second movable support along a second support rail mounted to the conveyor, each of the movable supports supporting the guiderail.

BRIEF DESCRIPTION OF THE DRAWING FIGURES

The accompanying drawing figures incorporated herein and forming a part of the specification, illustrate several aspects of the disclosed inventions and, together with the textual description, serve to explain certain principles thereof. In the drawing figures.

Figure 1:
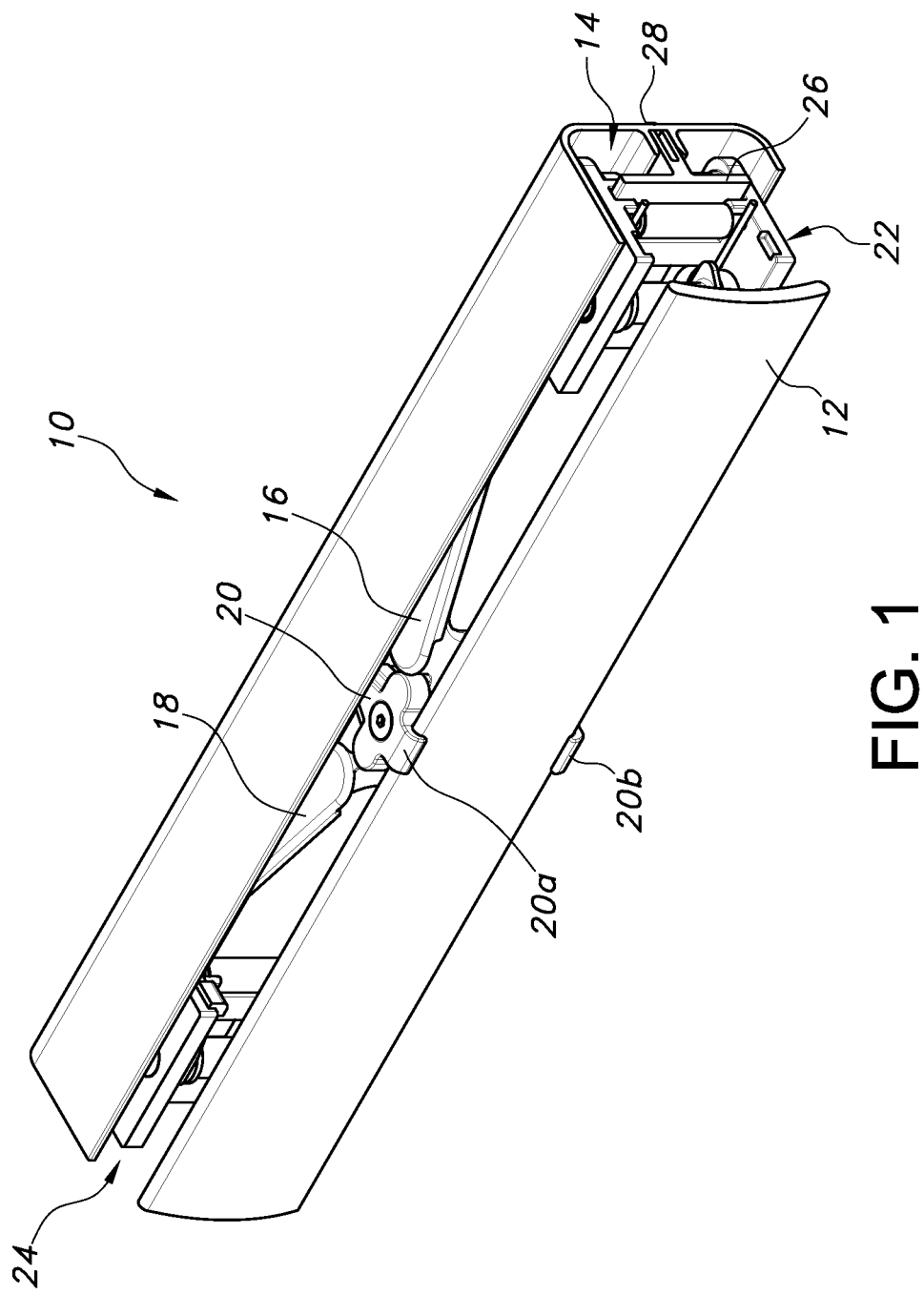
FIG. 1 is a top perspective view of one embodiment of a single conveyor guiderail adjuster according to one embodiment of the disclosure.
Figure 2:
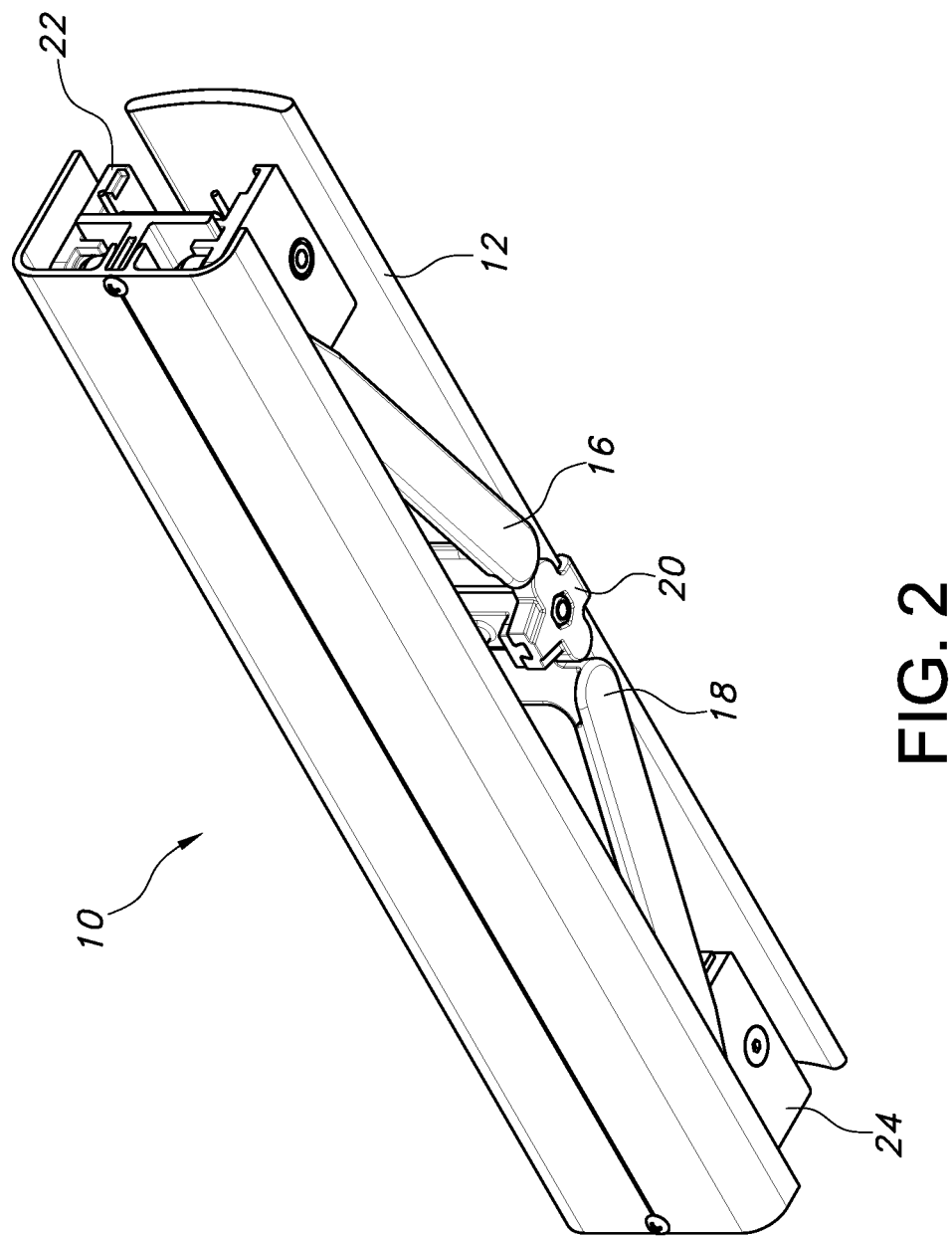
FIG. 2 is a bottom perspective view of the adjuster of FIG. 1.
Figure 9:
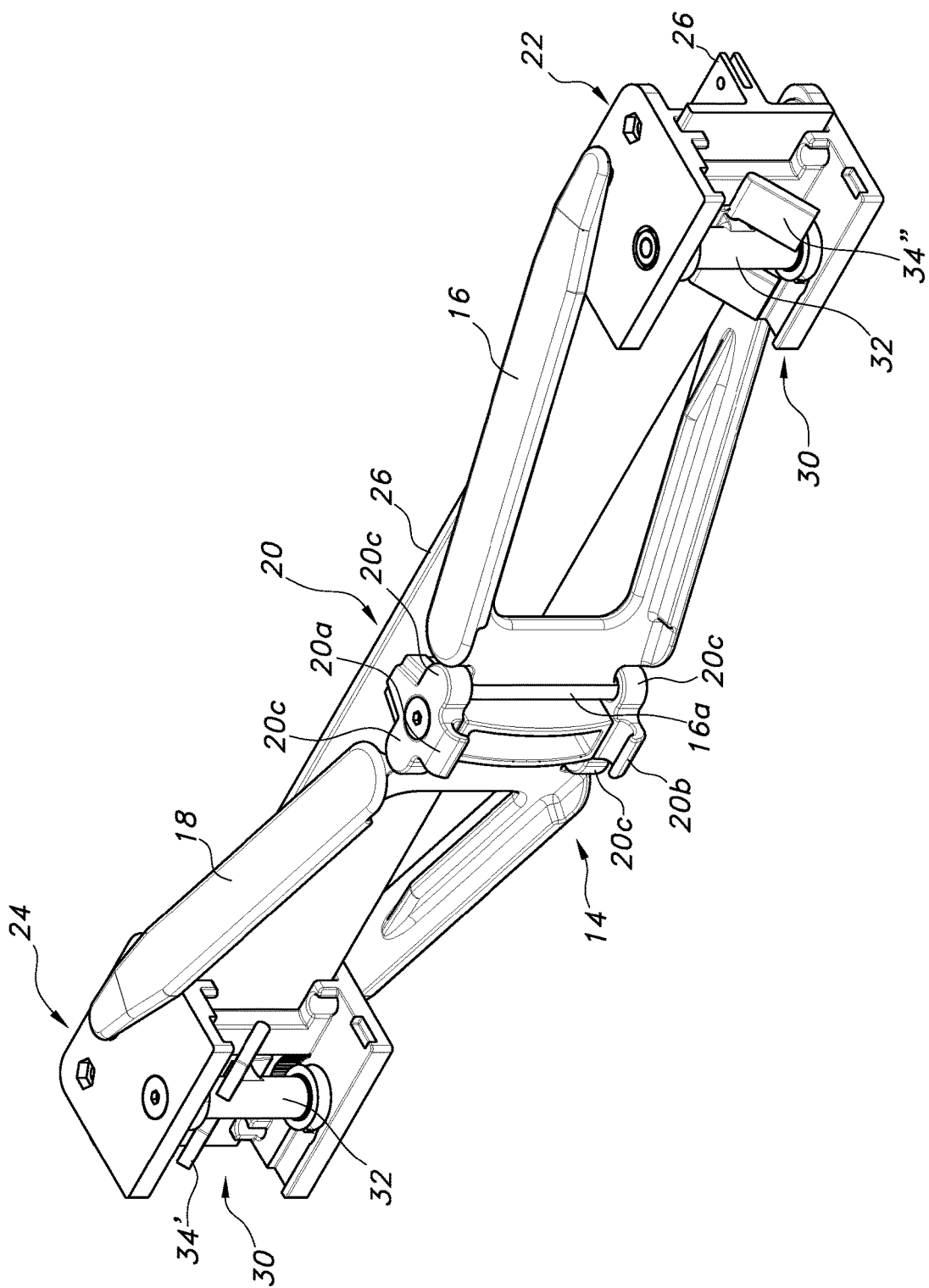
Figure 9A:
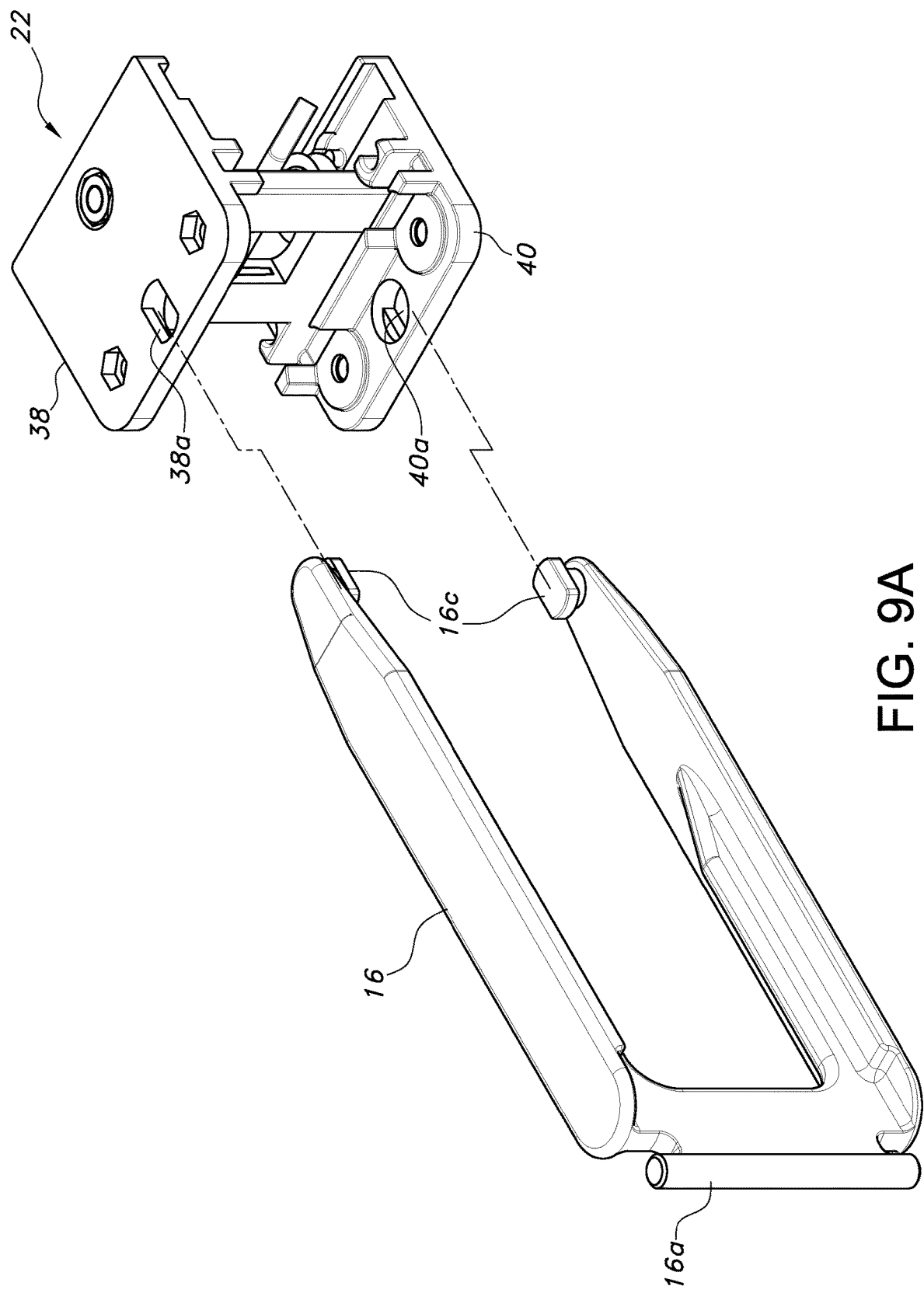
Figure 9C:
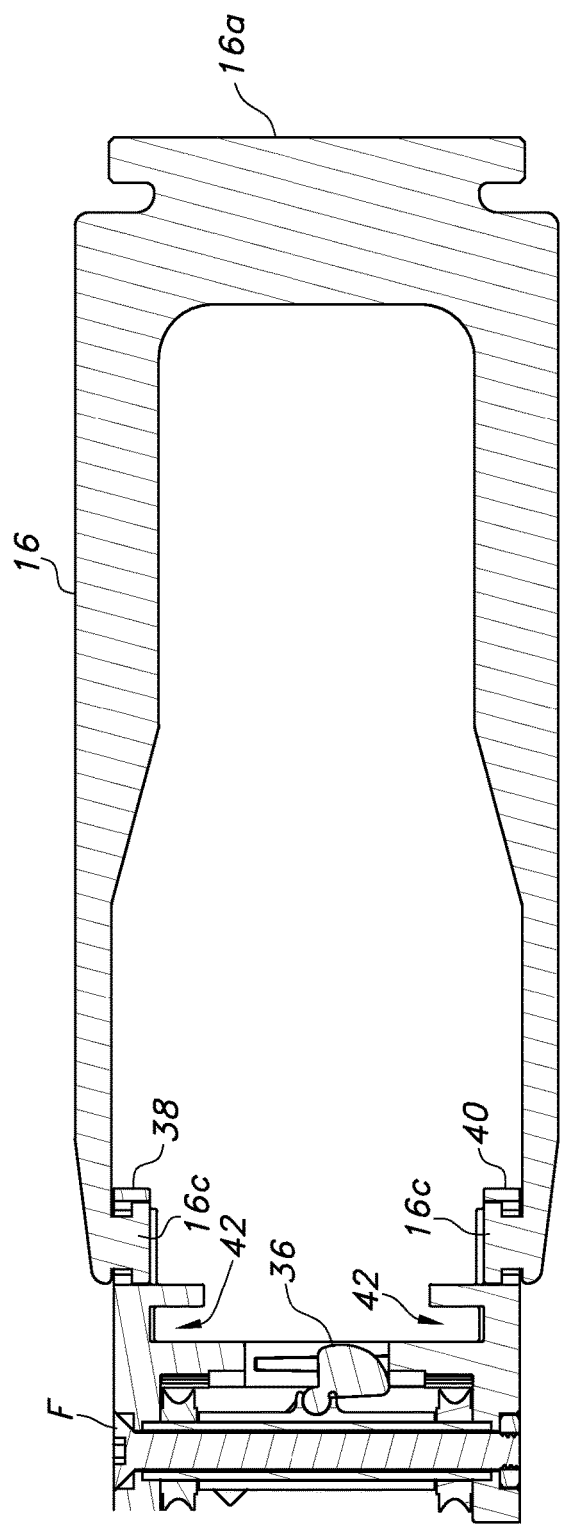
Figure 9B:
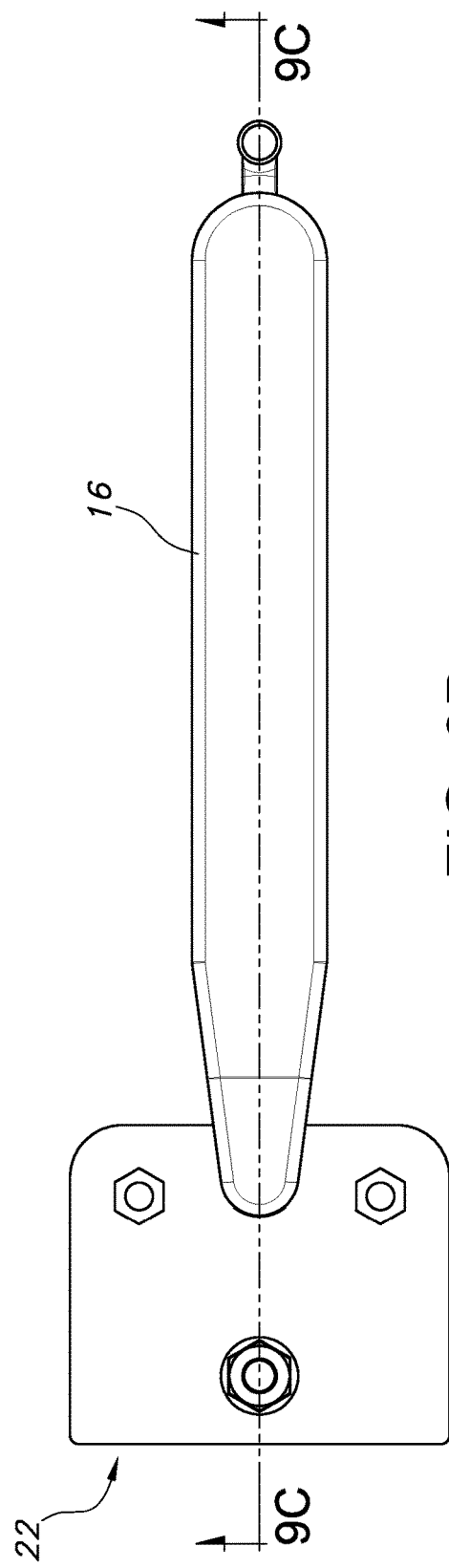
Figure 10:
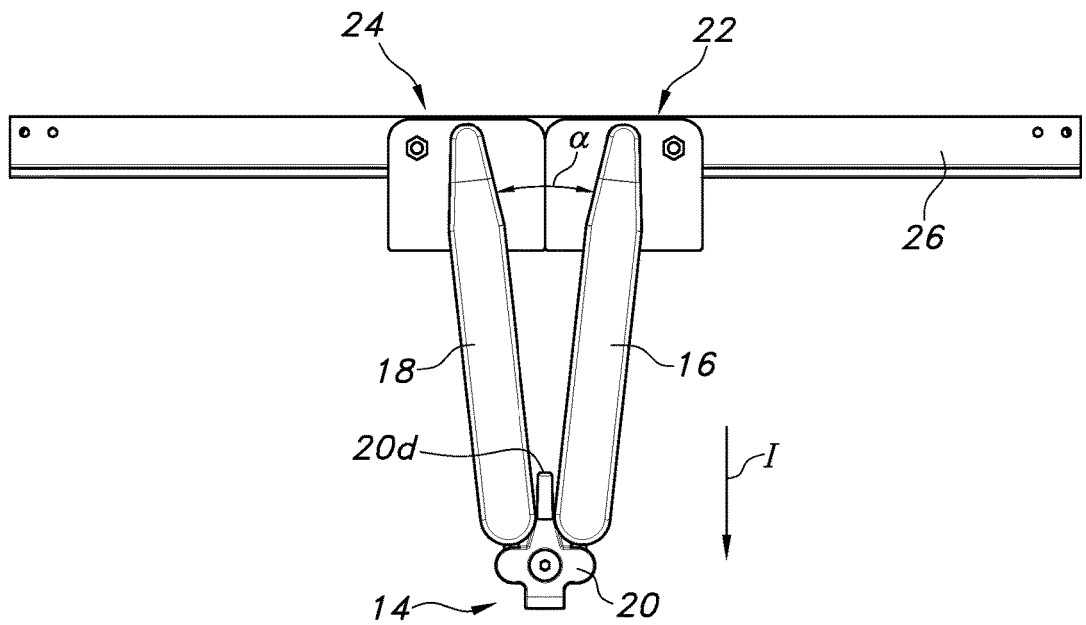
Figure 11:
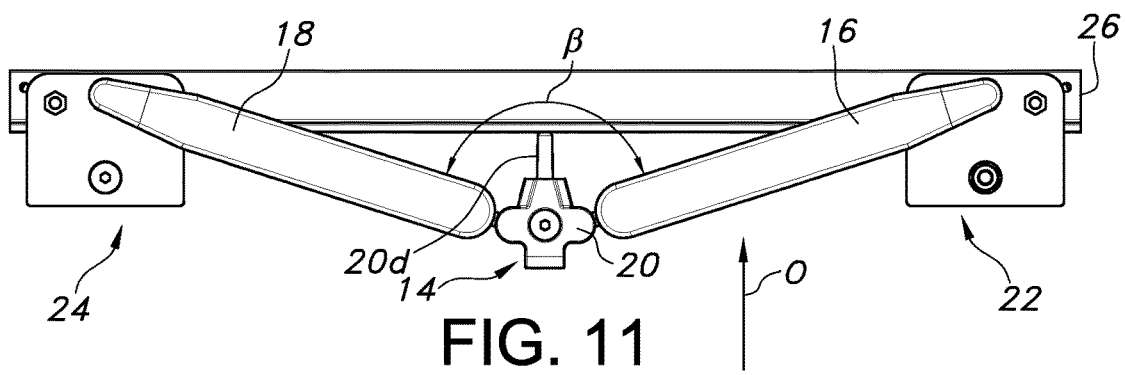
Figure 12:
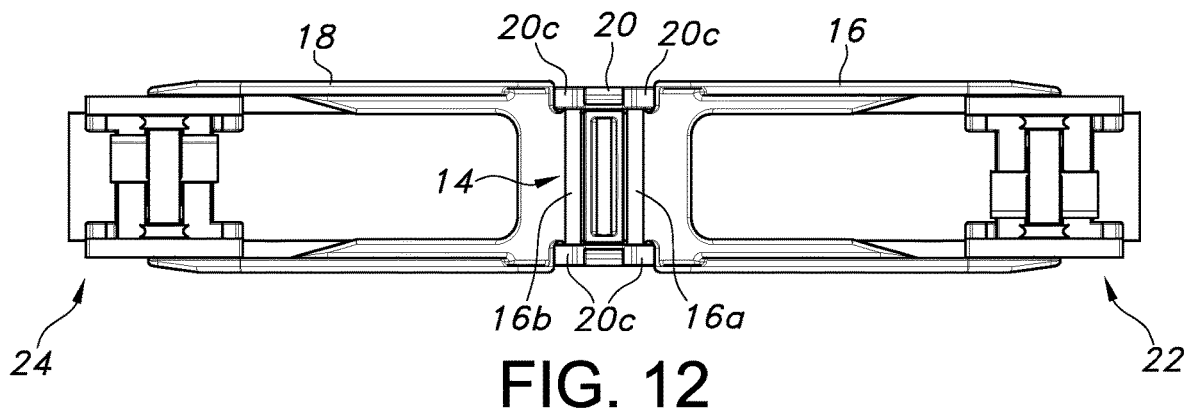
Figure 14:
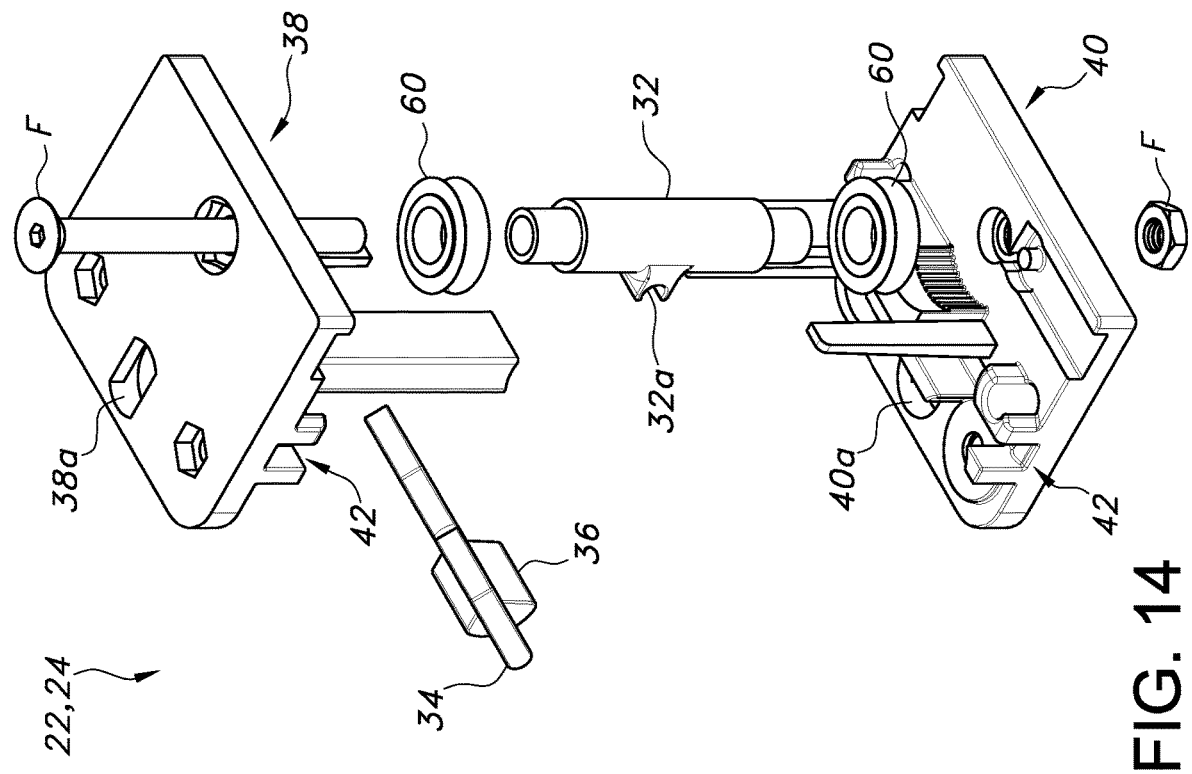
Figure 13:
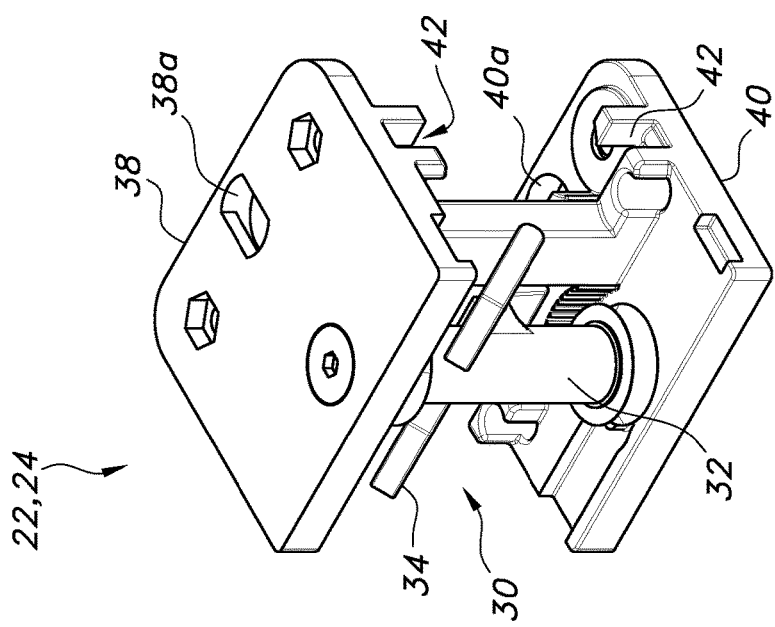
Figure 16:
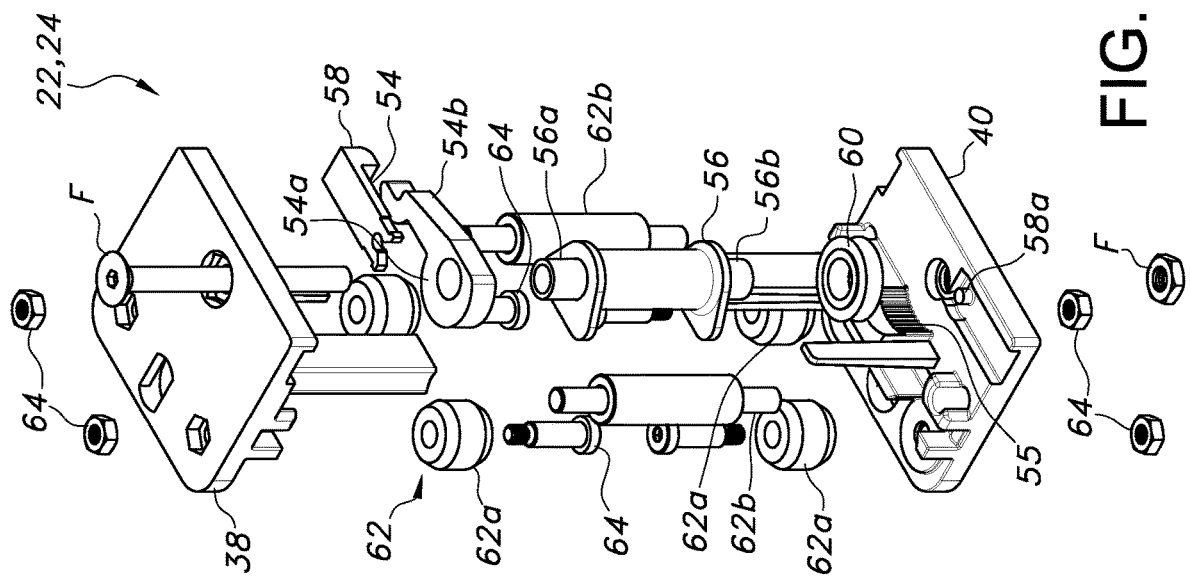
Figure 15:
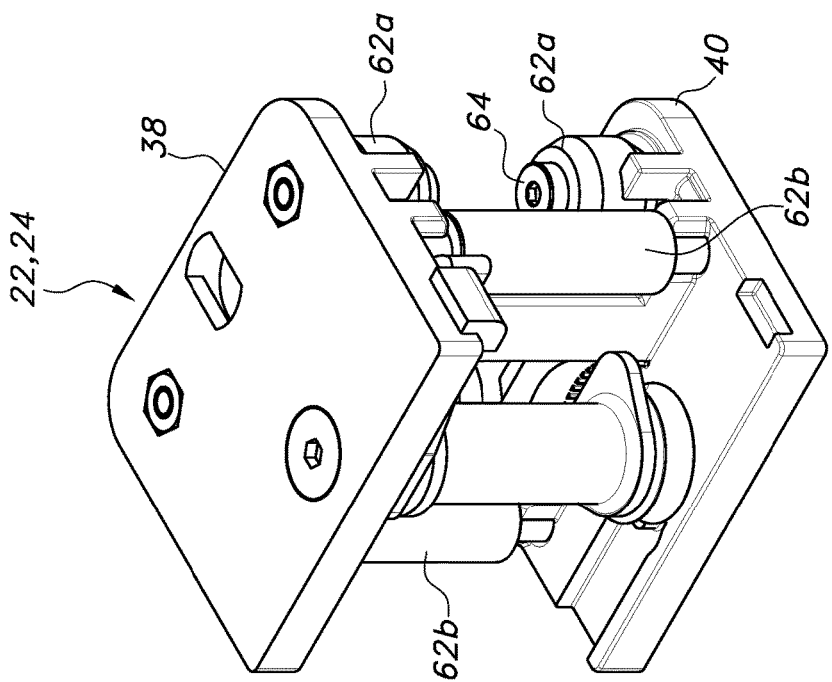
Figure 16A:
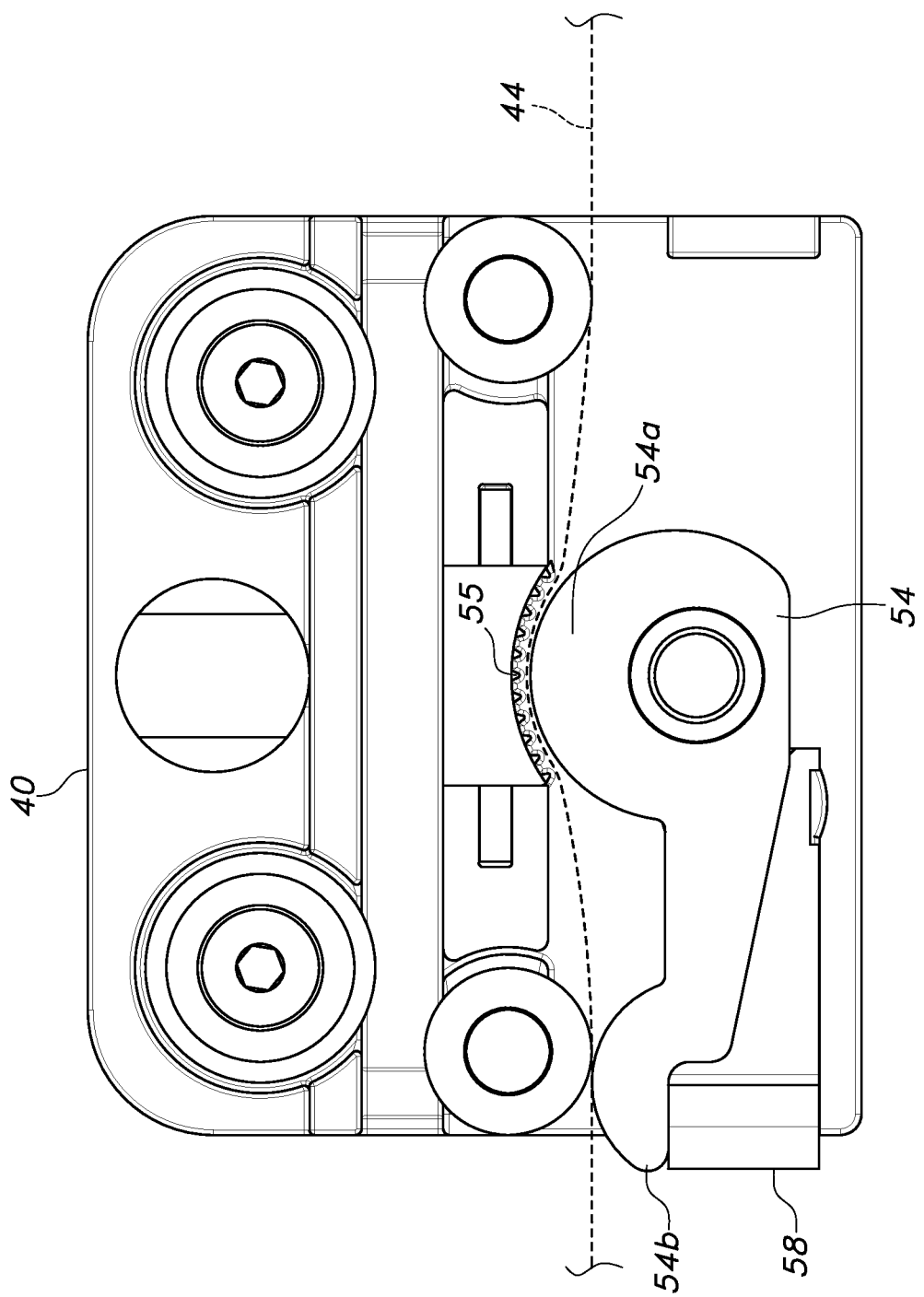
Figure 17:
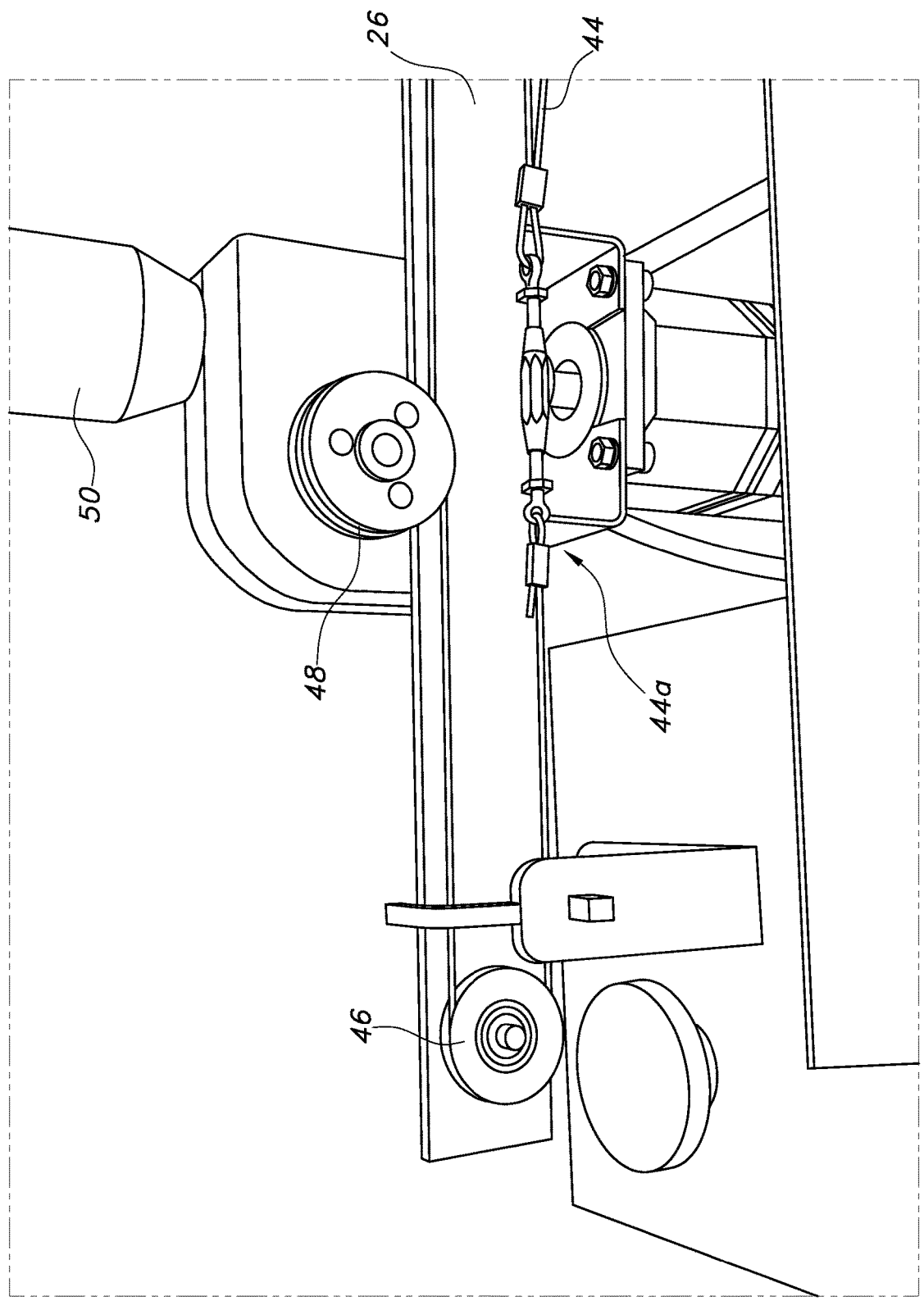
Figure 18:
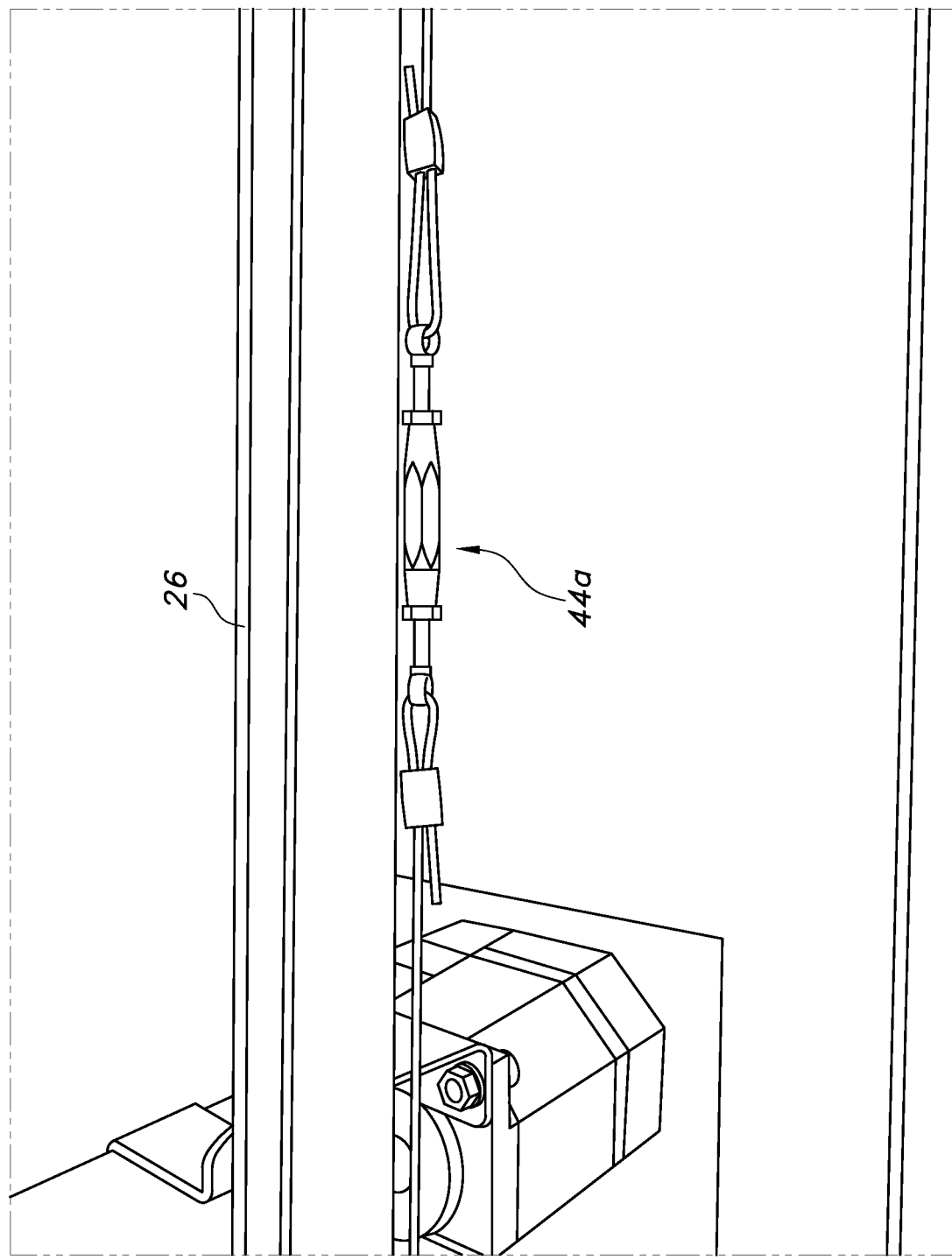
Figure 24:
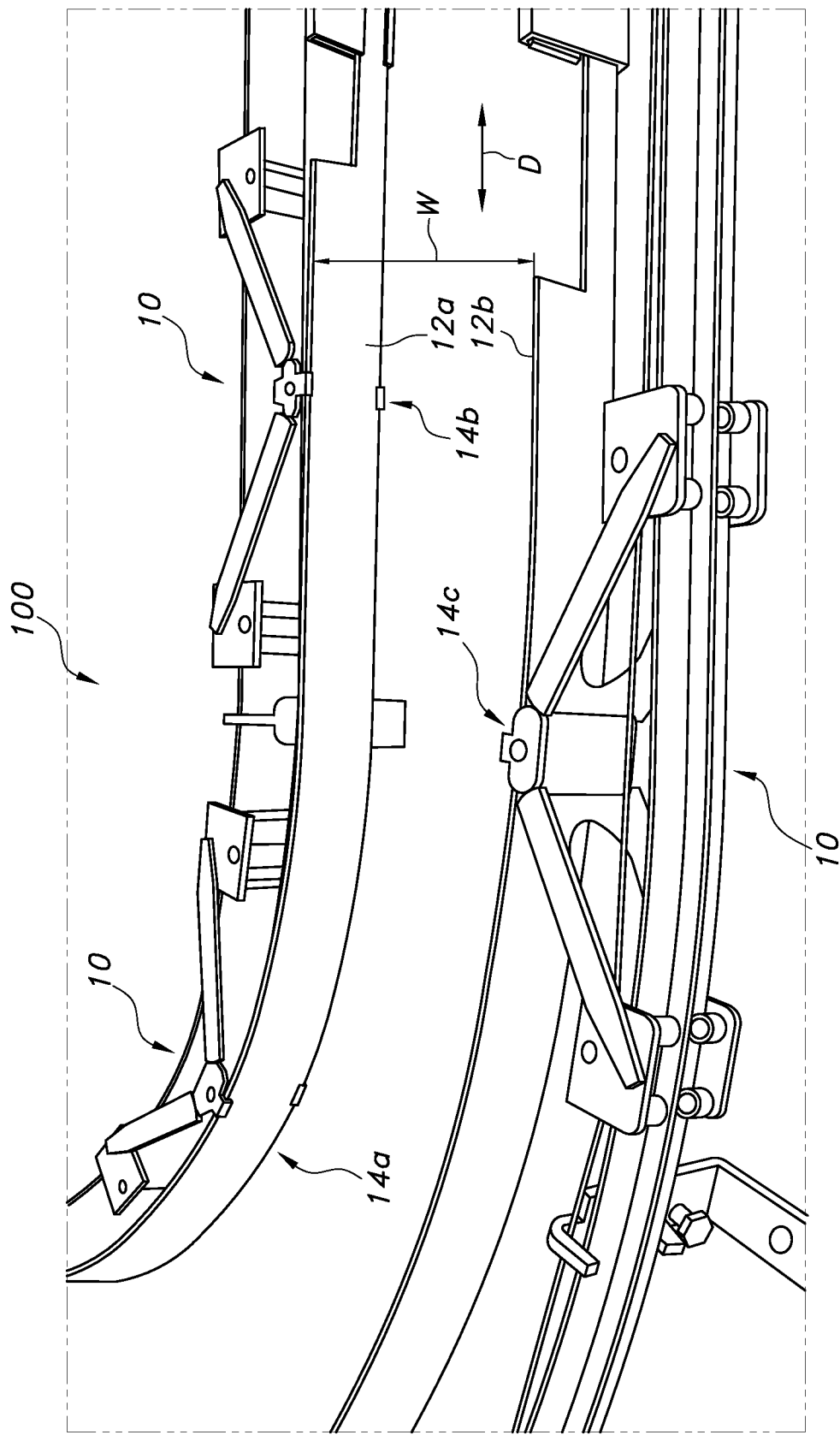
Figure 25:
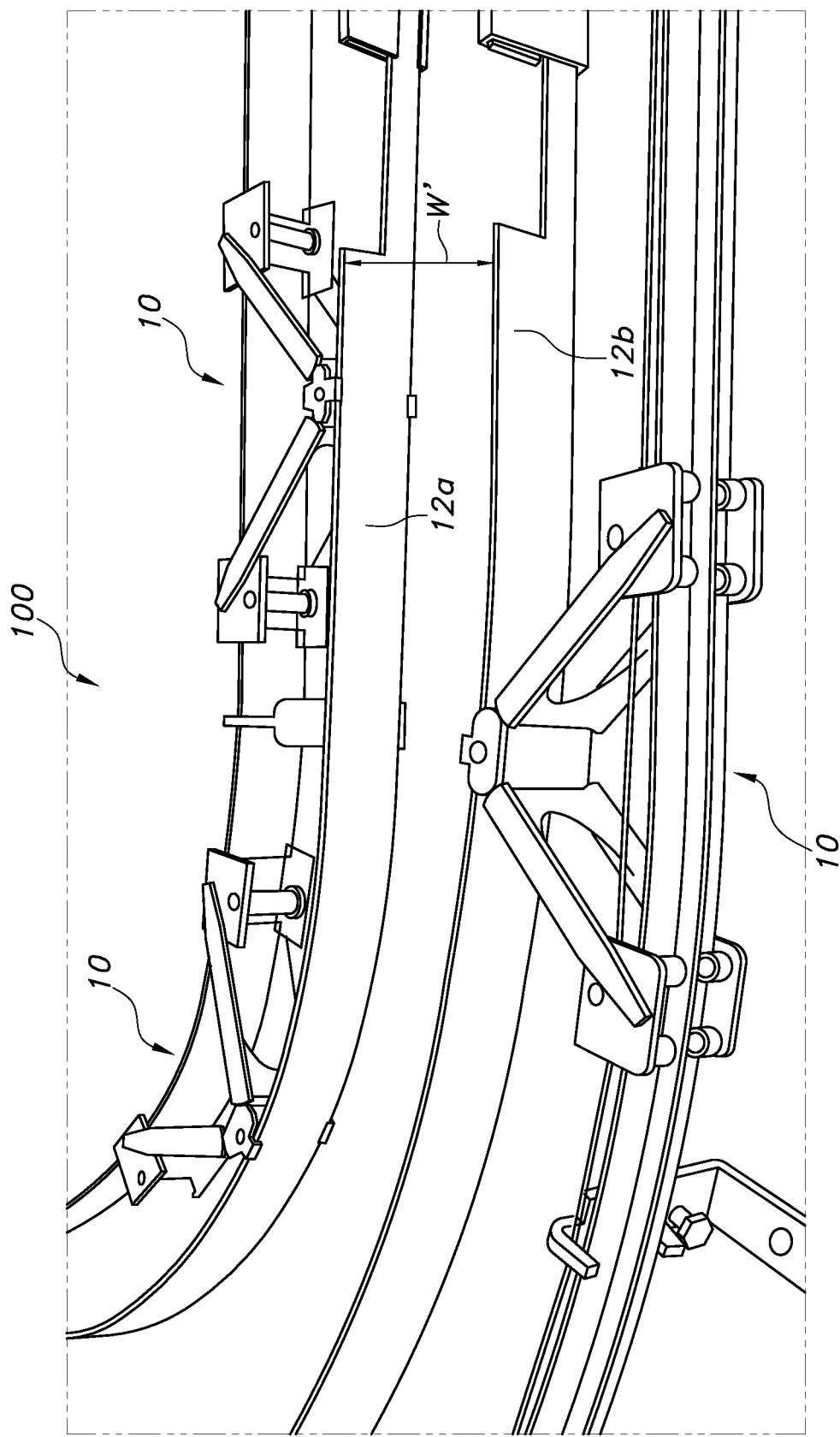
Figure 26:
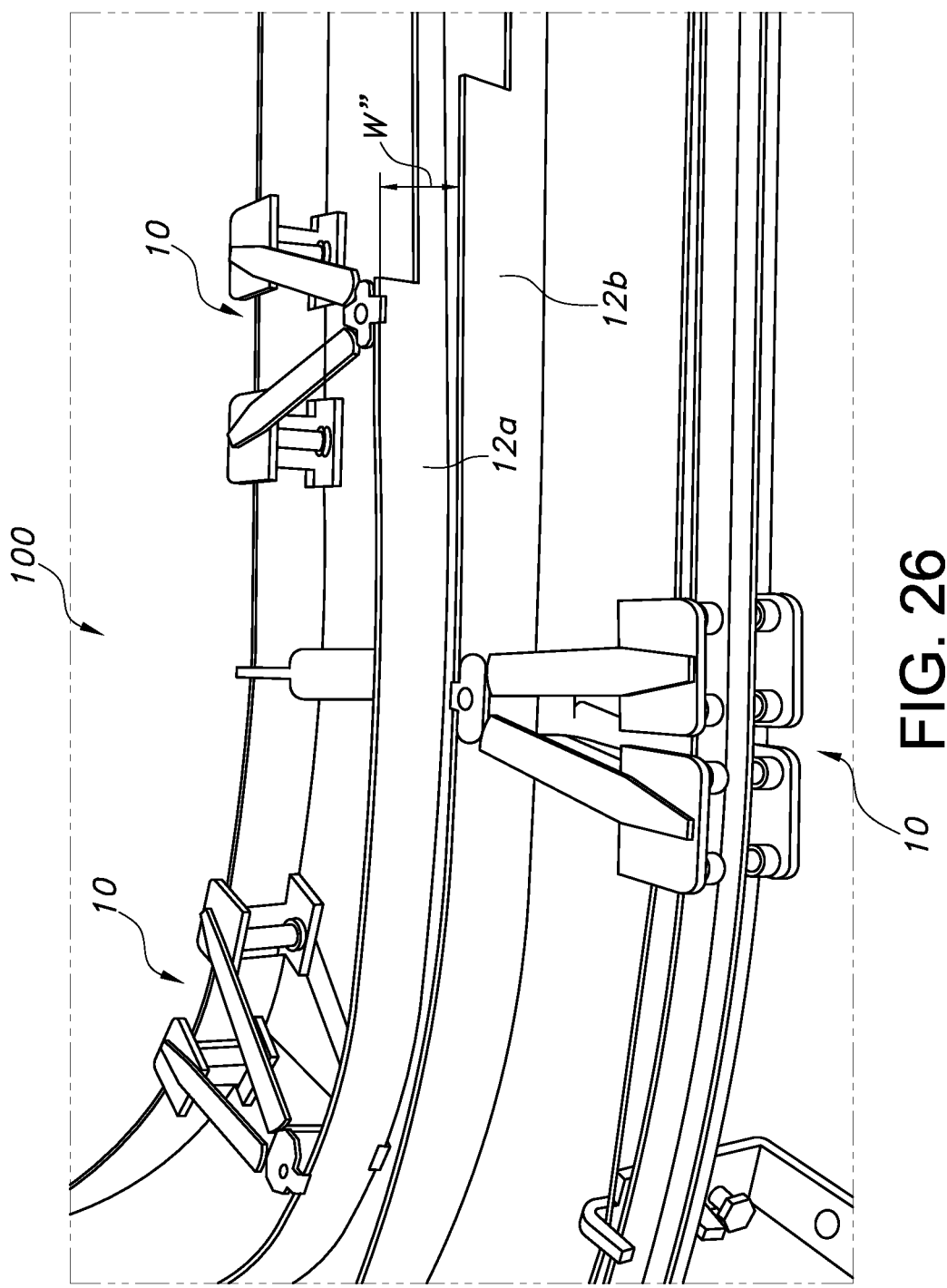
Figure 27:
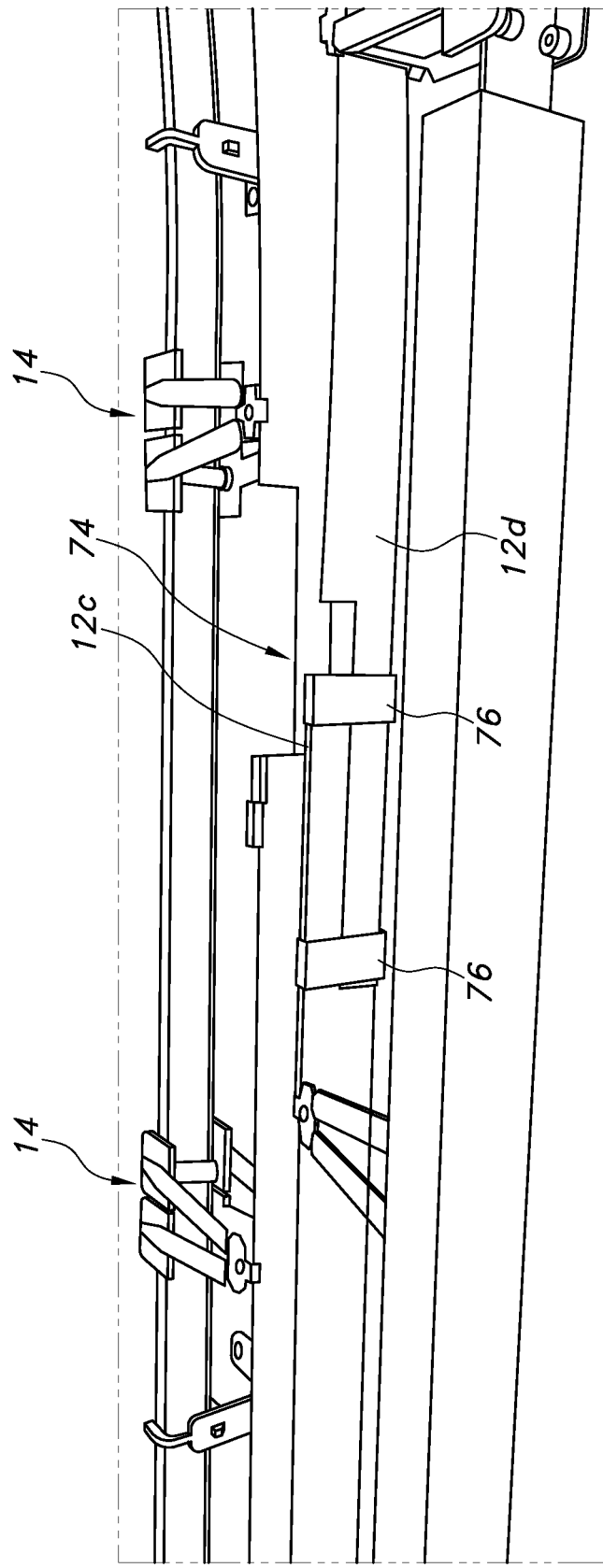
Figure 28:
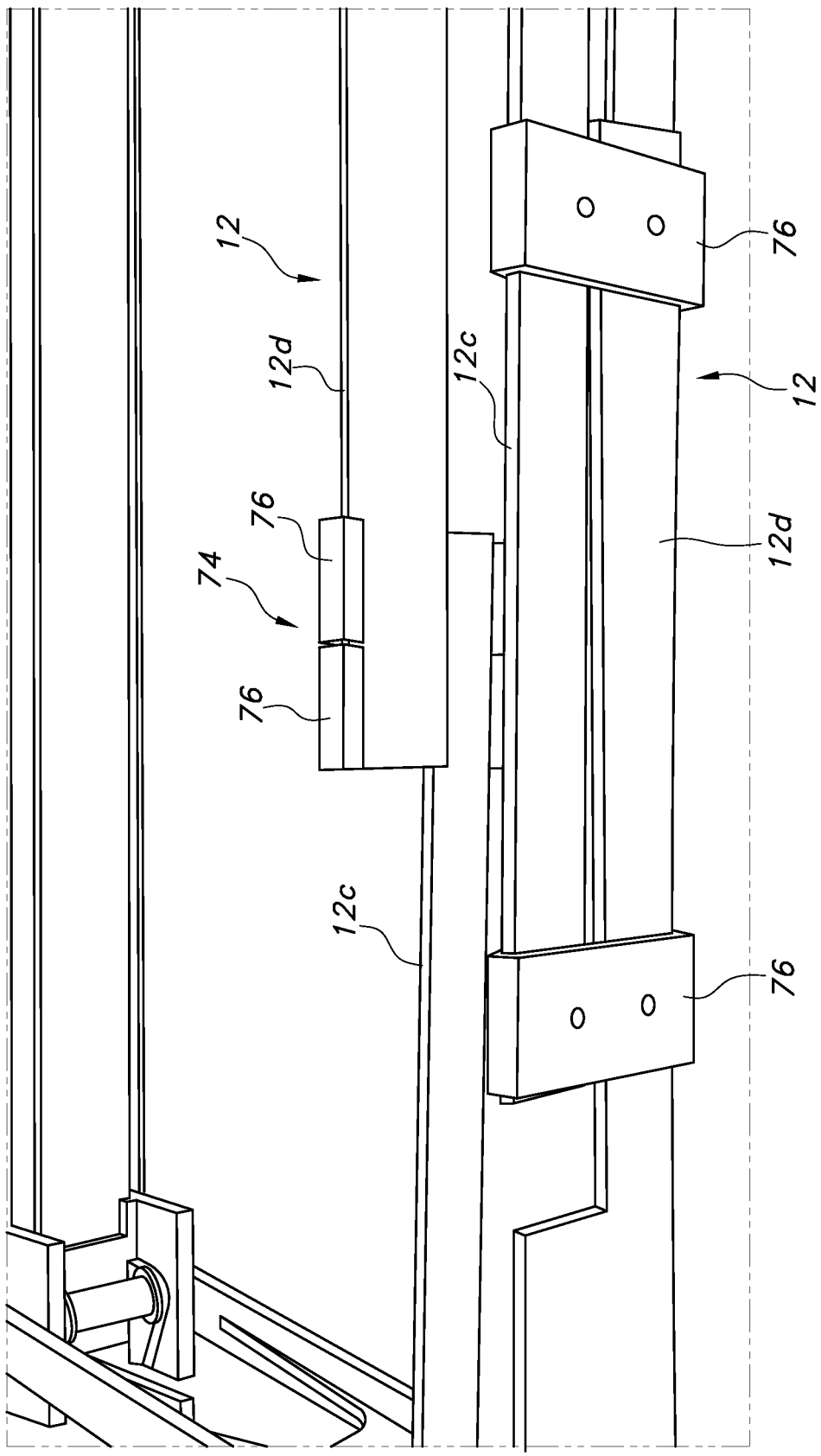
Figure 29:
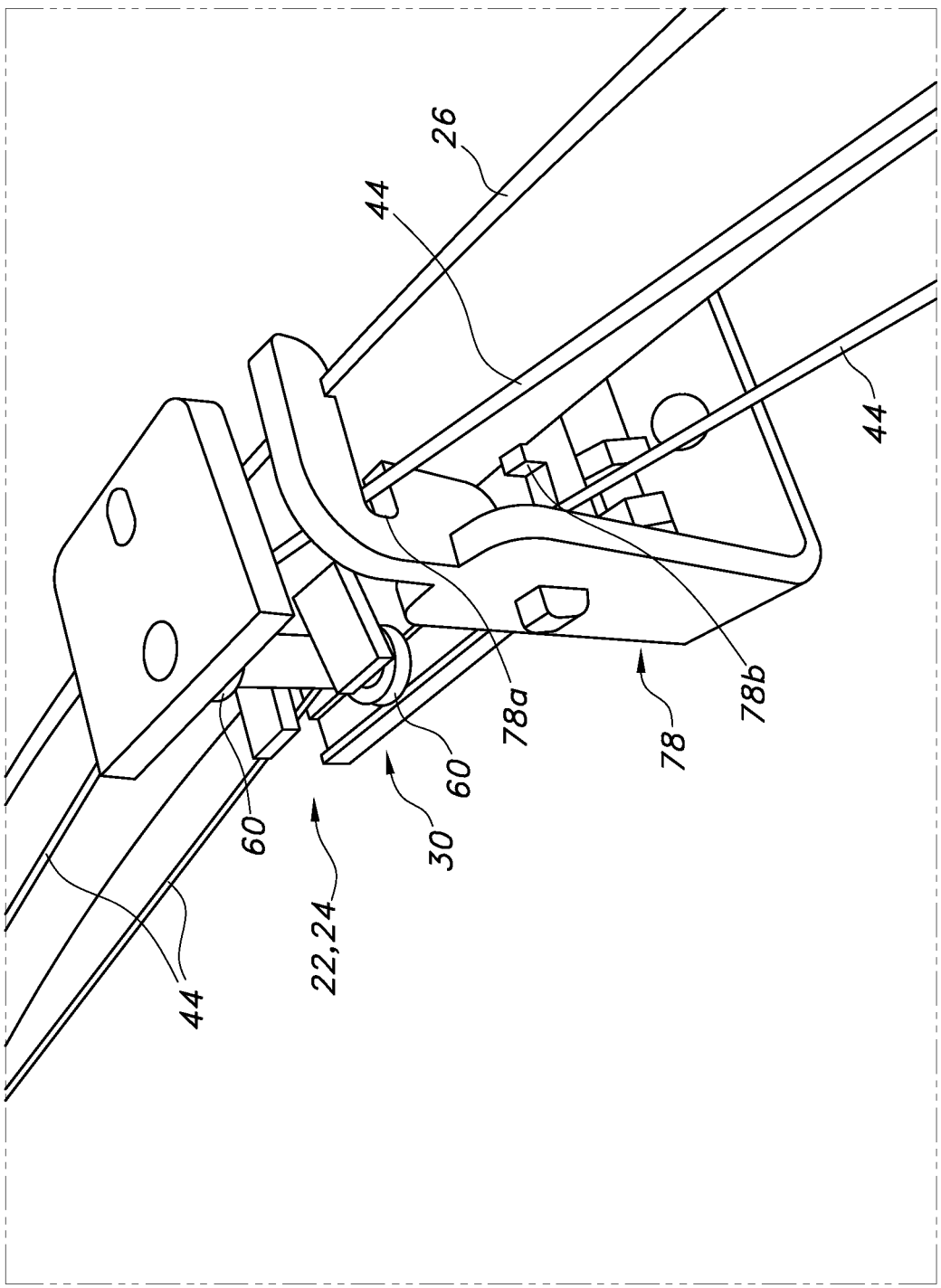
Figure 30:
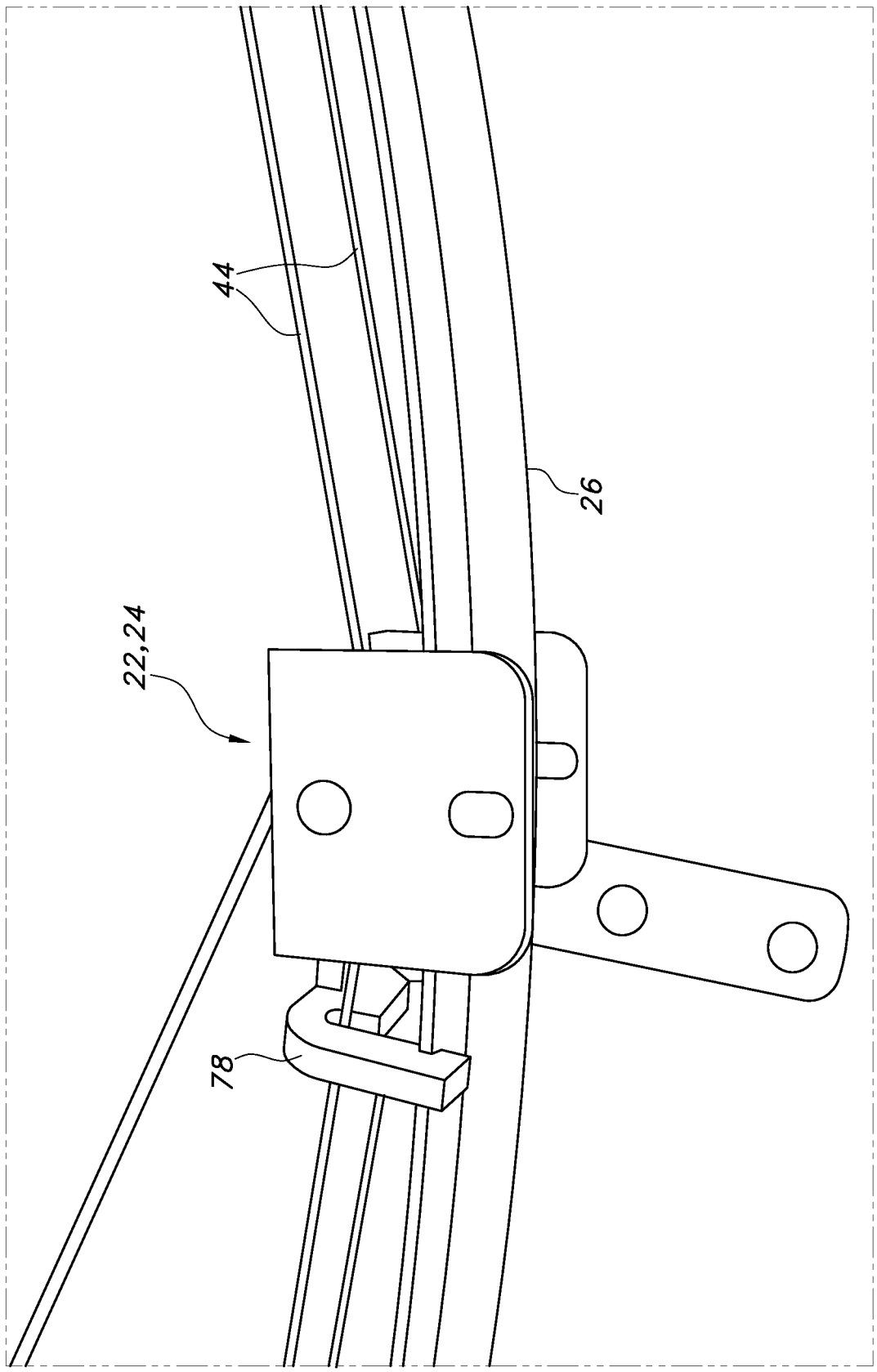
Figure 31:
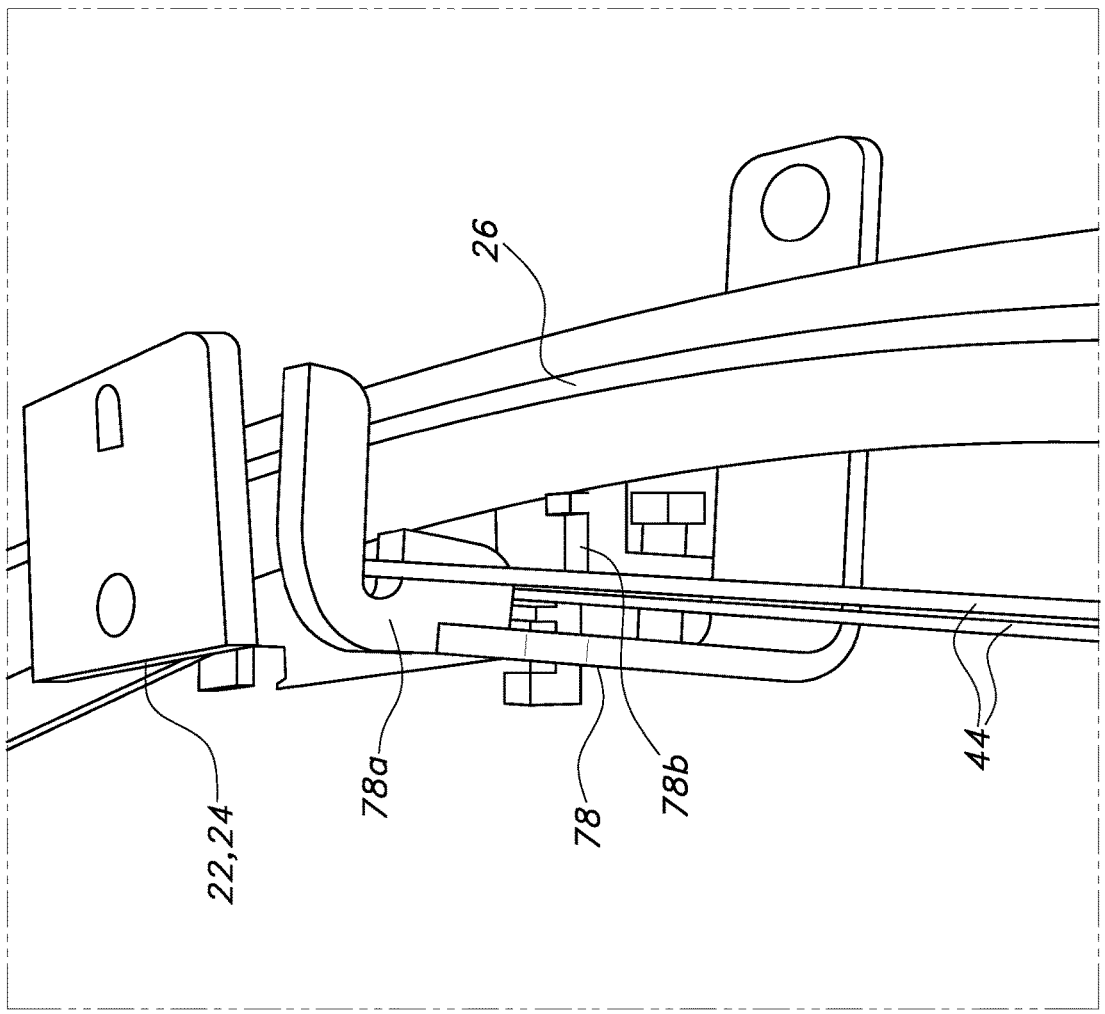
Figure 32:
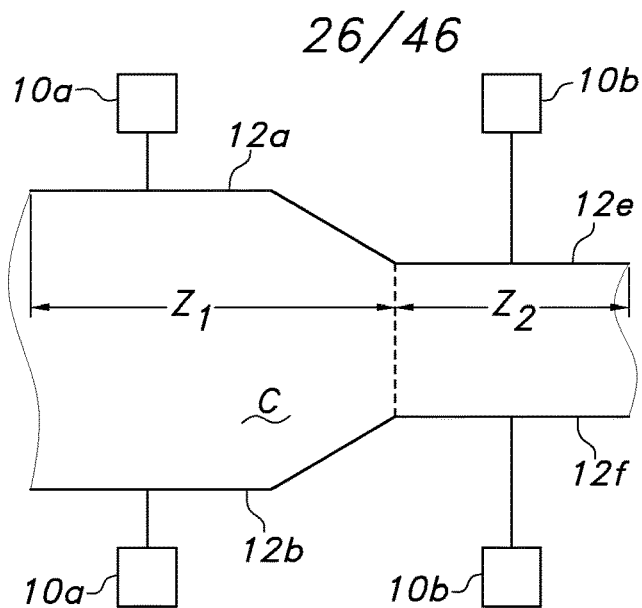
Figure 33:
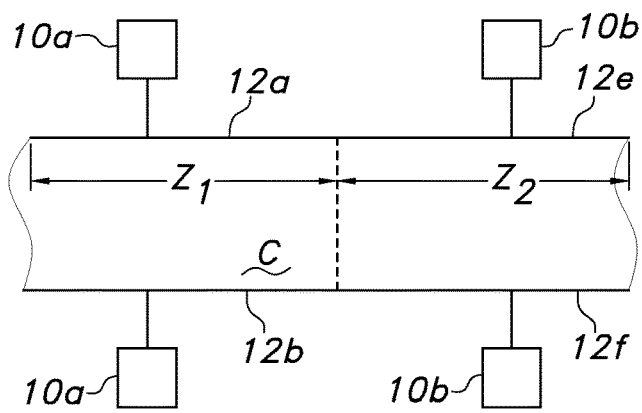
Figure 34:
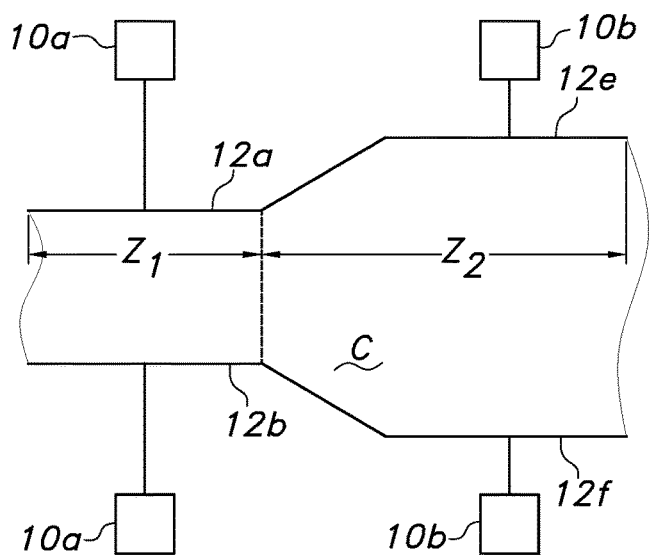
Figure 35:
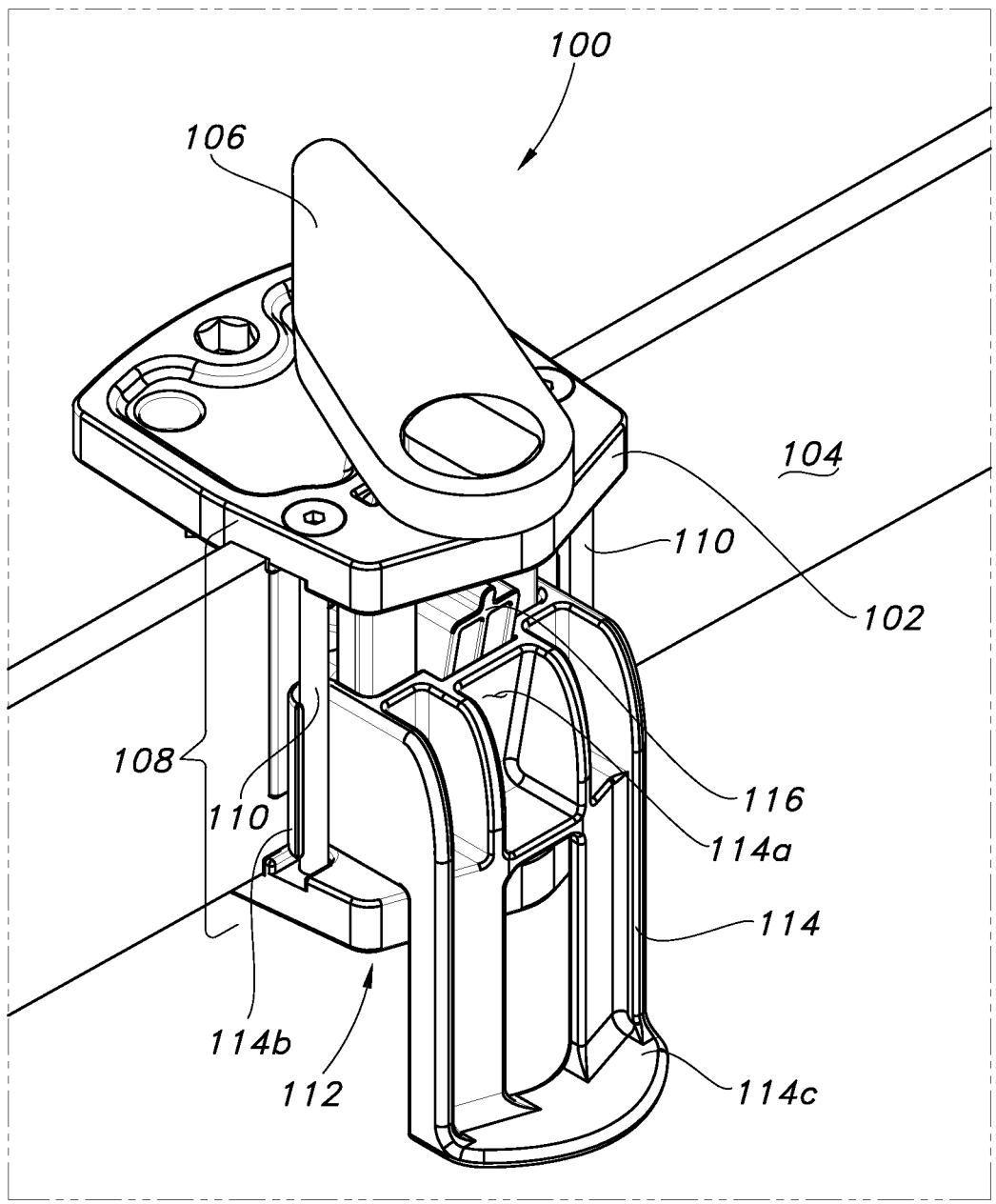
Figure 36:
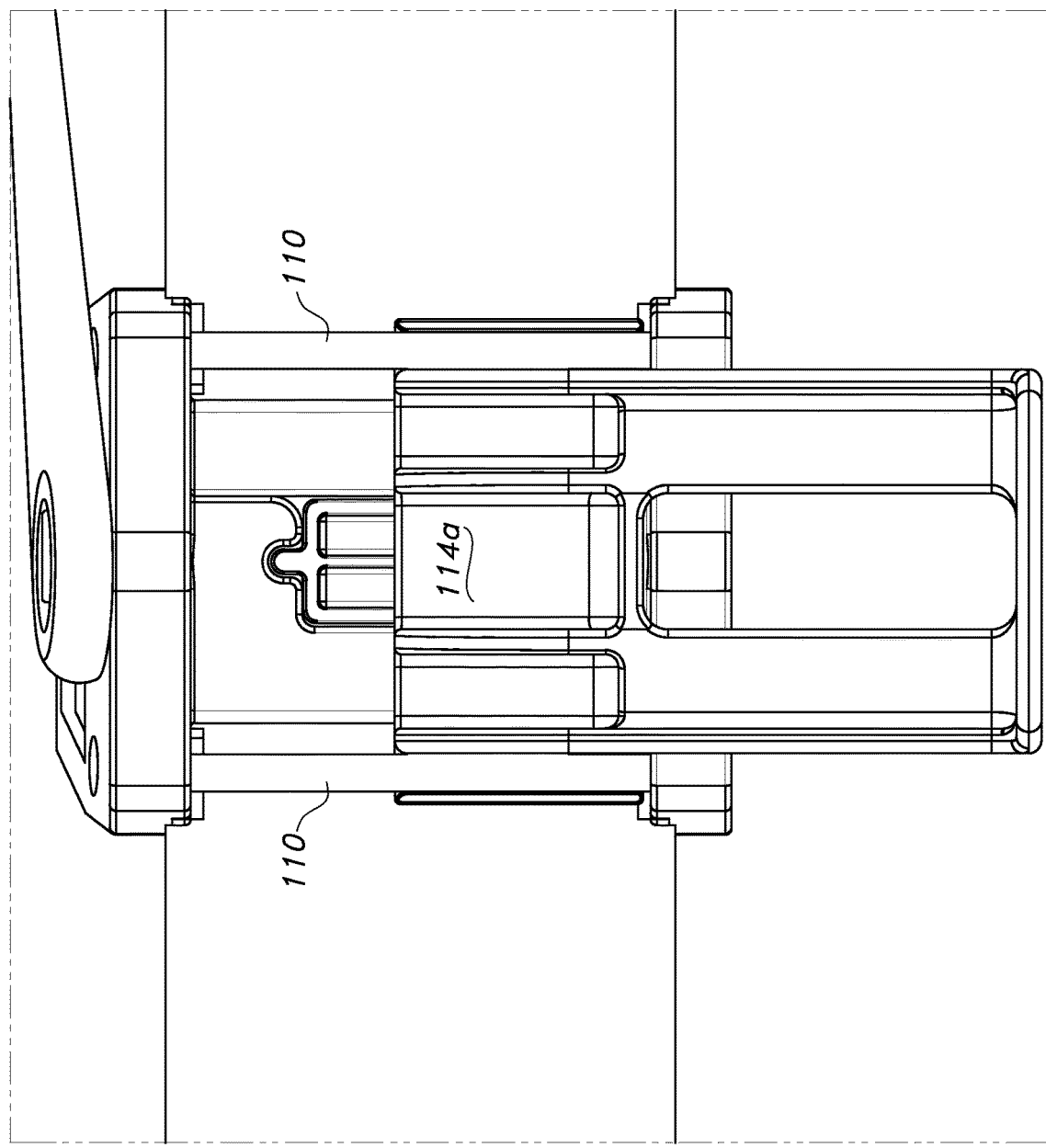
Figure 37:
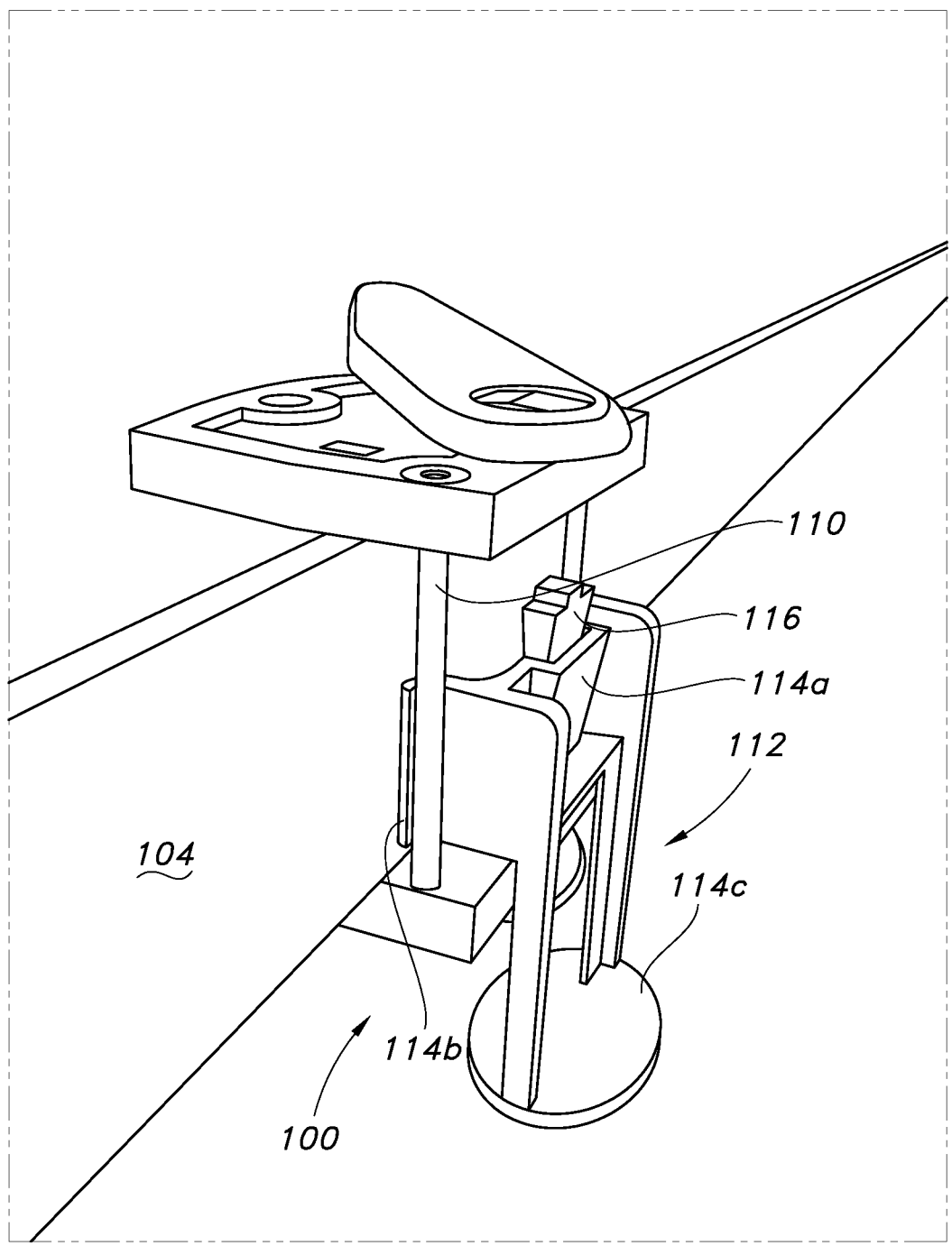
Figure 38:
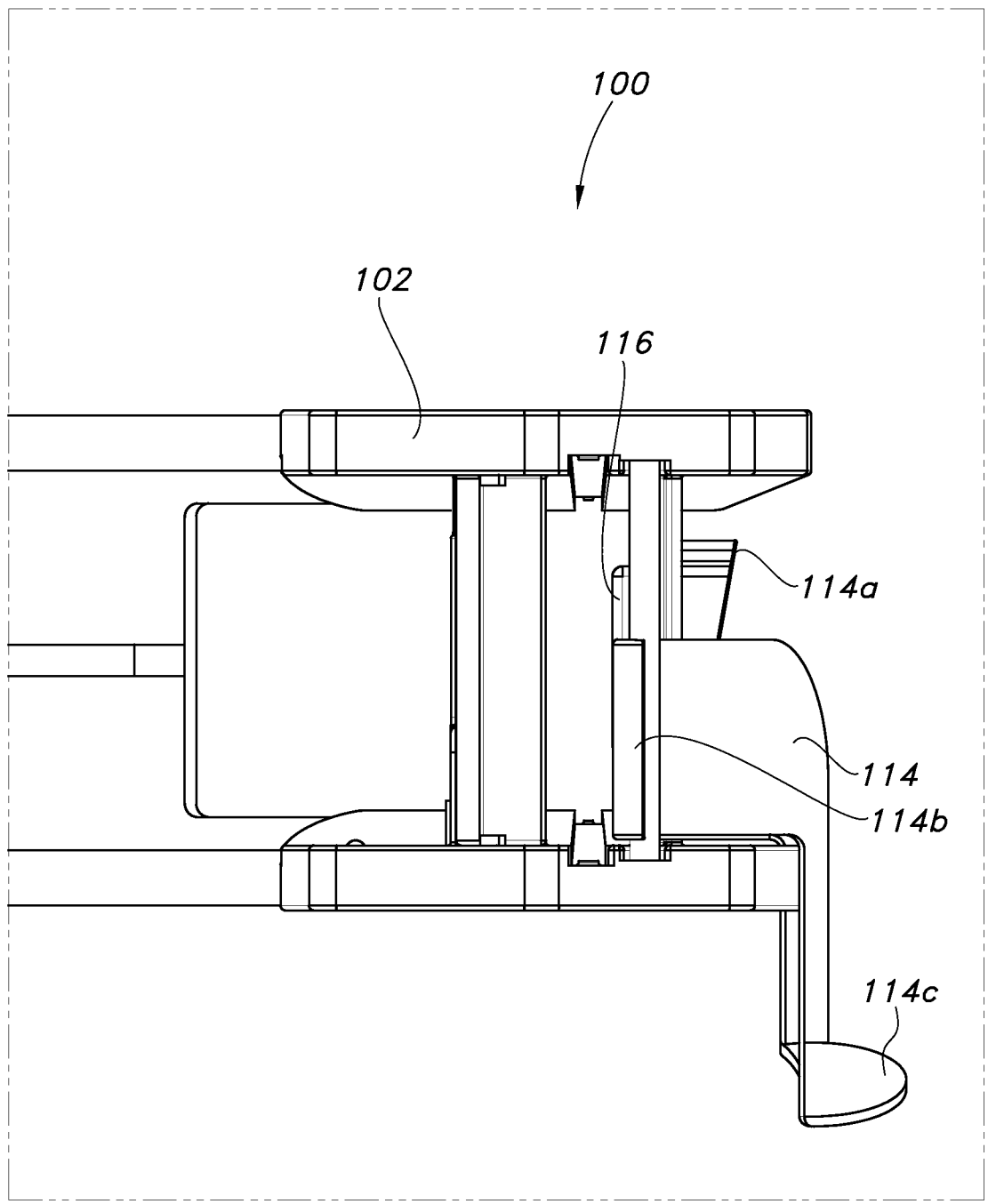
Figure 39:
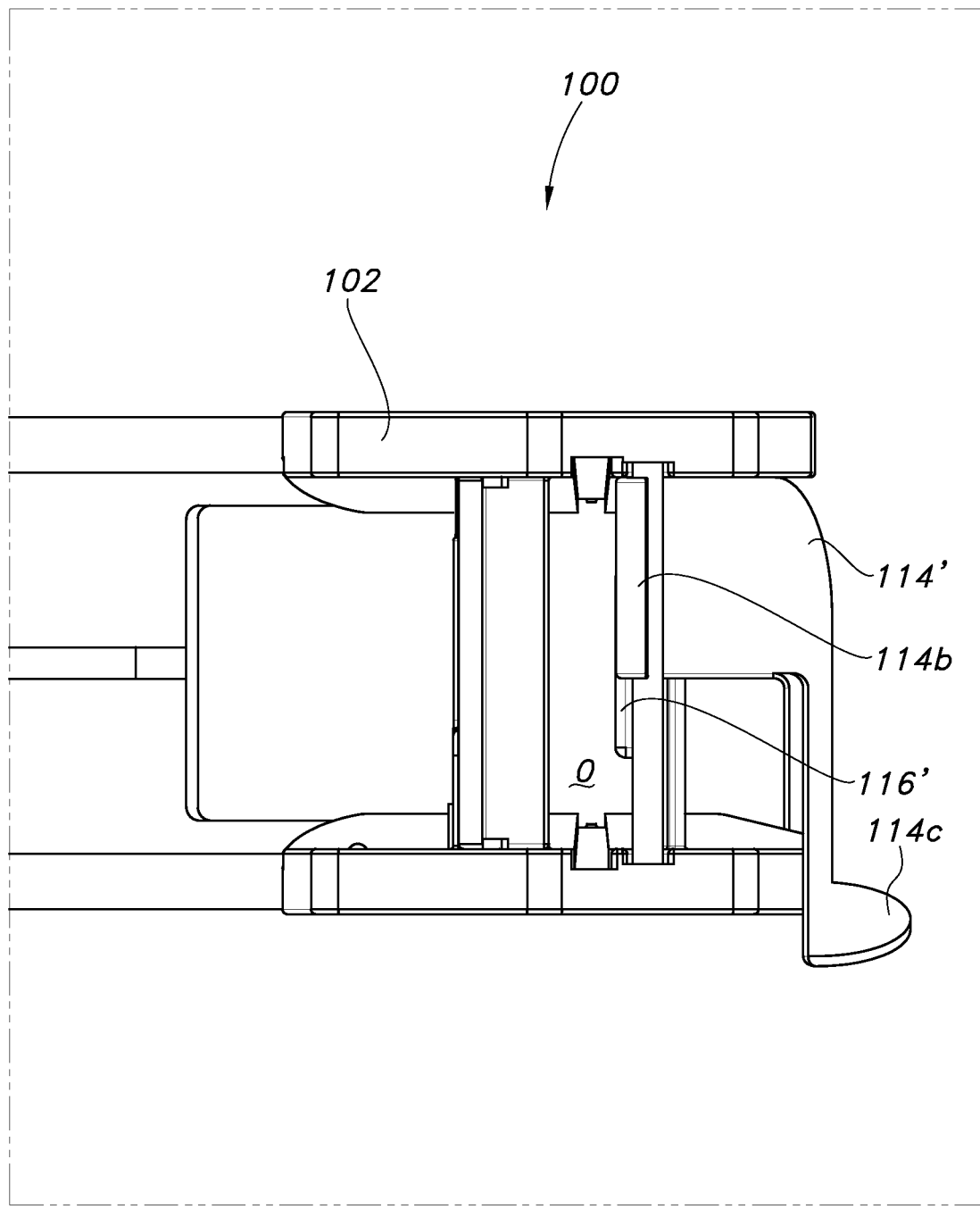

FIGS. 3, 4, and 5, are top, rear, and bottom views of the adjuster of FIG. 1;

FIG. 6 is a front view of the adjuster of FIG. 1;

FIGS. 7 and 8 are left-side and right-side views of the adjuster of FIG. 1;

FIG. 9 is a perspective view of a collapsible guiderail support forming part of the adjuster of FIGS. 1-8;

FIG. 9A is an exploded view illustrating a manner of connecting an arm to one of the supports (shuttles) for pivoting movement;

FIG. 9B is a top view of the assembled configuration of FIG. 9A;

FIG. 9C is a cross-sectional view of the arrangement of FIG. 9A when assembled, taken along line 9C-9C of FIG. 9B;

FIGS. 10 and 11 are top views of the support of FIG. 9 in an extended and retracted condition;

FIG. 12 is a rear view of the support of FIG. 9;

FIG. 13 is a perspective view of a shuttle for connecting to the support for manual operation;

FIG. 14 is an exploded perspective view of the shuttle of FIG. 13;

FIG. 15 is a perspective view of a shuttle for connecting to the support for automated operation;

FIG. 16 is an exploded perspective view of the shuttle of FIG. 15;

FIG. 16A is a partially cross-sectional top view of the shuttle of FIG. 15;

FIG. 17 is a side view illustrating aspects of an actuator for actuating the adjustable guiderail support;

FIG. 18 illustrates a tensioner for a cable forming part of the actuator for the adjustable support;

FIGS. 19, 20, 21, 22 and 23 illustrate alternative forms of actuators;

FIGS. 24, 25, and 26 illustrate a system comprising two opposed guiderails associated with a plurality of adjusters;

FIGS. 27 and 28 illustrate various aspects of an extendable guiderail;

FIGS. 29, 30 and 31 illustrate guides for guiding an endless cable along a curved section of a support rail for the adjusters;

FIGS. 32, 33, and 34 are schematic views illustrating the creation of various zones using the adjustable guiderails according to the disclosure;

FIGS. 35-42 illustrate an embodiment of a manually adjustable guiderail support; and FIGS. 43-54 illustrate a mount for mounting an adjustable guiderail to a conveyor.

Reference will now be made in detail to the present preferred embodiments of a manually adjustable guiderail for a conveyor, examples of which are illustrated in the accompanying drawing figures.

DETAILED DESCRIPTION

With reference to FIGS. 1-9, one possible embodiment of a guiderail adjuster 10 forming one aspect of the invention is illustrated. As illustrated, the adjuster 10 may be adapted to connect with a guiderail 12 for guiding articles along a conveying path and in a conveying direction D (see, e.g., FIG. 19). The guiderail 12 may be supported by a support 14 forming a part of the adjuster 10, which may be flexible or collapsible (that is, able to be folded into a more compact shape). The adjuster 10 including the support 14 is thus capable of extending or retracting the guiderail 12 to change the relative position of the conveying path, without increasing the overall width of the associated conveyor in a transverse direction as a result of the adjustment.

In one embodiment, the support 14 may comprise links in the form of first and second supports or arms 16, 18 connected to each other. The arms 16, 18 are rigid in the vertical direction, but pivotally connected at their inner end portions, such as by a connector 20. The arms 16, 18 and connector 20 thus create a linkage (which may be in the form of a two bar linkage, but other forms could be used).

At the opposite end, each arm 16, 18 is connected to a structural part designed to reduce or eliminate friction or provide support or bearing. In the illustrated embodiment, this structure takes the form of a movable bolster or shuttle 22, 24 adapted to frictionally (by sliding or rolling) engage an elongated support rail 26, which extends generally parallel with the guiderail 12 in the conveying direction D. Consequently, these connections and the relative movement established allow for flexing or collapsing of the support 14 in a direction transverse to the conveying direction D.

The support 14 is also adapted to connect with the guiderail 12. In the illustrated embodiment, this is achieved by providing the connector 20 with one or more receivers, such as clips 20a, 20b (which as discussed in further detail below may provide engagement such that the guiderail 12 is fixed in position, or may be arranged to allow for relative sliding movement). As can be appreciated from FIG. 6, the arrangement is such that the overall adjuster 10 has a very low vertical profile, with a height only slightly greater than the height of the guiderail 12. As can be seen in FIGS. 1-8, an optional cover 28 may also be provided (removed in FIG. 9), which may engage the support rail 26 and provide a measure of protection for the movable parts of the adjuster 10, but without interfering with their relative movement and operation.

With reference to FIGS. 9 and 12, the nature of the pivoted connection of the arms 16, 18 forming the support 14 for the guiderail in one embodiment is shown. Each arm 16, 18 may be provided with a trunnion 16a, 18a, the ends of which are received and rotatably captured within upper and lower receivers 20c on either side of the connector 20. However, alternative configurations could be used, such as a simple hinge (with a mechanical pin or a living hinge). In any case, movement of the shuttles 22, 24 along the support rail 26 towards each other causes the connector 20, and hence, the associated guiderail (not shown) to move along an adjacent conveying surface in a direction transverse to the conveying direction. The movement is considered a flexible one, in that the pivoting of the arms 16, 18 relative to the connection allows flexing of the flexible joint thus formed. Likewise, movement of the shuttles 22, 24 in the opposite direction (farther away from each other) causes the arms 16, 18 to flex relative to each other (and connector 20) and thereby retract the guiderail 12.

Allowing the arms 16, 18 forming the linkage to reach a "bottomed out" (($\beta$=180 degrees or more) and potentially locked position may be undesirable (especially when the actuation of the adjusters 10 is automated, as compared to manual). Thus, as can be appreciated from FIGS. 10 and 11, this condition may be avoided by providing the side of the connector 20 opposite the guiderail 12 with a protrusion or extension 20d projecting transverse to the conveying direction, which thus serves to define the maximum flexing of the joint formed between the arms 16, 18. This protrusion or extension 20d of the connector 20 may be sized and positioned to engage the support rail 26 in the fully collapsed position of the linkage, and thus prevent it from bottoming out and becoming locked in position. Of course, the protrusion could also be provided on one or both of the arms 16, 18, or even on the support rail 26, to achieve a similar result.

As can be appreciated with reference to FIGS. 10, 11, and 12, by way of being selectively extended or retracted, the support 14 creates an enhanced level of adjustability for an associated guiderail 12. The adjustments may be achieved in an easy and efficient manner, and without remarkably increasing the footprint of the overall conveyor system. Specifically, extending or retracting the support 14 allows the guiderail 12 pivotally attached thereto by virtue of connector 20 to be configured to provide a variable width conveying path for a number of differently sized articles to be conveyed. For example, when a smaller sized article is desired to be conveyed, the guiderail 12 need only be moved in an inward or inboard direction I transverse to the conveying direction D, thereby causing it to collapse in this direction (and thus causing the flexible joint to assume an acute angle $\alpha$, such as for example as little as 5 degrees in the illustrated example, and possibly lower in the event the arms 16, 18 may be arranged parallel to each other)). In other words, the arms 16, 18 move from a position where the relative angle between them is greater to one in which it is reduced or smaller. This narrows the conveying path, and thus allows for a readily customizable arrangement for guiding a variety of differently sized articles.

Likewise, if it is desired to convey a larger sized article/object or otherwise extend the width of the conveying path relative to the underlying conveyor, the guiderail 12 need only be moved in an outward or outboard direction O transverse to the conveying direction D (and thereby flexing the joint so as to create a large, obtuse angle $\beta$ between the arms 16, 18, which may be up to but not including 180 degrees, and as shown is limited by the presence of the extension or protrusion 20d to prevent a lock out condition). In other words, the arms 16, 18 move from a position where the relative angle between them is smaller to one in which it is greater. In all cases, it can be appreciated that no rod or like structure projecting outwardly from the support rail 26, and thus the overall width of the arrangement does not change as a result of the extension or retraction. The resulting conveyor system may thus have a smaller footprint than would otherwise be the case if transversely extending rods and corresponding mounts were utilized.

The adjustment of the support 14 may be manually or automatically done. In the manual version, and with reference to FIGS. 13 and 14, each shuttle 22, 24 may be provided with a retainer 30 for use in selectively engaging the support rail 26 and thereby holding the shuttle in the desired position. In the illustrated embodiment, the retainer 30 comprises a post 32 supporting an actuator in the form of a pivotally mounted lever 34, such as by way of snap-fit engagement with a clip 32a. The inside of the lever 34 includes a wedge 36, which is sized and positioned for not engaging the rail 26 in one position, but frictionally engaging it in a different position (note positions 34' (free) and 34" (retained) in FIG. 9). Opposed plates 38, 40 may be retained by a fastener F to hold the post 32 in position, and each plate 38, 40 may include a guide 42 for slidably receiving a portion of the support rail 26. The plates 38, 40 may also include apertures 38a, 40a for receiving a corresponding fastener (such as a keyway plug 16c; see FIGS. 9A, 9B, and 9C) depending from a proximal end of each arm 16, 18 for pivotally connecting the ends of the arms 16, 18 with the shuttles 22, 24.

As can be appreciated, by disengaging the retainer 30 using lever 34, the associated shuttle 24 is free to move to and fro, such as by sliding, along the support rail 26, and thereby extend or retract the support 14 and, hence, the associated guiderail 12. When a position is reached corresponding to the desired extension or retraction of the guiderail 12, the retainer 30 may be reactivated to establish fixed engagement with the support rail 26. As can be appreciated, it is only necessary to move one of the shuttles 22, 24 to achieve the desired extension or retraction of the guiderail 12 in view of the collapsible nature of the support 14 created by the pivotably connected arms 16, 18.

The shuttles 22, 24 may also be readily adapted to work in an automated environment. Specifically, at least one, and potentially each shuttle 22, 24 may be adapted to engage an actuator for causing movement to and fro along the support rail 26, depending on the degree of actuation, and thus extending or retracting the arms 16, 18. As shown in FIG. 17, the actuator may comprise a connector for connecting with the shuttles 22, 24, such as a flexible cable 44. The cable 44 may extend over pulleys 46 at each end (only one shown in FIG. 17 mounted to one end of the support rail 26, but the arrangement would essentially be the same as shown at the opposite end of the support rail 26; see, e.g., FIG. 19). The arrangement thus forms an endless loop (which may be associated with plural adjusters 10, as outlined further in the following description).

To cause the cable 44 to traverse the endless path, it may be entrained around a driver, such as capstan 48, which may be associated with a motor 50 (e.g., a servomotor) also forming part of the actuator in this embodiment. As shown in FIG. 18, the cable 44 may also be provided with a tensioner, such as a turnbuckle 44a, to allow for the tension to be adjusted as necessary or desired.

In this example, and with reference to FIG. 16, each plate 38, 40 may be provided with a retainer 52 for selectively engaging the cable 44. The retainer 52 may comprise a clamp in the form of a pivotable cam 54 (only upper one shown in FIG. 16), but could take other forms as well (e.g., a bolt with a flange for capturing a portion of the cable 44 against a corresponding surface of the shuttle). The cam 54 may be journaled on a reduced diameter end 56a of a post 56, which may be held in place by a fastener F.

In the illustrated example, and with reference to FIGS. 16 and 16A, the cam 54 includes an enlarged, rounded inner face 54a for engaging and pressing the cable into engagement with a frictionally enhanced portion 55 of the plate 38, 40 (which may be identical, but inverted; in other words, plate 38 is identical in form to plate 40 in FIG. 16, so it can be understood that the upper plate includes frictionally enhanced portion 55), and a free end 54b adapted for tactile engagement for movement between the hold and release position. A lock, such as a removable locking tab 58 with flexible legs for engaging a projection 58a in a snap fit engagement, may also be provided for engaging and fixing the cam 54 in the locked or closed condition, thus engaging the cable (shown in phantom line in FIG. 16A). A roller or pulley 60 may be rotatably journaled at the opposite, reduced diameter end 56b of post 56 (upper when the cam 54 is at the lower plate 38; lower when the cam 54 is at the upper plate 38, as shown in FIG. 16).

As can be appreciated, the cable 44 has a forward run and a return run in view of the endless loop established. By connecting one shuttle 22 to the upper run using the clamp (cam 54) located as shown in FIG. 16, and connecting the other shuttle 24 to the return run using a clamp (cam 54 on plate 40, as per FIG. 16A) at a corresponding location, actuation using a single actuator thus causes the shuttles 22, 24 to move toward or away from each other, thereby flexing the joint of the support 14 created by arms 16, 18 and extending or retracting the guiderail 12. The alternate run of the cable 44 that is not fixed to the shuttle 22, 24 simply engages the roller/pulley 60, and thus does not impede the relative movement.

With continued reference to FIG. 16, each shuttle 22, 24 may also be provided with rollers 62 to create low-friction engagement with the support rail 26. The rollers 62 may comprise individual rollers 62a connected to the plates 38, 40 by fasteners 64 and arranged for engaging an outer face of the support rail 26, as well as rollers 62b journaled in the plates 38, 40 for engaging the inside face of the support rail 26. As can be appreciated, the spaced rollers 62a allow for a portion of the rail 26 to pass for engaging and supporting the cover 28.

Figure 19:
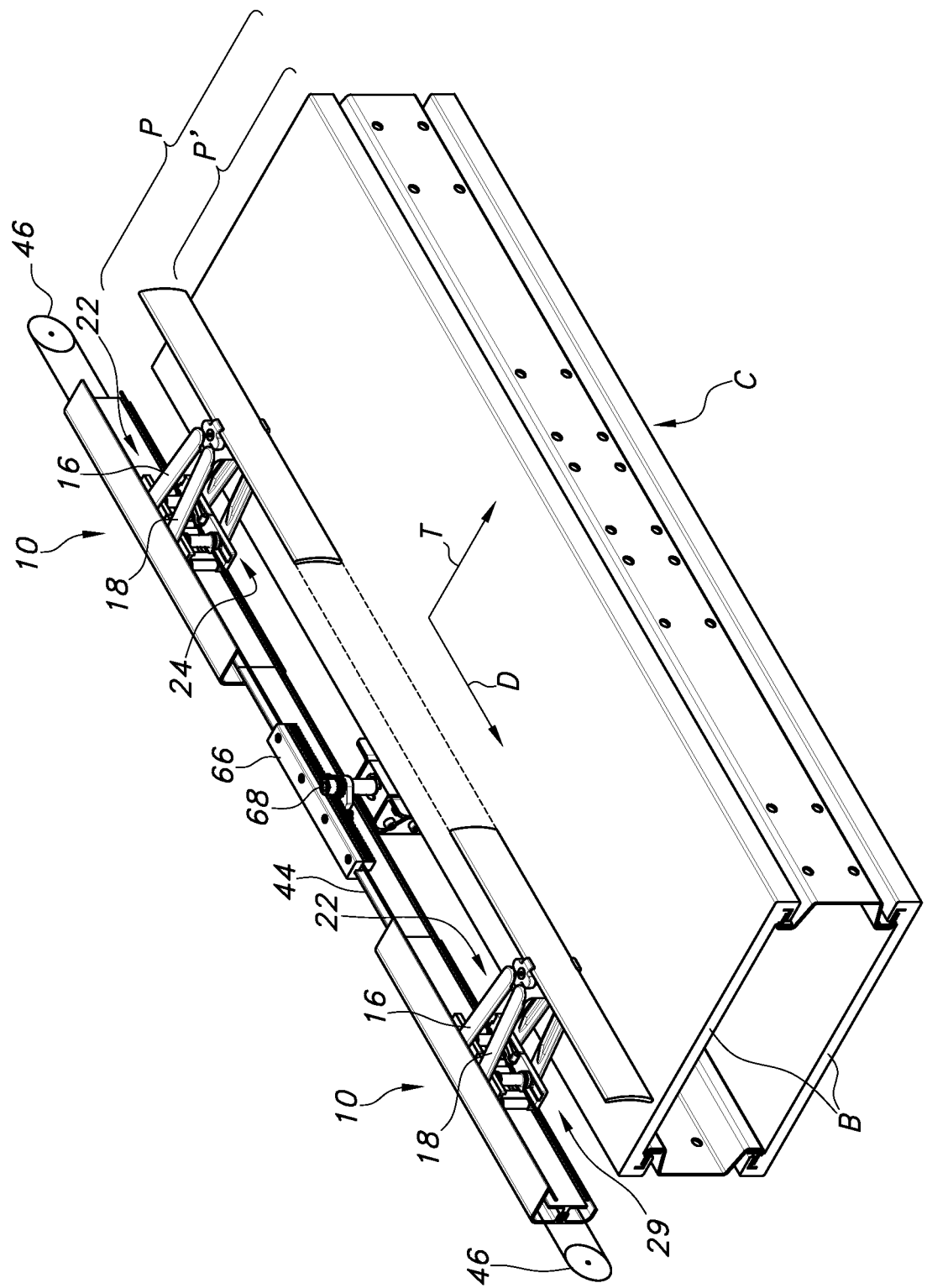

Alternative forms of actuation are possible, which advantageously may use a single actuator for activating plural adjusters 10 for adjusting the width of the conveying path. For example, as shown in FIG. 19, the connector, such as cable 44, may be associated with a rack 66, which is arranged for engaging a rotatable pinion 68. In view of the endless nature of the cable 44, and the corresponding connections with the shuttles 22, 24 as described above, actuation of the pinion 68 in one direction causes the simultaneous actuation of plural adjusters 10. This advances the guiderail 12 (shown as two disconnected portions with phantom portion for purposes of illustration) in the transverse direction T of the conveyor C (which as indicated has a conveying path P formed by a conveying surface (chain or belt B) in the conveying direction D, and note reduced width path P' as a result of the advance of the guiderail 12 in the transverse direction). Specifically, rotating the pinion in a clockwise direction moves the rack to the right in FIG. 19, and in view of the connection of the forward run of the cable 44 with shuttles 22 of each guiderail adjuster 10, and the return run with shuttles 24, causes the advancement illustrated. Reversing the direction of rotation of pinion 68 causes the opposite movement to occur.

Figure 20:
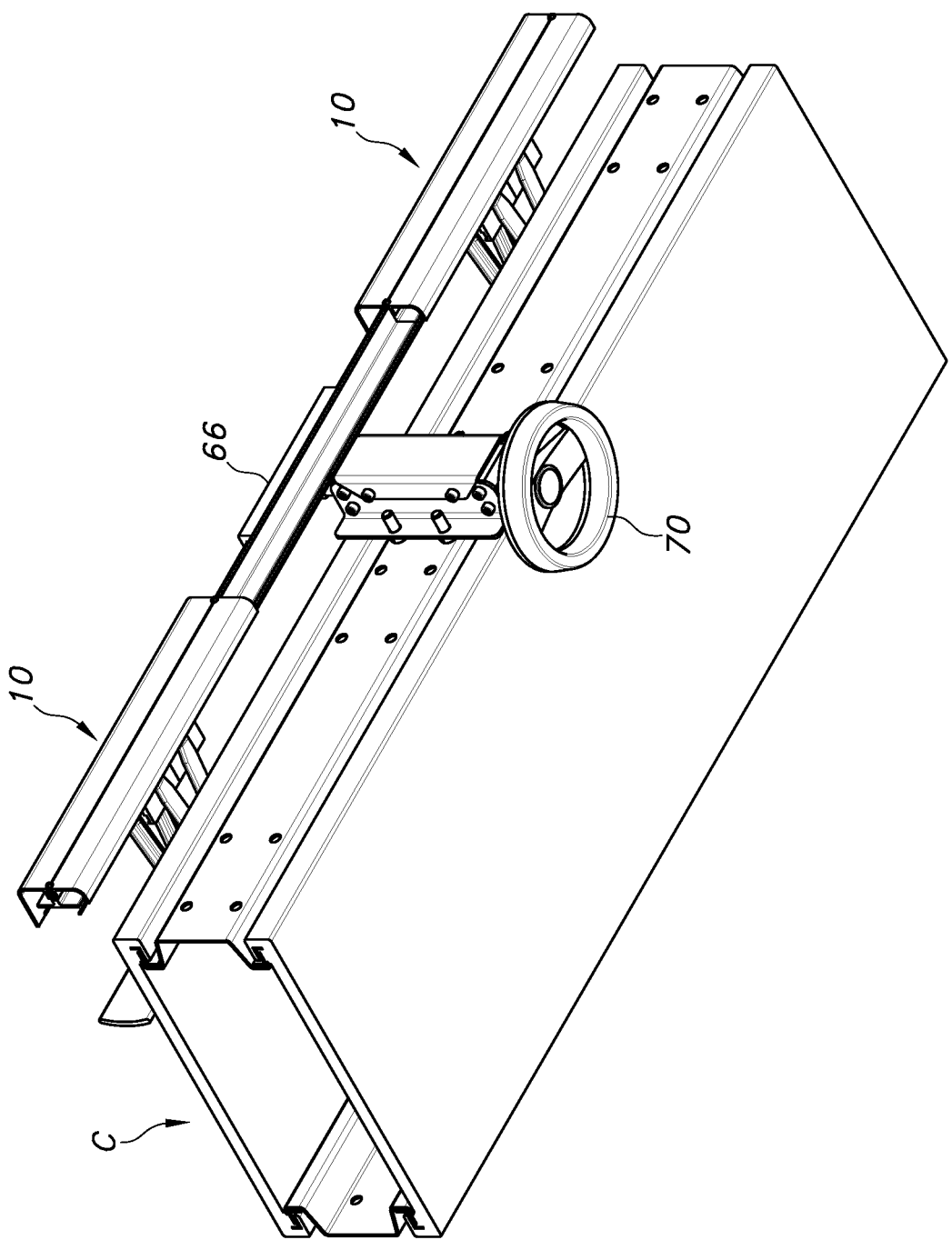
Figure 21:
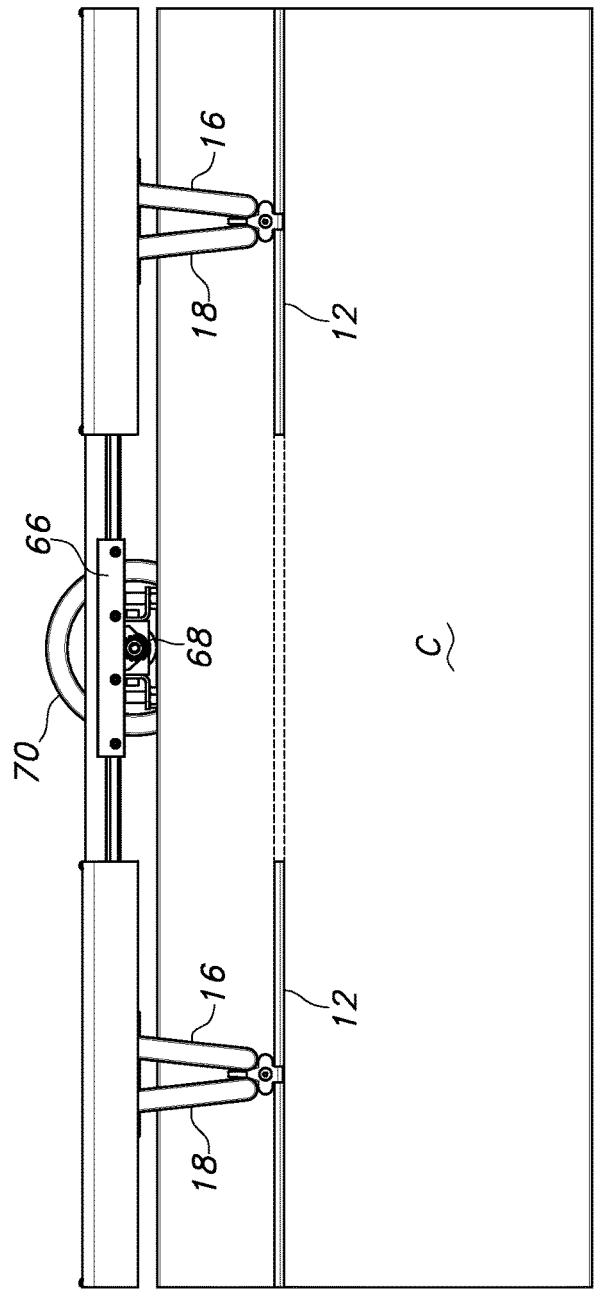
Figure 22:
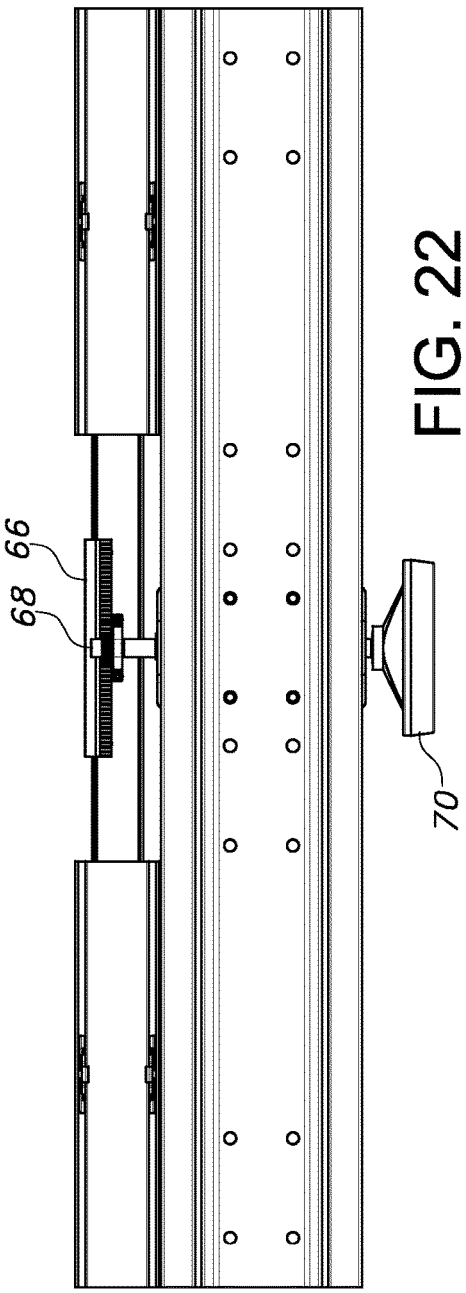
Figure 23:
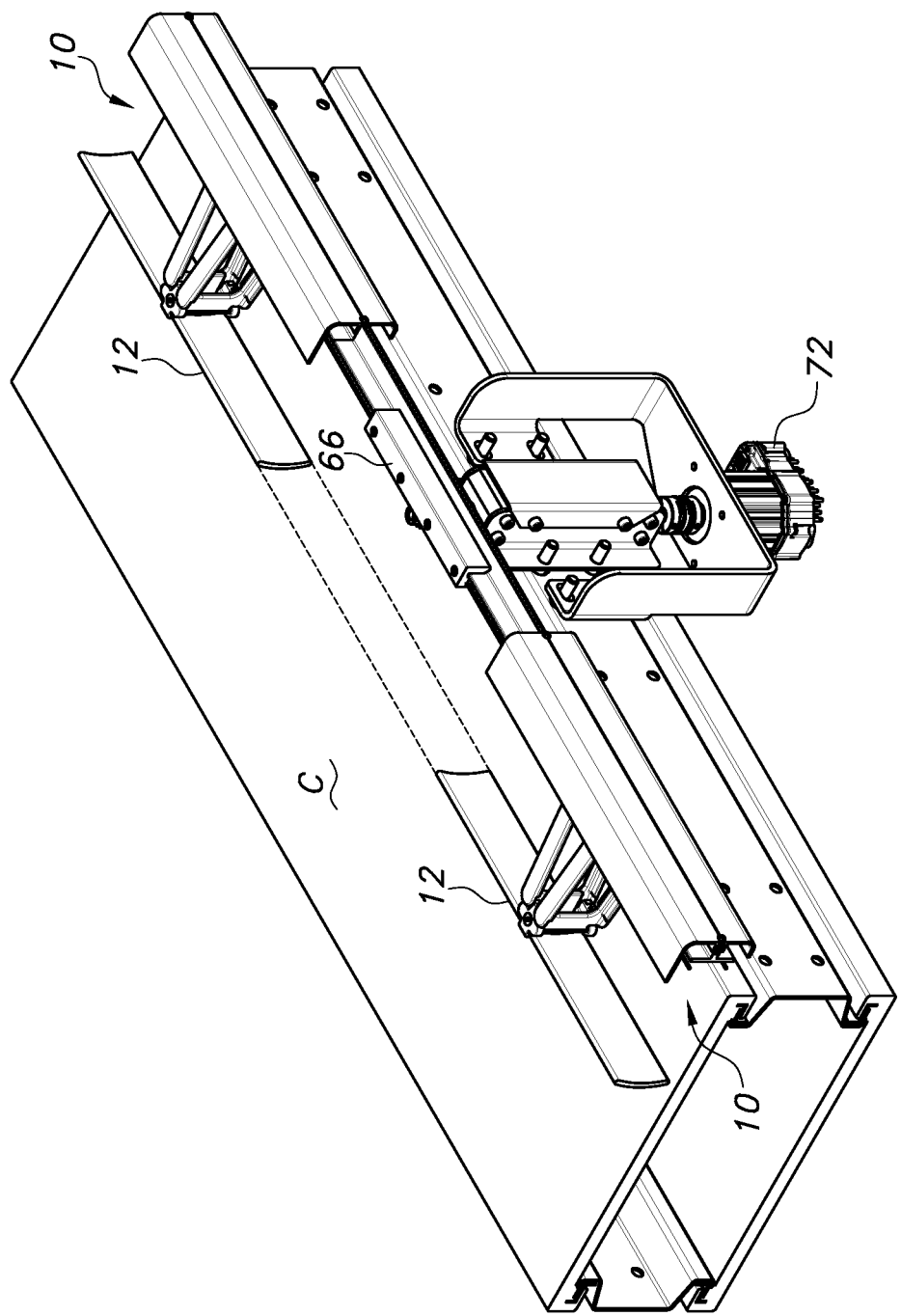

The actuation of the adjusters 10 associated with the conveyor C may again be manual or automated. Thus, as shown in FIGS. 20-22, a hand wheel 70 may be connected to the associated conveyor C and rotated to cause the actuation of one or more of the adjusters 10 (basically, as many as are connected to a single connector or cable 44, which could be any number (2, 5, 10, 20 or more), depending on the strength of the actuator arrangement used. FIG. 23 illustrates the use of a motor 72 (e.g., servomotor) for automated operation.

FIGS. 24-26 illustrate an overview of a possible arrangement of the adjustable guiderail support system incorporating a plurality of adjusters 10 for use in connection with a conveyor having a conveying path (not shown). Opposed inner and outer guiderails 12a, 12b are shown for guiding articles (not shown) along the conveying path. The adjustable guiderail supports 14a, 14b are supporting inner guiderail 12a and the adjustable guiderail support 14c is supporting outer guiderail 12b. Thus, if it is desired adjust the conveying path width W to accommodate differently sized articles (or groups thereof), guiderail 12a (along with guiderail supports 14a, 14b) and guiderail 12b (along with guiderail support 14c and any others present) may be moved. The movement may again be manual or automatic using a single actuator (including cable 44) transverse the conveying direction D along each support rail 26 (with an associated motor, the operation of which may be coordinated by a single controller) in order to widen or narrow the conveying path width W (note smaller width W' in FIG. 25, and even smaller width W" in FIG. 26, which may correspond to a single row of articles being conveyed, such as bottles or cans). In such situations, it may be desirable to have the receivers (e.g., clips 20a, 20b) firmly engage the guiderail 12a, 12b at every other adjuster 10, but slidably engage at others, to allow for the desired extension and retraction.

FIGS. 27-28 illustrate that the guiderail 12 may comprise an extendable joint 74 comprised of portions, such as legs 12c, 12d, having a reduced vertical dimension (basically each equal to one half of the overall guiderail height). These legs 12c, 12d may overlie each other or overlap in a vertical direction, and are slidably received in receivers 76, which may take the form of C-shaped clamps that allow for relative movement of the legs (toward a common center during retraction of the guiderail 12 and away from it during extension). The receivers 76 thus retain the legs 12c, 12d together, yet capable of relative movement in the conveying direction during extension and retraction of the associated guiderail portions. This allows for the guiderail 12 to provide the desired extension and retraction, such as via supports 14, to accommodate a particular article being conveyed or form a particular conveying path. Hence, one or both of the legs 12c, 12d may be curved, but use of the supports 14 in connection with straight portions that are connected by the extendable joints is also possible. It can also be appreciated from FIG. 28 that the extendable joints 74 allow for opposing guiderails 12 to extend or retract different amounts, which may occur when one is associated with an inside curve and the other with an outer curve.

Depending on the size or shape of the underlying conveyor C, it may also be desirable to provide a guide intermediate the adjusters 10 for guiding the connector, such as cable 44. As shown in FIGS. 29-31, this may be achieved using the manual shuttle 22 or 24 of FIGS. 13 and 14, which may be equipped with pulleys 60 for engaging the upper and lower runs of the cable 44. The shuttles 22, 24 may be selectively positioned using the associated retainers 30. Stationary brackets 78 may also be provided with upper and lower guides 78a, 78b for guiding the respective runs of the cable 44.

FIGS. 32-34 schematically illustrate a possible application of the adjusters 10 to create zones of different widths in a single conveyor or conveyor system (e.g., comprised of multiple conveyors). As shown in FIG. 32, a first series of adjusters 10a associated with an underlying conveyor C may be used to provide an upstream portion of the conveyor with guiderails 12a, 12b spaced farther apart, thus forming a first zone Z1, and a second series of adjusters 10b may be used to place downstream guiderails 12e, 12f spaced closer together, thus forming a second zone Z2. The adjusters 10a, 10b may be manually adjusted, or associated with different actuators (e.g., a cable system, as described above). Later in time, as indicated in FIG. 33, the adjusters 10a, 10b may be altered to make the zones Z1, Z2 the same width, or for zone Z2 to be wider than zone Z1, as indicated in FIG. 34. As can be appreciated, the material of the guiderails 12a-12b may be flexible or include flexible interconnections (including the joints 74 described above) to allow for the relative movement, which is exaggerated in the schematic figures for purposes of illustration).

An alternate embodiment of an adjuster including one or more movable supports 100 adapted for being manually adjusted is described with reference to FIGS. 35-42. From FIGS. 34, 35, and 36, it can be understood that each movable support 100 comprises a connector in the form of a shuttle 102 for engaging a stationary support rail 104, and which is connected to a guiderail support arm 106. The shuttle 102 includes a body 108 including a pair of retainers 110 for supporting a clamp 112. The clamp 112 comprises an actuator in the form of a lever 114 adapted for moving along the retainers 110, such as in a vertical direction. Movement of the lever 114 forces a movable retainer, such as a wedge 116 into engagement with the corresponding (outer) surface of the support rail 104 (compare position of lever 114 and wedge 116 in FIG. 38 with raised position of lever 114' and wedge 116' in FIG. 39 for engaging the support rail (not shown) that would be present in opening Q).

The lever 114 may include a receiver 114a for receiving the wedge 116 and urging it into engagement with the support rail 104 as the lever is moved, such as in a vertical direction. The lever 114 may further channels 114b for receiving the retainers 110, which may be frictionally enhanced (such as by including threading, as shown), to create a suitable retention force and hold the lever 114 in the actuated condition as a result of the outwardly directed force created by wedge 116, yet be easily releasable using finger action (note handle 114c for this purpose; that is, moving the lever 114 upwardly to force the wedge 116 into engagement with the support rail).

Figure 40:
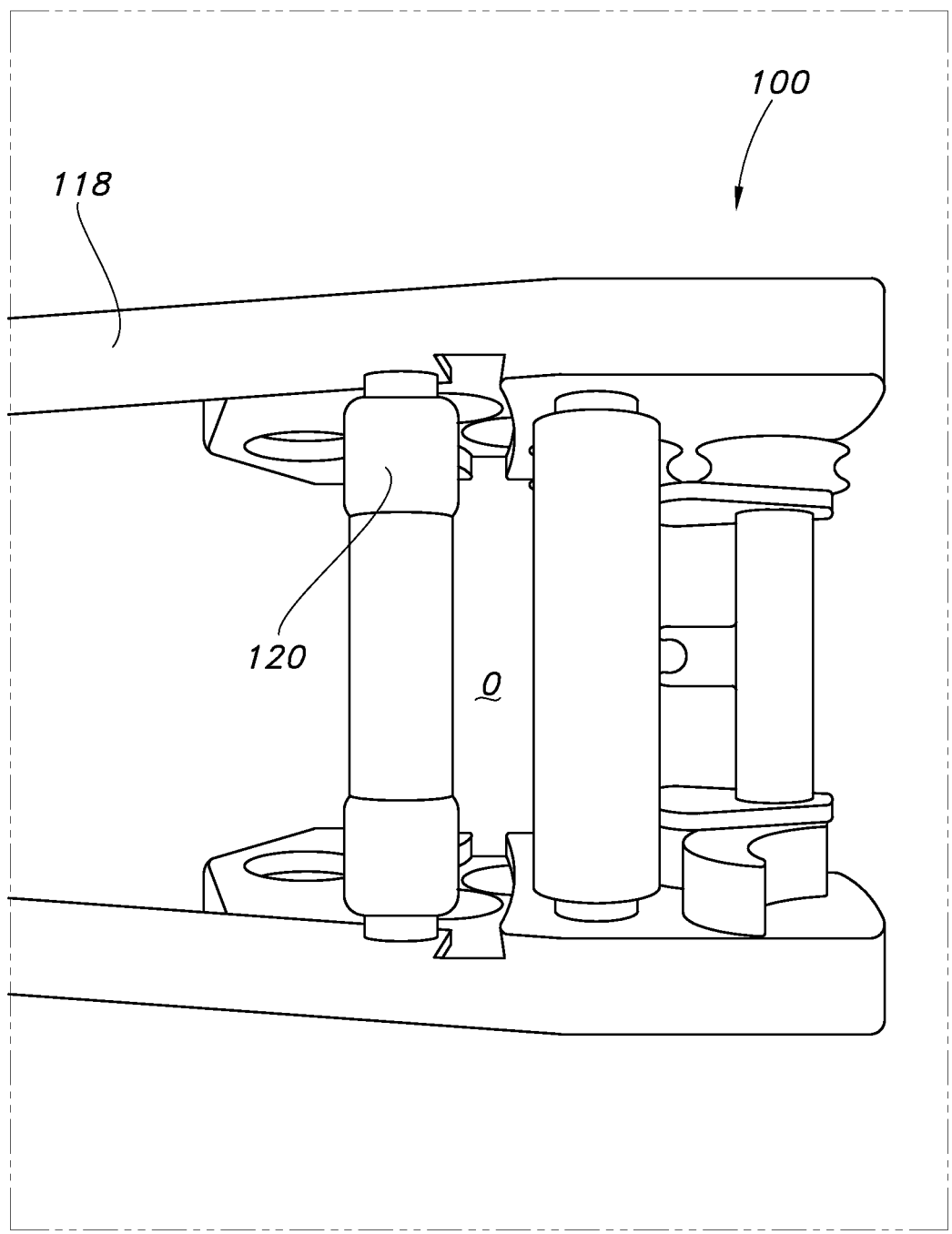
Figure 41:
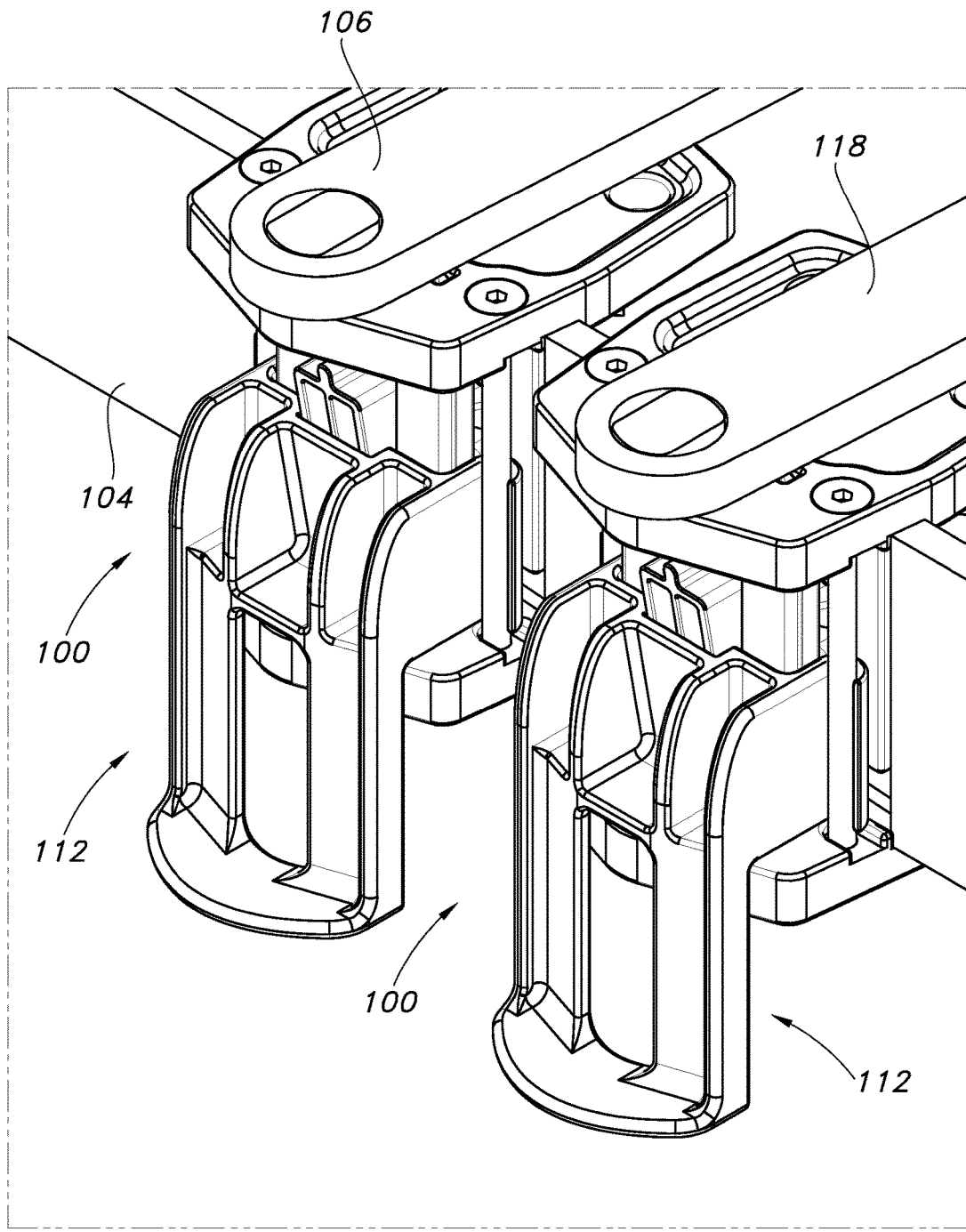

As indicated previously, a movable support 100 may be associated with each support arm, including a second support arm 118, as shown in FIG. 40. This movable support 100 need not include any retainer for fixing its position along the support rail, since it is connected by way of arms 106, 118 to the fixable support described above. This second support 100 may include one or more rollers 120 for facilitating low-friction rolling contact with the support rail (not shown), which would be located in opening Q. However, as indicated in FIG. 41, it is possible to provide each support 100 with a clamp 112, which may be used to independently fix it to the associated support rail 104.

Figure 42:
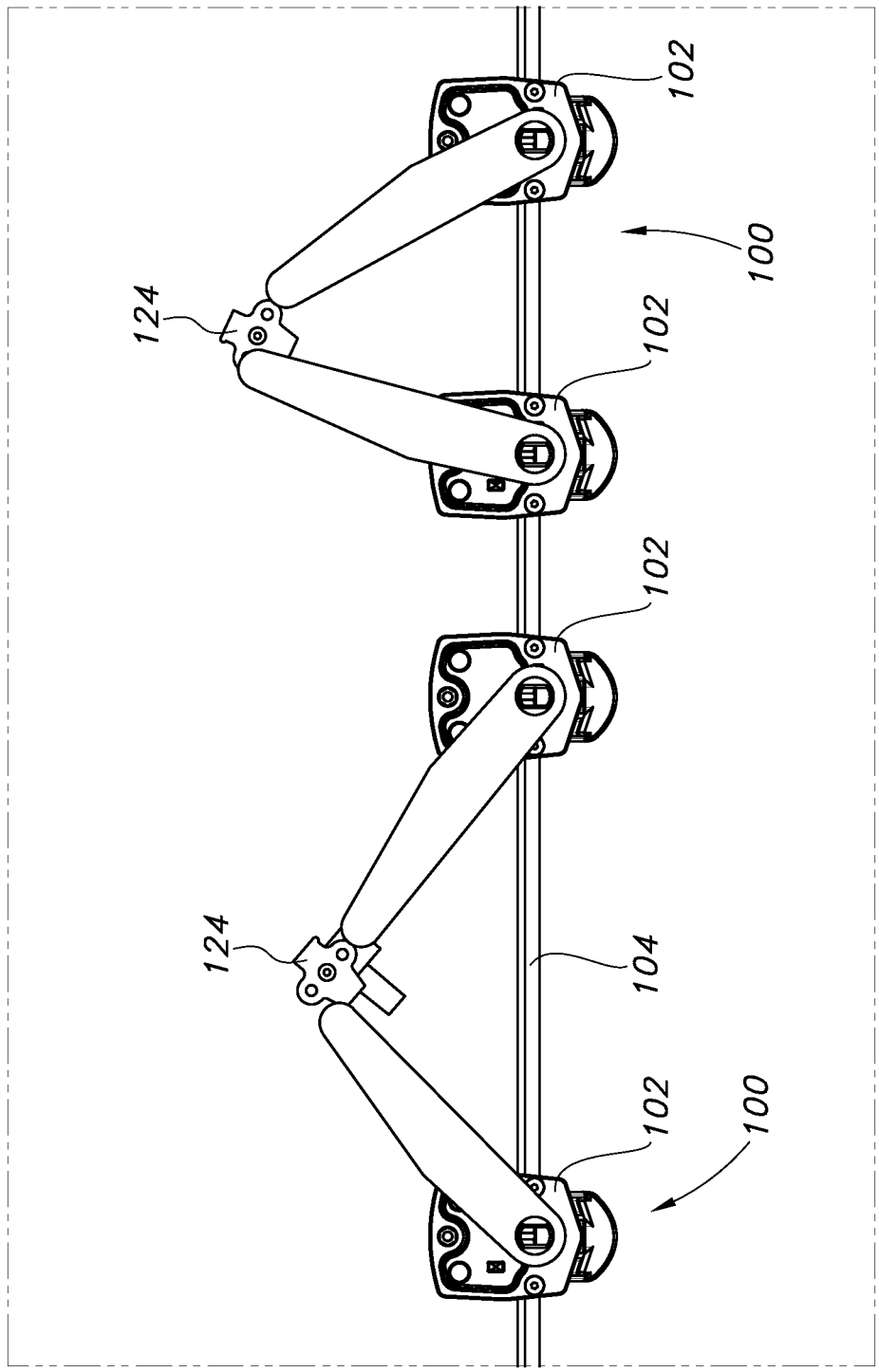

As can be understood with reference to FIG. 42, the above-described embodiment allows for each support 100 to be independently moved along the support rail 104 to a position (such as closer to each other or further apart from each other in the conveying direction) for positioning a guiderail connector, illustrated in the form of a receiver 124, associated with the respective support arms 106, 118 (which receiver 124 may include an extension 124a for engaging the support rail 104 in a collapsed condition of the support 100 to prevent it from bottoming out). In this manner, the relative positioning of the guiderail (not shown) may be independently and selectively adjusted by a user, and using a manual approach that avoids the need for power, motors, etc. Yet, the low-profile nature of the supports 100 is retained, which allows for a conveyor system to be provided which lacks the outwardly directed rods or like structures that can create various problems, as noted above.

Turning to FIGS. 43-50, one or more mounts 200 may be provided for mounting an adjustable guiderail 212 from an associated conveyor 202. The mount(s) 200 may each comprise a low-profile bracket 204 adapted to connect to the conveyor 202. The connection may be along an external surface of a guiderail 206 for guiding a conveyor belt 208, possibly along an endless path including a forward or upper and lower or return run.

In the specific example, the bracket 204 is generally T-shaped, but could take other forms (H-shaped, inverted U-shaped, L-shaped), and in any case includes an upper portion 204a extending along the conveying surface, at or above the level of the conveying surface, and lower portion 204b depending therefrom for attachment to the guiderail 212. The lower portion 204b may be angled or sloped to place the horizontal portion outbound of the conveying surface, but it otherwise does not project outwardly from the conveyor 202 any significant distance (less than a few (<3) inches at most), and thus maintains the desired low profile. The vertical portion 204b may include elongated slots 204c for receiving one or more fasteners F for connecting the mount 200 to the conveyor 202, and thus allow for relative height adjustments to be made to the mount 200.

The upper portion 204a of the bracket 204 thus forms a support rail for supporting one or more of the adjusters or movable guiderail supports 10, 100 described above. As can be appreciated, the support rail formed by the upper portion 204a need extend only a sufficient distance in the conveying direction D to allow for the adjusters or supports 10, 100 to fully extend and retract the guiderail the desired distance into the conveying path, and thus need not extend the full distance of the conveyor 202. A resulting reduction in the use of materials as comparted to a full length support rail extending along the entire conveyor 202 saves costs, and also reduces weight and complexity.

Figure 43:
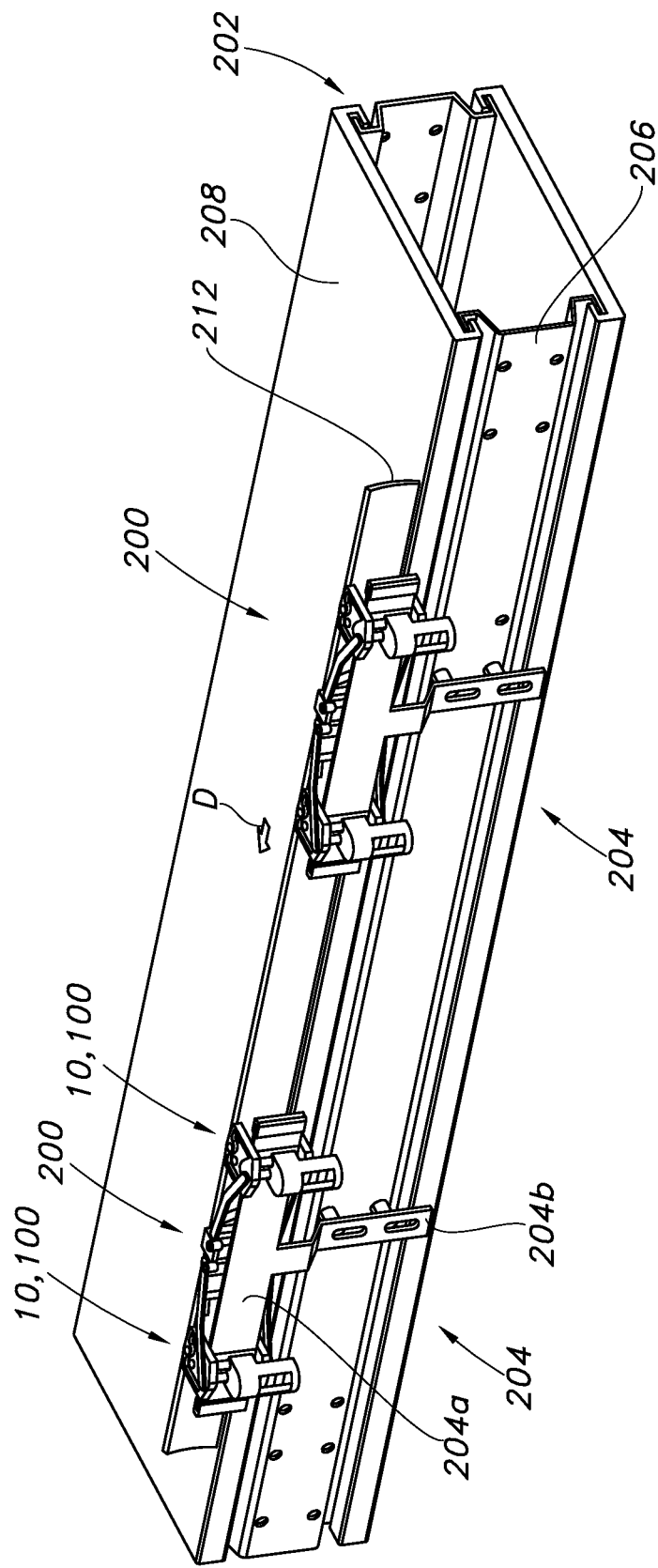
Figure 44:
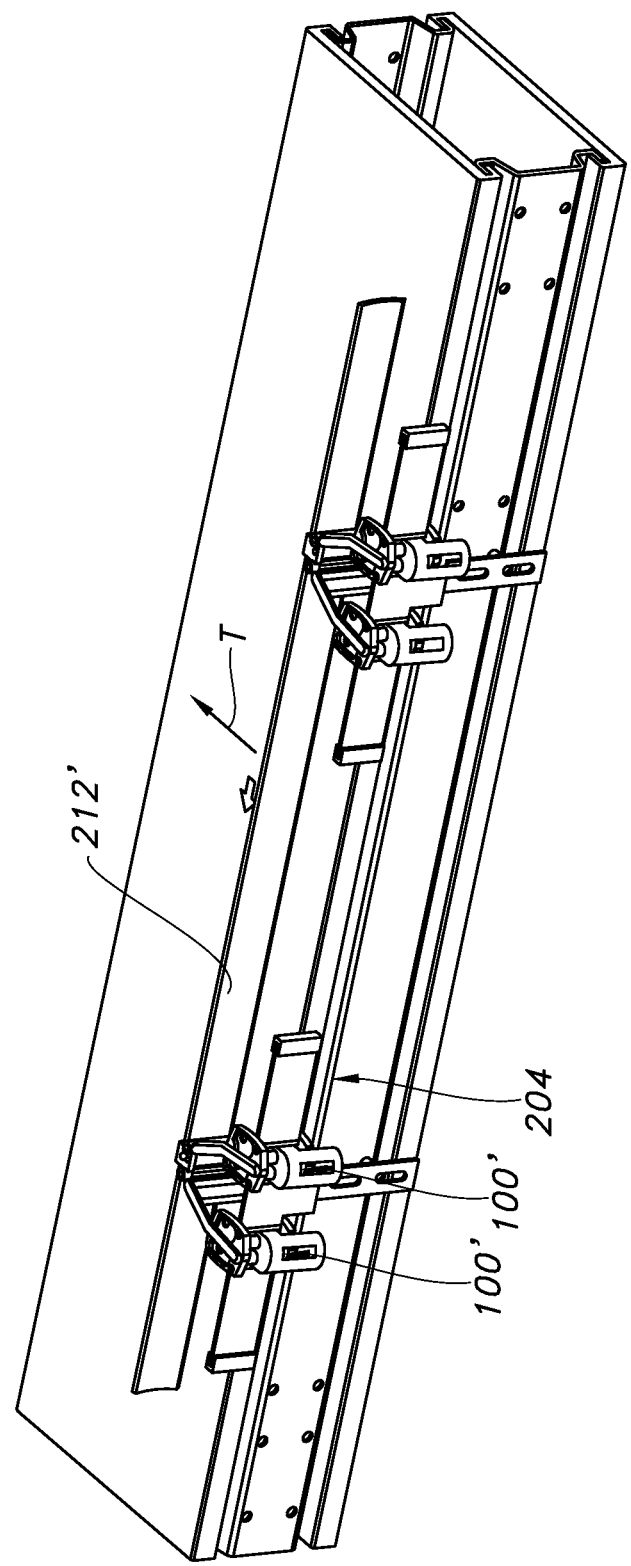
Figure 47:
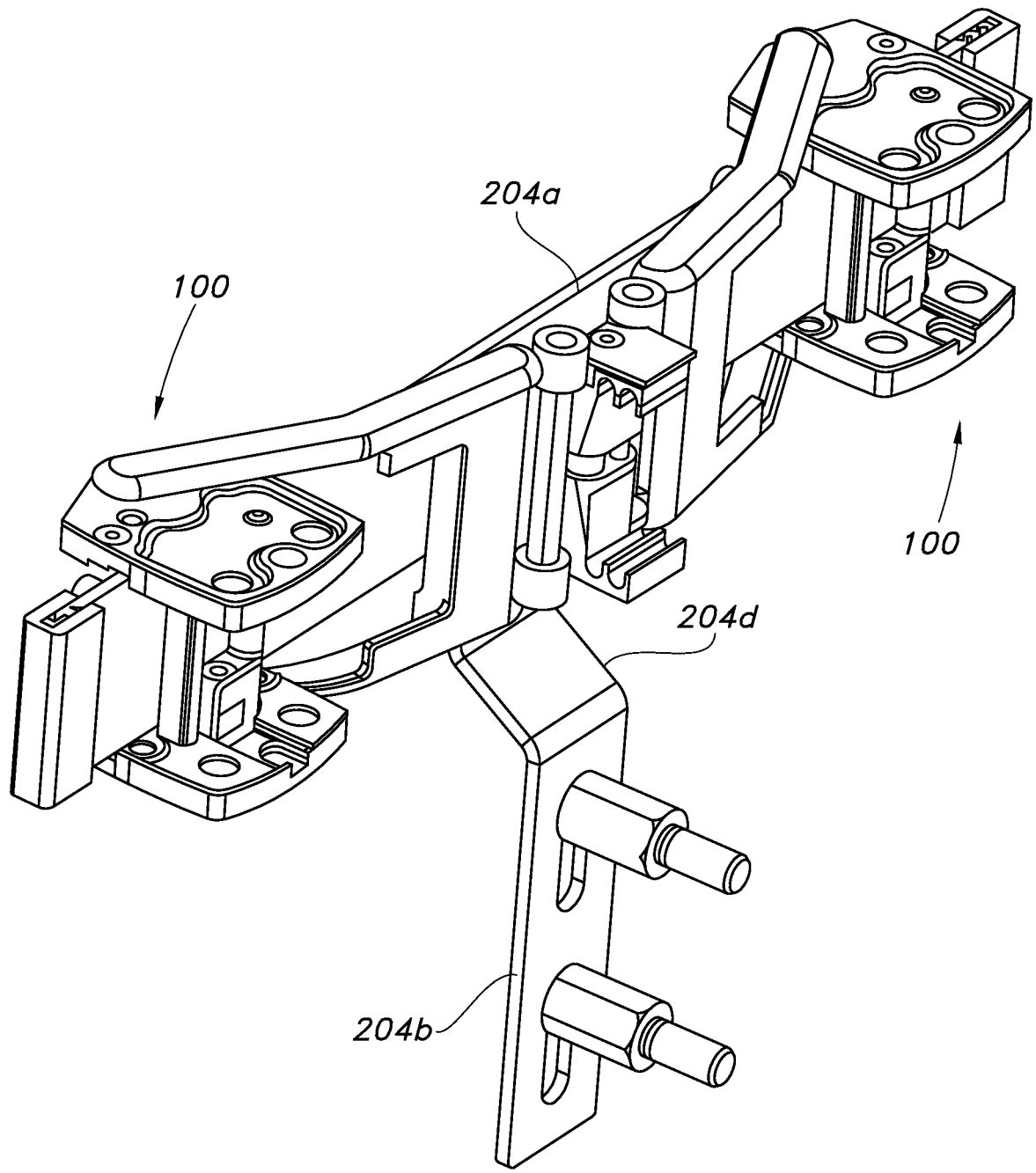
Figure 48:
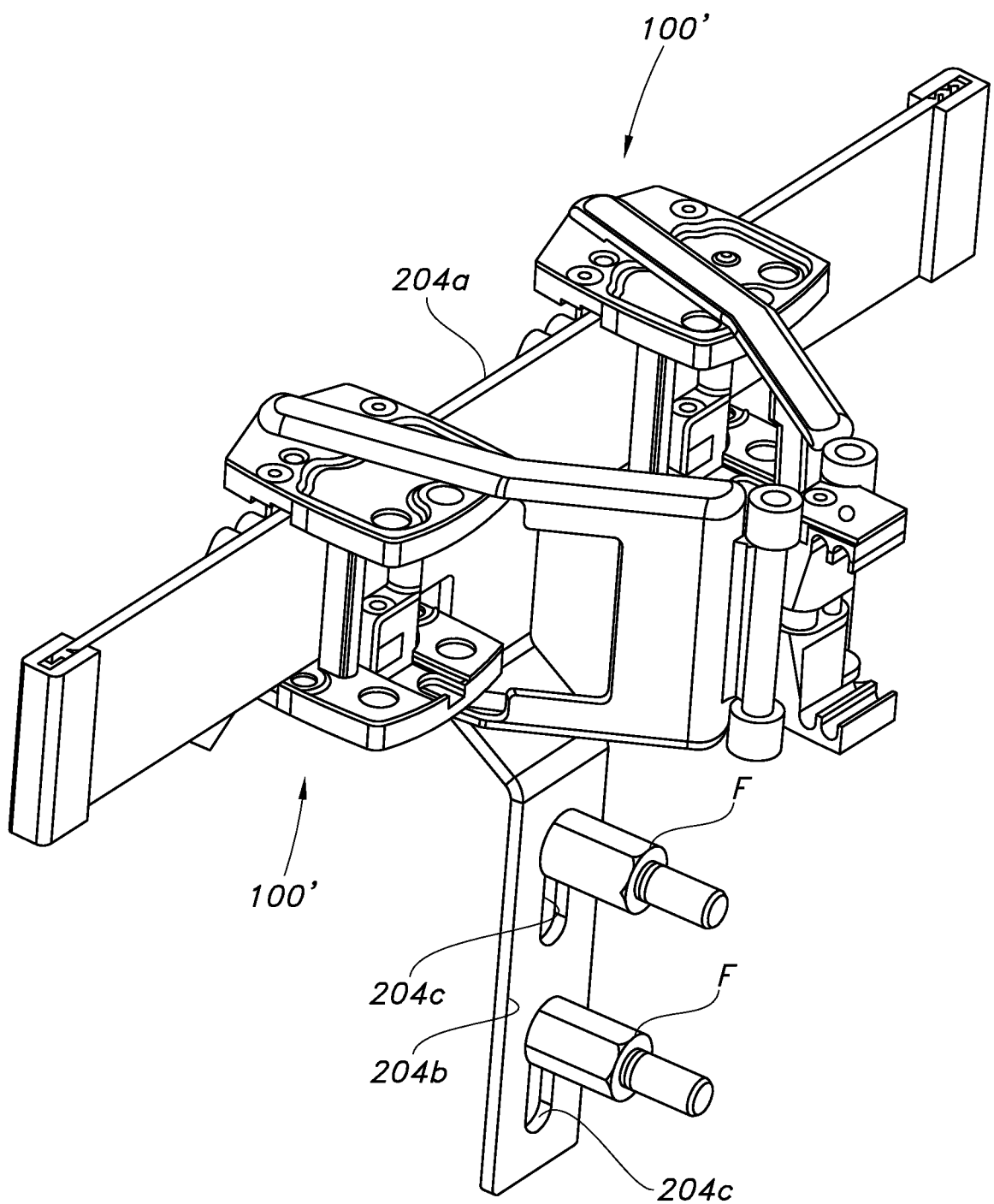
Figure 49:
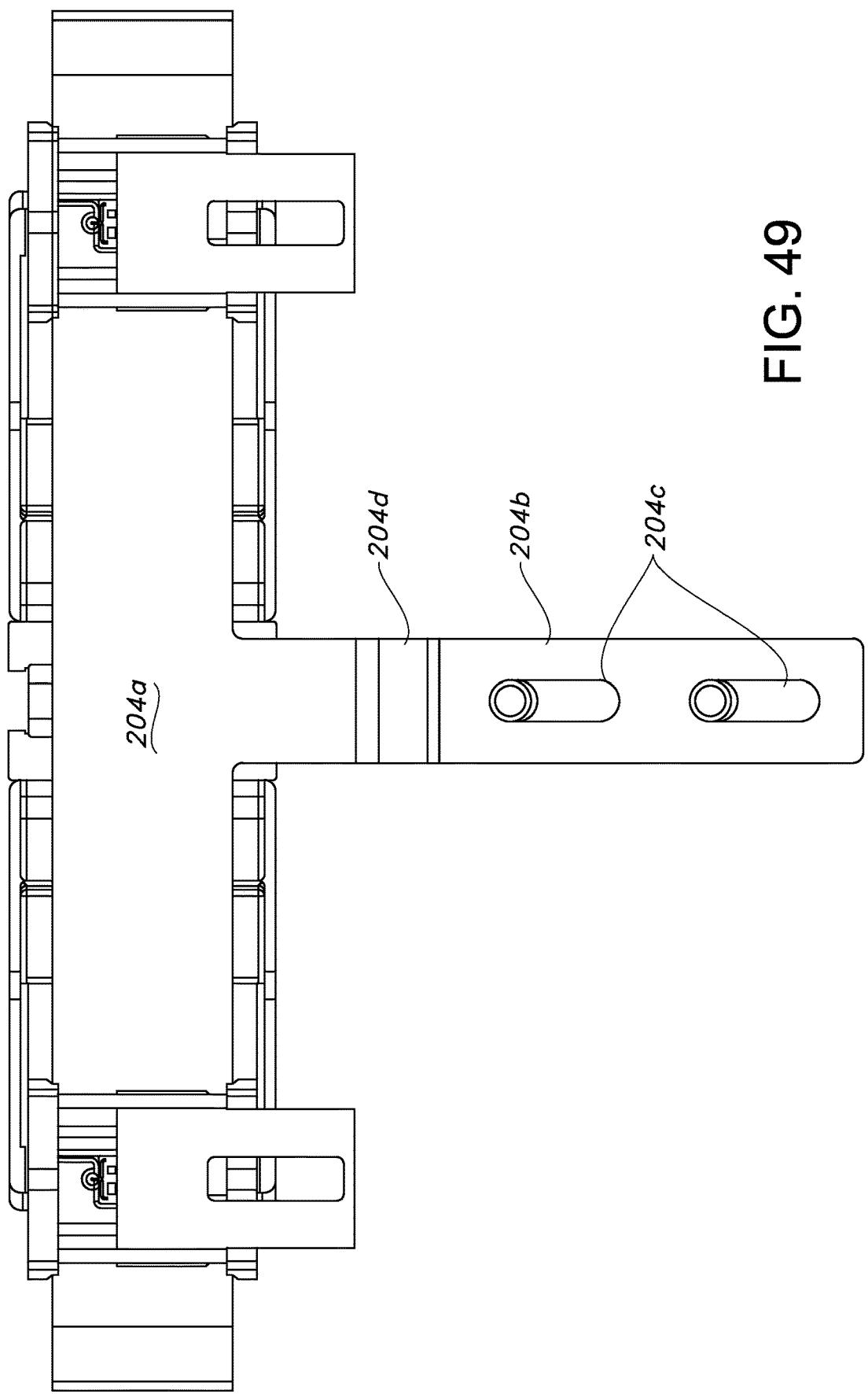
Figure 50:
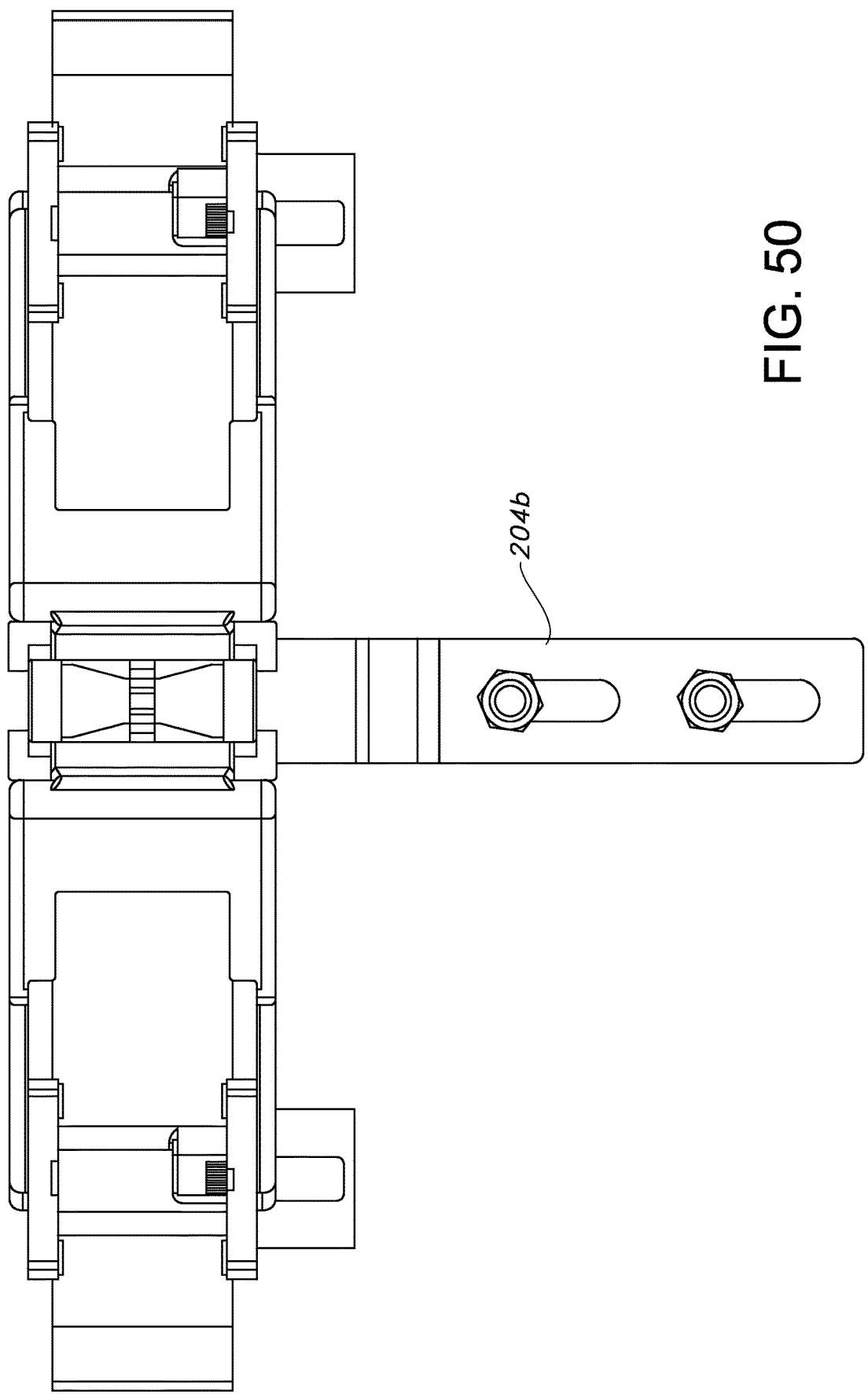

The upper portion 204a and lower portion 204b may also extend in different vertical planes, as shown in FIG. 47. This may be achieved by providing a bent portion 204d of the lower vertical portion 204b. In one version, as shown in FIG. 47, the bent portion 204d is such that the upper portion 204a, and hence the associated support(s), are arranged closer to the conveyor 202 as a result of this arrangement. In another version, as shown in FIG. 43, the bent portion 204d is such that the upper portion 204a is farther away from the conveyor 202, and hence the associated support(s) are so-positioned.

In the illustrated embodiment, each bracket 204 supports a pair of the supports 100 of the embodiment of FIGS. 35-42. The bracket 204 may also include one or more stops 210 at the end portion(s) for defining the maximum movement of the adjusters in a direction parallel to the conveying direction D of the belt 208 associated with conveyor 202. As can be appreciated, only one stop may achieve the desired result, since the supports 100 are connected to each other, and thus limiting the movement of one in the conveying direction will necessarily limit the movement of the other.

Figure 45:
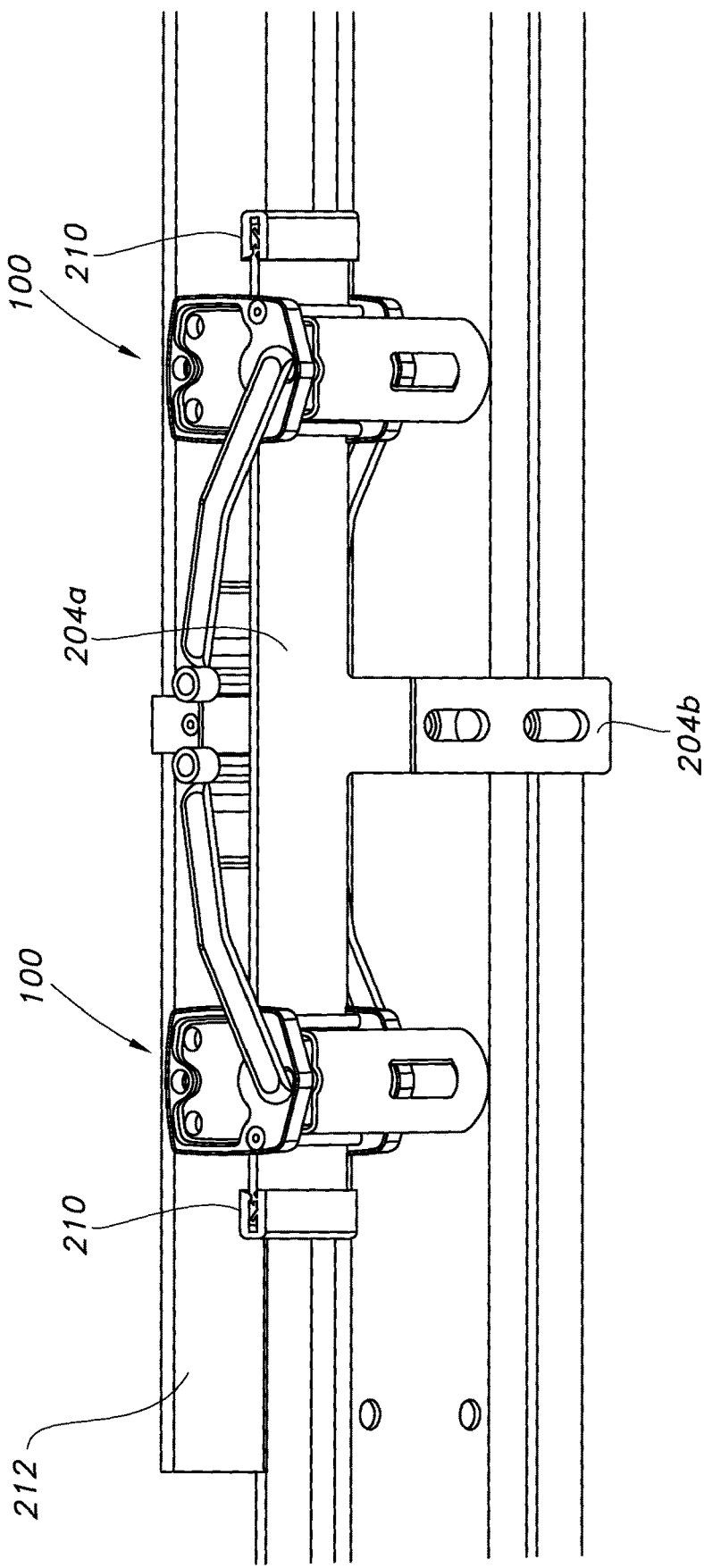
Figure 46:
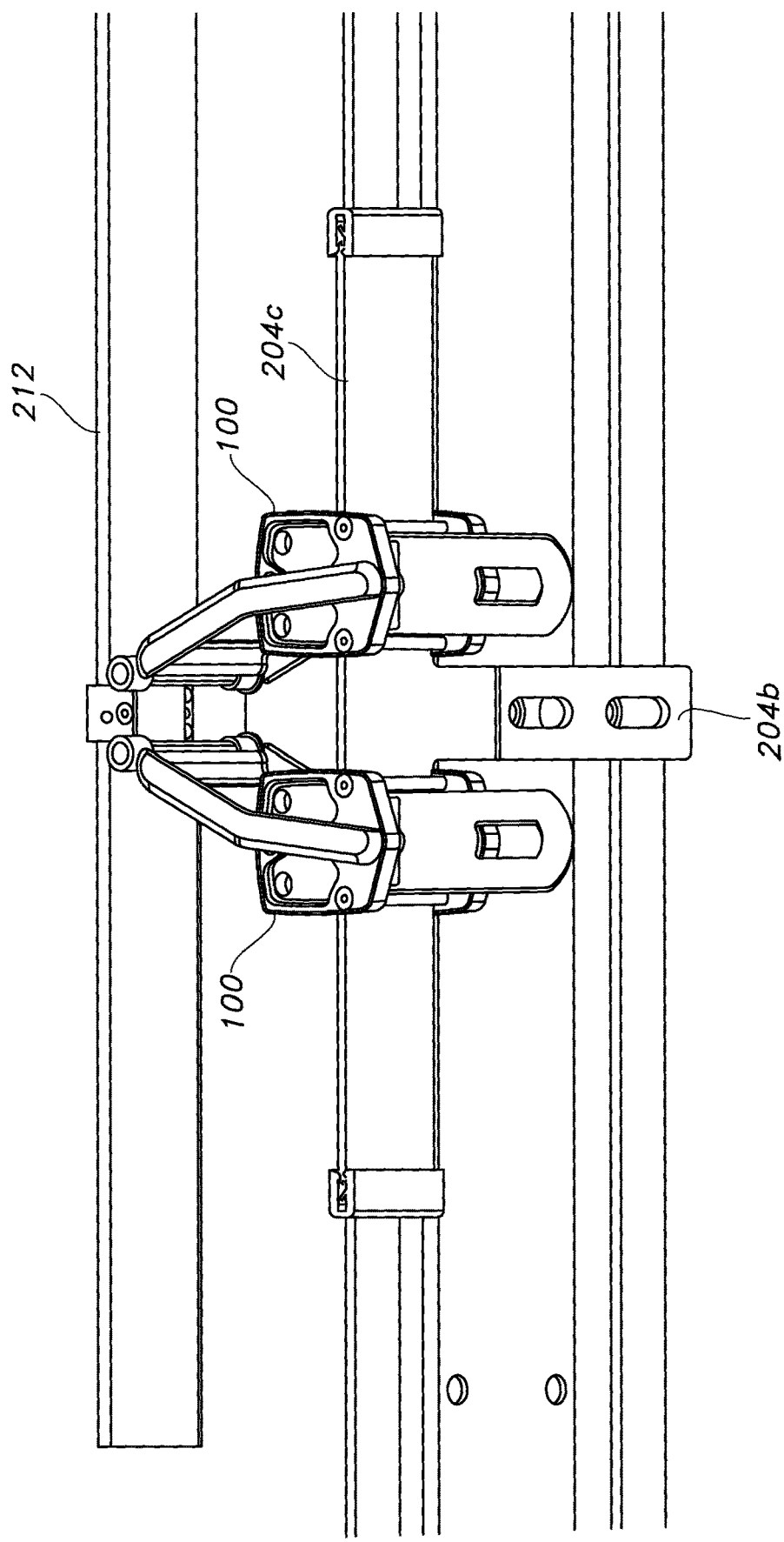

As perhaps best understood from FIGS. 45-46, the supports 100 may be adjusted to move the guiderail 212 toward and away from the bracket 204 (note transverse direction T) for defining the width of the conveying path (see position 212' in FIG. 44, and note inner position of adjusters/supports 100), and then fixed into position on the bracket, such as by using the wedging action described above. Alternatively, the brackets 204 may be used in connection with adjusters 10 that are interconnected (such as by wire) and commonly actuated by an actuator (such as a motor). As can be appreciated, the adjustable guiderail may be provided on both sides of the belt 208, in which case a mount 204 could be provided on each side of the conveyor 202.

From FIGS. 45-46, it can also be understood that a relationship exists between the length of the upper portion 204a of the mount 200 and the extension of the guiderail 212. Specifically, the length of the upper portion 204a need only be such that the supports 100 are spaced farthest apart and located at or near the ends of this portion 204a (that is, adjacent to stops 210) when the guiderail 212 is at the fully inward position closest to the inner face of the upper portion 204a. Likewise, the supports 100 are moved toward and lie adjacent to the second portion 204b when the guiderail 212 is fully advanced towards or into the conveying path of the conveyor, as shown in FIG. 46. It can also be appreciated from FIGS. 45-46 that the lower portion 204b for attaching to the conveyor 202 is at all times located between the interconnected supports 100.

Turning to FIGS. 51-54, one or more mounts 300 may be provided for mounting an adjustable guiderail 312 from a curved conveyor 302. The mount(s) 300 may each comprise a bracket 304 adapted to connect to the conveyor 302, such as along an external surface of a guiderail 306 for guiding a conveyor belt 308, possibly along an endless path including a forward or upper and lower or return run. In the specific example, the bracket 304 is generally T-shaped, and includes an upper portion 305 extending at or above the level of the conveying surface, and lower vertical portion 307 depending therefrom for attachment to the guiderail 312 (which may be angled or sloped to place the horizontal portion outbound of the conveying surface, but otherwise does not project outwardly from the conveyor 302 any significant distance (less than a few (<3) inches at most), and thus maintains the desired low profile). Specifically, the vertical portion 307 may include elongated slots 307a for receiving one or more fasteners F for connecting the mount 300 to the conveyor 302.

In view of the curved nature of the conveyor 302, the upper portion 305 of the bracket 304 includes a matching curve or contour. This may be achieved by providing two bent portions 305a, 305b, which may project outwardly at an angle in opposite directions from a central portion 305c generally tangent to the curve of the conveyor 302. The upper portion 305 of the bracket 304 and, in particular, the bent portions 305a, 305b thus together form a support rail for supporting one or more of the adjusters 10, 100 described above. The support rail formed by the upper portion need extend only a sufficient distance in the conveying direction D (which is curved in view of the curved nature of the conveyor 302) to allow for the adjusters or supports 10, 100 to fully extend and retract the guiderail 312 the desired distance into the conveying path, and thus need not extend the full distance of the conveyor 302. A resulting reduction in the use of materials saves costs, and also reduces weight and complexity.

In the illustrated embodiment, each bracket 304 supports a pair of the supports 100 of the embodiment of FIGS.

35-42. The bracket 304 may also include one or more stops 310 at the end portion(s) for defining the maximum movement of the adjusters in a direction parallel to the conveying direction D of the belt 308 associated with conveyor 302. As can be appreciated, only one stop may achieve the desired result, since the supports 100 are connected to each other, and thus limiting the movement of one in the conveying direction will necessarily limit the movement of the other.

Figure 51:
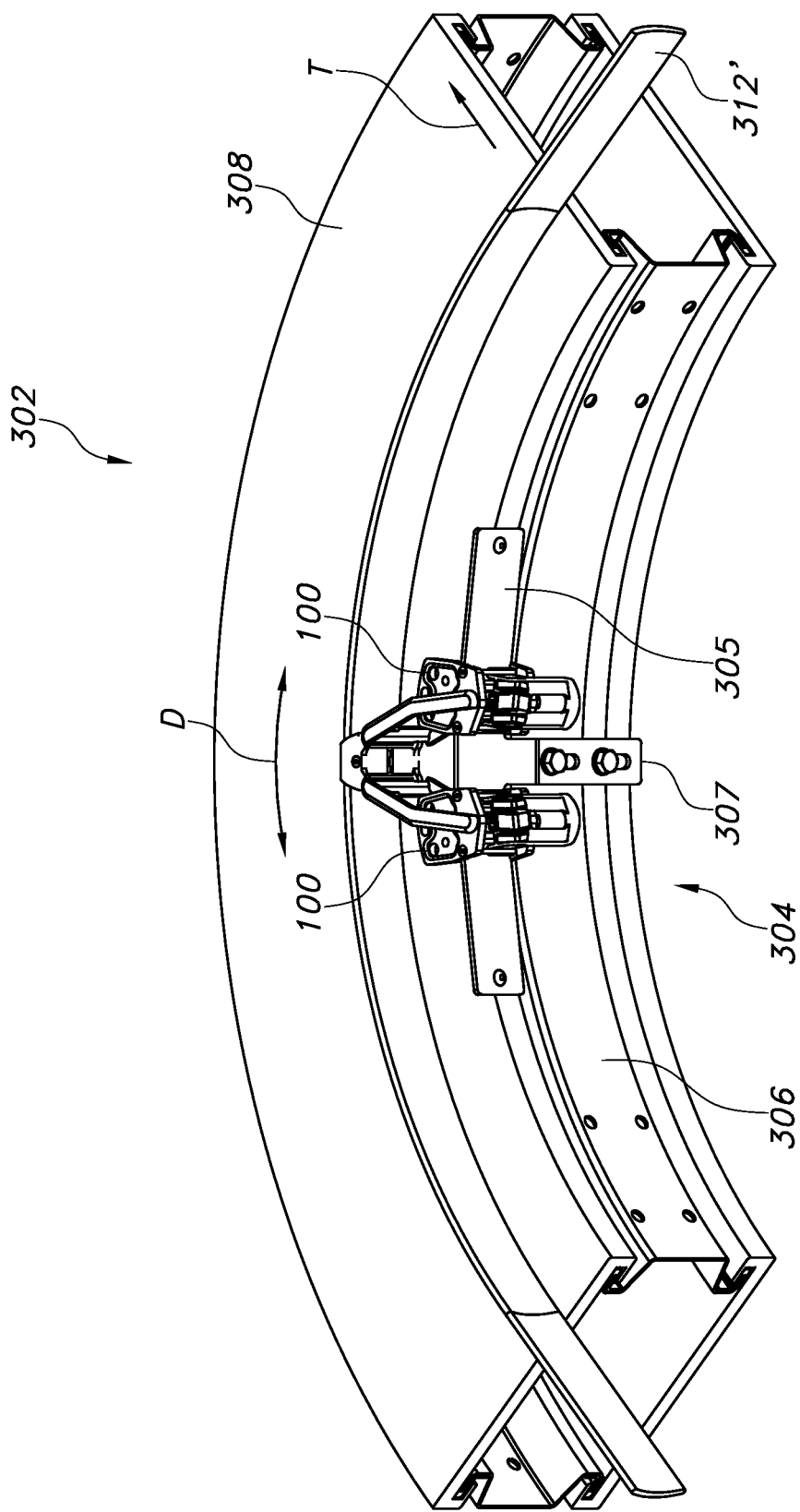
Figure 52:
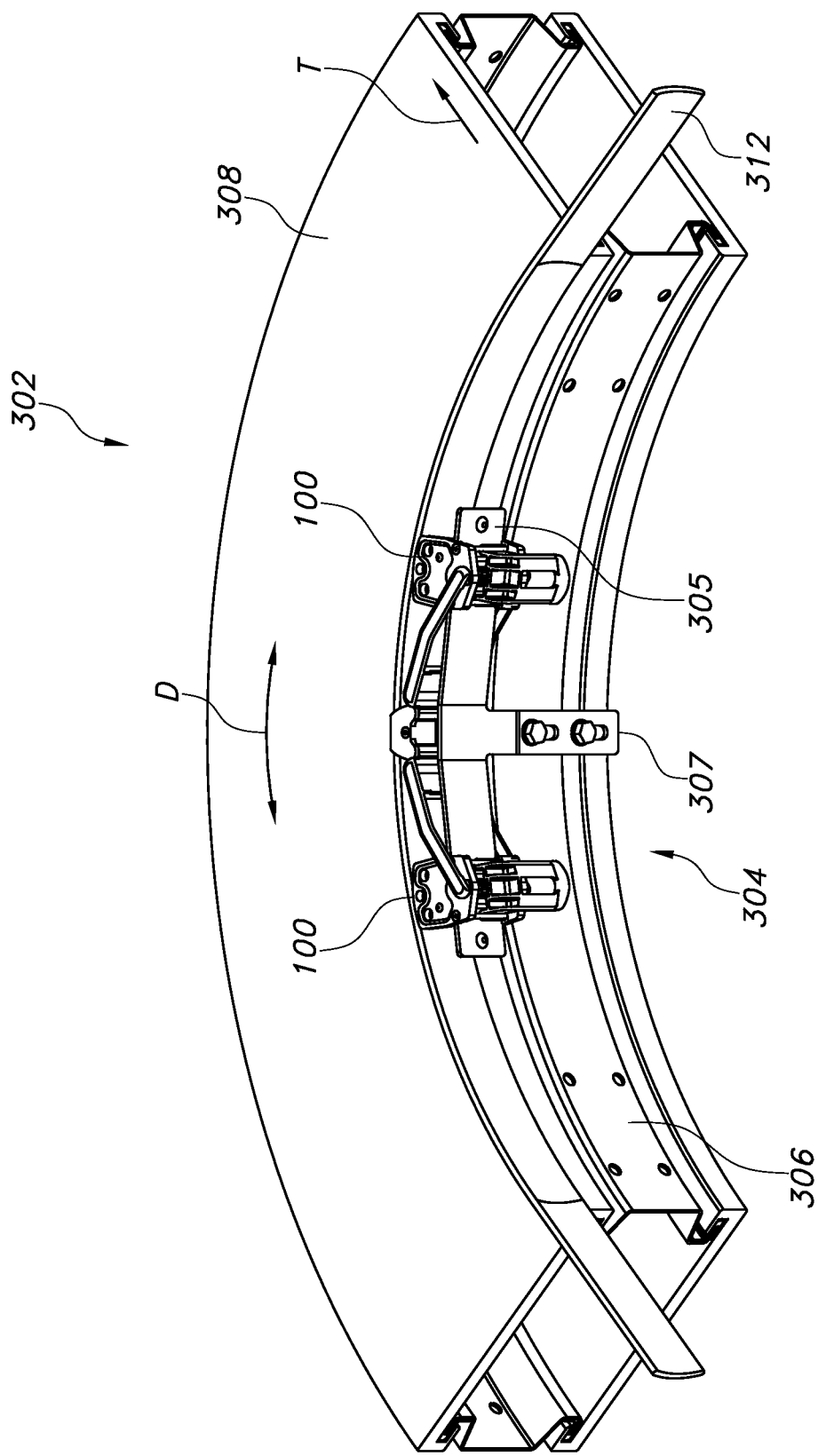

As perhaps best understood from FIGS. 51-52, the supports 100 may be adjusted to move the guiderail 312 toward and away from the bracket 304 (note transverse direction T) for defining the width of the conveying path (see position 312' in FIG. 51, and note inner position of adjusters/supports 100), and then fixed into position on the bracket, such as by using the wedging action described above. Alternatively, the brackets 304 may be used in connection with adjusters 10 that are interconnected (such as by wire) and commonly actuated by an actuator (such as a motor). As can be appreciated, the adjustable guiderail 312 may be provided on both sides of the belt 308, in which case a mount 300 could be provided on each side of the conveyor 302.

Figure 53:
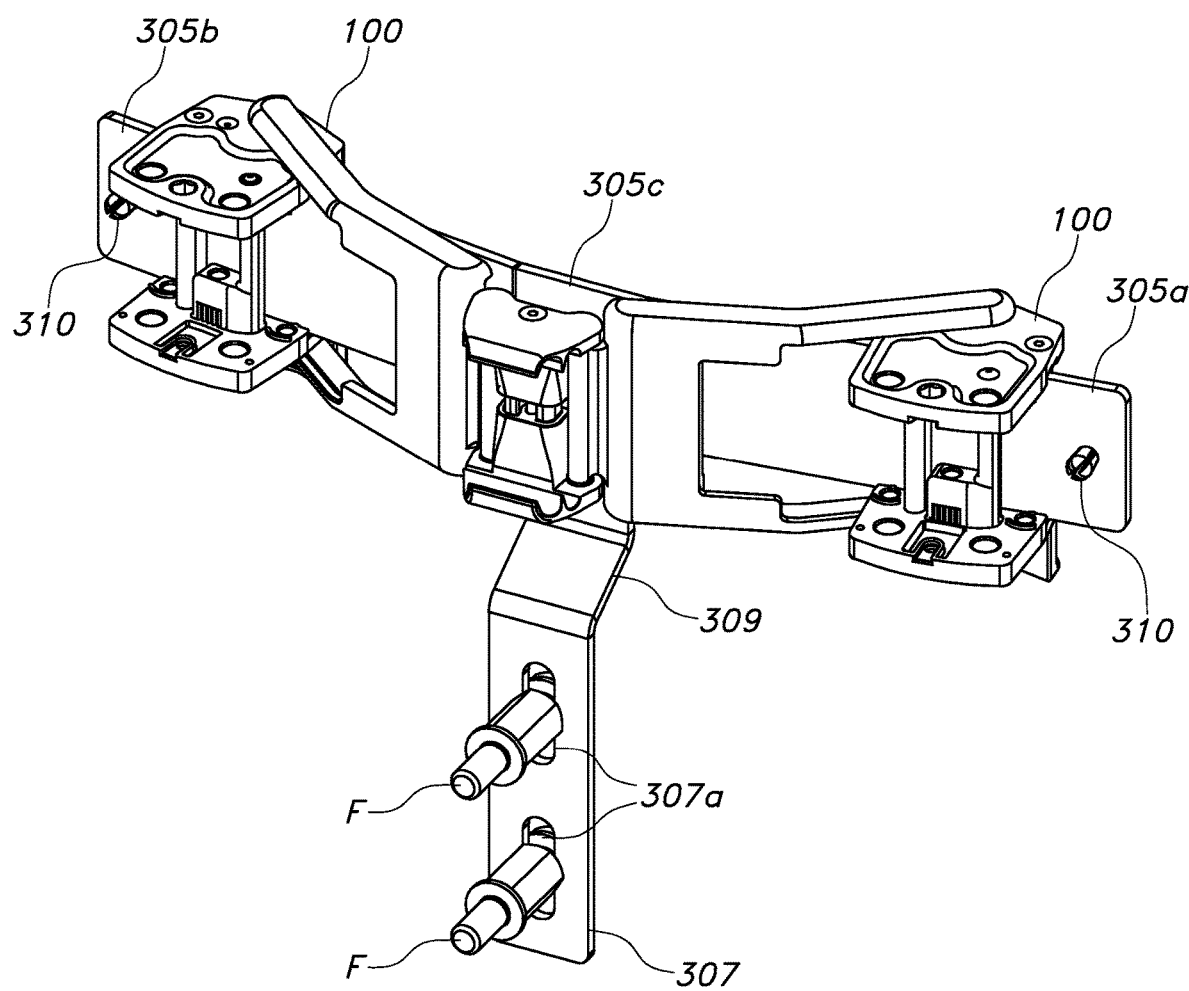
Figure 54:
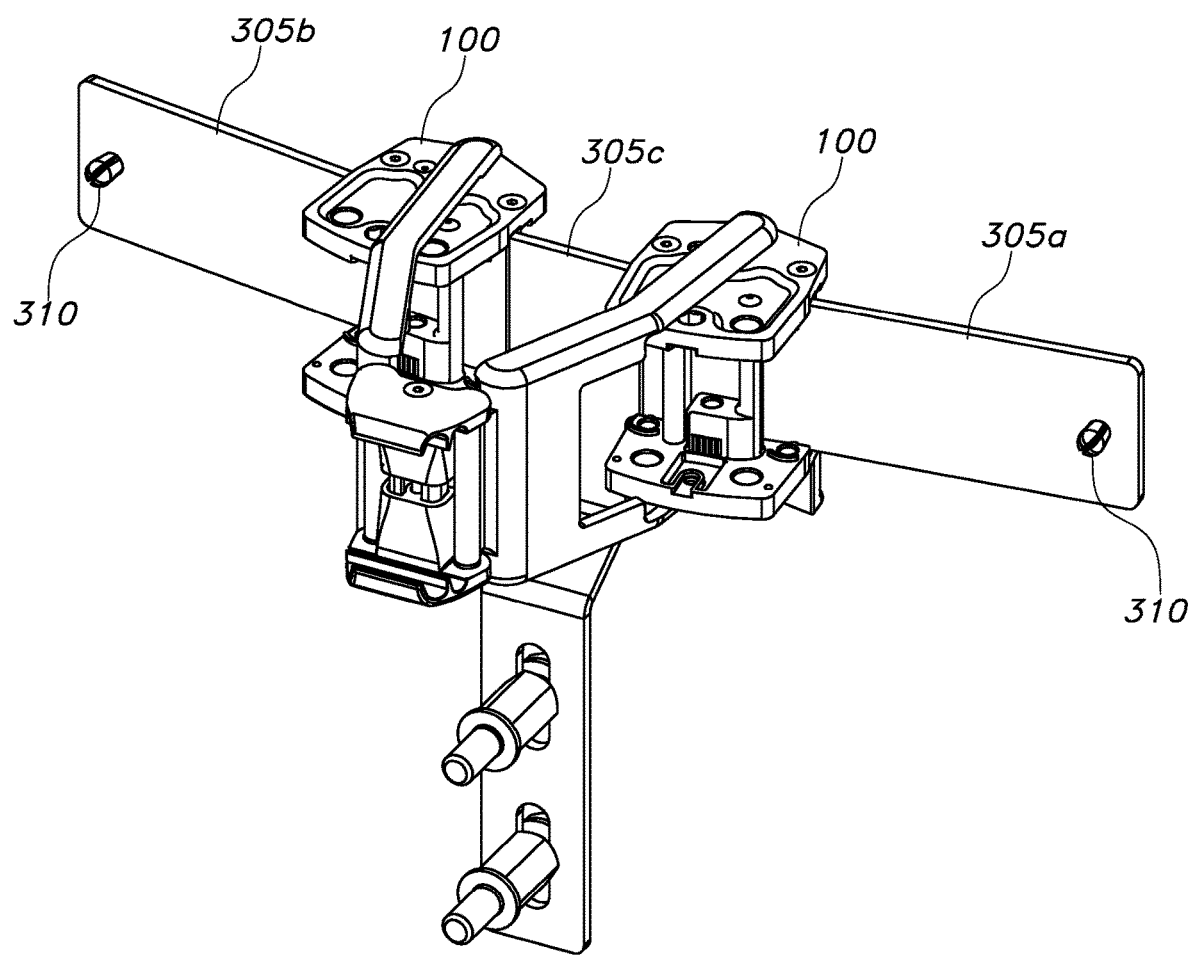

The upper portion 305 and lower portion 307 may also extend in different vertical planes, as shown in FIG. 53. This may be achieved by providing a bent portion 309 of the lower portion 307. In one version, as shown in FIG. 53, the bent portion 209 is such that the upper portion 305, and hence the associated support(s), are arranged closer to the conveyor 302 as a result of this arrangement. In another version (not shown), the bent portion 309 is such that the curved upper portion 305 is farther away from the conveyor 302, and hence the associated support(s) are so-positioned.

The foregoing descriptions of various embodiments of a mount for any adjustable guiderail and related methods provide illustration of the inventive concepts. The descriptions are not intended to be exhaustive or to limit the disclosed invention to the precise form disclosed. Modifications or variations are also possible in light of the above teachings. For instance, the connector forming a part of the actuator may comprise a flexible ribbon, which may be manually actuated by a lever or similar projecting piece by which a mechanism is operated or adjusted. While the shuttles 22, 24 are shown as overlying and sliding upon the support rail 26, the shuttles could also be recessed within cavities in the support rail 26, while still functioning as shuttles. The shuttles may also take different forms, such as for example elongated flexible ribbons connected to the arms 16, 18 and designed to move along the support rail 26 or within a cavity formed therein.

Summarizing, this disclosure may be considered to relate to any or all of the following items:

1. An apparatus for supporting a guiderail for guiding one or more articles conveyed in a conveying direction along an entire conveying path of a conveyor, comprising:
   a mount for mounting to the conveyor, the mount including an upper portion forming a support rail having and a lower portion adapted for connecting to the conveyor; and
   a pair of movable supports mounted to the support rail for supporting and adjusting a position of the guiderail relative to the conveyor in a direction transverse to the conveying direction.

2. The apparatus of item 1, wherein the upper portion has a length in the conveying direction less than a length of the conveyor.

3. The apparatus of item 1 or item 2, wherein the upper portion is generally horizontal and the lower portion is generally vertical.

4. The apparatus of any of items 1-3, wherein conveyor is curved, and the upper portion is bent to correspond to the curvature of the conveyor.

5. The apparatus of any of items 1-4, wherein the upper portion includes a first angled portion for receiving a first movable support of the pair of movable supports and a second angled portion for receiving a second movable support of the second movable support.

6. The apparatus of any of items 1-5, wherein the upper portion of the mount comprises a stop at each end.

7. The apparatus of any of items 1-6, wherein the length of the mount in the conveying direction corresponds to a maximum extension distance of the guiderail in the direction transverse to the conveying direction.

8. The apparatus of any of items 1-7, wherein the upper portion and lower portion are arranged in different vertical planes.

9. The apparatus of any of items 1-8, wherein the upper portion is closer to the conveying path than the lower portion.

10. An apparatus for supporting a guiderail for guiding one or more articles conveyed along a conveyor having a conveying path in a conveying direction, comprising:
    a plurality of mounts for mounting to the conveyor, each mount including a support rail; and
    a pair of movable supports mounted to each support rail of the plurality of mounts for supporting and adjusting a position of the guiderail relative to the conveyor in a direction transverse to the conveying direction.

11. The apparatus of item 10, wherein each mount comprises an upper portion forming the support rail and a vertical portion adapted for connecting to the conveyor.

12. The apparatus of item 10 or item 11, wherein the upper portion of the mount comprises a stop at each end.

13. The apparatus of any of items 10-12, wherein a length of the mount in the conveying direction corresponds to a maximum extension distance of the guiderail in the direction transverse to the conveying direction.

14. An apparatus for supporting a guiderail for guiding one or more articles conveyed in a conveying direction along an entire conveying path of a conveyor, comprising:
    a mount including a support rail having an upper portion with opposed end portions and a lower portion depending from the upper portion and adapted for mounting to the conveyor; and
    a pair of movable supports mounted to the upper portion of the support rail for supporting and adjusting the guiderail relative to the conveyor in a direction transverse to the conveying direction, the pair of movable supports having a maximum spacing at or near the opposed end portions of the upper portion corresponding to a position of the guide rail closest to the support rail and a minimum spacing at or near the lower portion of the support rail.

15. The apparatus of item 14, wherein at least one of the opposed end portions of the upper portion includes a stop for preventing further movement of at least one of the pair of movable supports.

16. An apparatus for mounting to a conveyor including a conveying surface for conveying articles, comprising:
    a guiderail for guiding articles along the conveying surface of the conveyor;
    a plurality of pairs of adjusters for adjusting the guiderail position; and
    a support rail for supporting each pair of adjusters, the support rail including a depending portion for connecting to the conveyor.

17. The apparatus of item 16, wherein the depending portion includes one or more openings for receiving one or more fasteners for fastening the support rail to the conveyor.

18. The apparatus of item 16 or item 17, wherein each support rail comprises a stop for engaging at least one of the adjusters supported thereon.

19. A conveyor including the apparatus of any of items 1-18.

20. A curved conveyor including the apparatus of any of items 1-18.

21. An apparatus for supporting a guiderail for guiding one or more articles conveyed along a conveyor having a conveying path in a conveying direction, comprising:
 a mount for mounting to the conveyor, the mount including a support rail having a first end portion including a first stop; and
 a pair of movable supports mounted to the support rail for supporting and adjusting a position of the guiderail relative to the conveyor in a direction transverse to the conveying direction.

22. The apparatus of item 21, wherein the support rail includes a second end portion including a second stop.

23. The apparatus of item 21 or item 22, wherein the mount comprises a upper portion extending in the conveying direction forming the support rail and a lower transverse portion adapted for connecting to the conveyor.

24. The apparatus of any of items 21-23, wherein the length of the mount in the conveying direction corresponds to a maximum extension distance of the guiderail in the direction transverse to the conveying direction.

25. A conveyor including the apparatus of any of items 21-24.

26. A curved conveyor including the apparatus of any of items 21-24.

27. An apparatus for supporting a guiderail for guiding one or more articles conveyed along a conveyor having a conveying path in a conveying direction, comprising:
 a mount for mounting to the conveyor, the mount including a support rail having a bent portion; and
 a pair of movable supports mounted to the bent portion of the support rail for supporting and adjusting a position of the guiderail relative to the conveyor in a direction transverse to the conveying direction.

28. The apparatus of item 27, wherein the bent portion includes a first angled portion for receiving a first movable support of the pair of movable supports and a second angled portion for receiving a second movable support of the second movable support.

29. The apparatus of item 27 or item 28, wherein the bent portion includes a length in the conveying direction less than a length of the conveyor.

30. The apparatus of any of items 27-29, wherein the bent portion is between an upper portion of the support rail supporting the pair of movable supports and a lower portion of the support rail adapted for connecting to the conveyor.

31. The apparatus of any of items 27-30, wherein the conveyor is curved, and the upper portion of the support rail is bent to correspond to the curved conveyor.

32. An apparatus for guiding one or more articles conveyed along a curved conveyor having a conveying path in a conveying direction, comprising:
 a mount for mounting to the conveyor, the mount including a support rail having a first portion having a bend in the conveying direction corresponding to the curved conveyor and a second portion adapted to connect to the curved conveyor; and
 a guiderail supported by the support rail.

33. The apparatus of item 32, wherein the mount further includes a third portion having a bend for connecting the first portion and the second portion.

34. The apparatus of item 32 or item 33, further including a pair of movable supports mounted to the first portion of the support rail for supporting and adjusting a position of the guiderail relative to the conveyor in a direction transverse to the conveying direction.

35. An apparatus for supporting a guiderail for guiding one or more articles conveyed in a conveying direction along an entire conveying path of a conveyor, comprising:
 a mount for mounting to the conveyor, the mount including an upper portion comprising a support rail and a lower portion for attaching to the conveyor; and
 a pair of interconnected supports repositionable along the support rail for supporting and adjusting a position of the guiderail relative to the conveyor in a direction transverse to the conveying direction, the lower portion of the mount being located at least partially between the pair of interconnected supports.

36. A method of adjusting a position of a guiderail for guiding one or more articles conveyed along a conveyor having a conveying path in a conveying direction, comprising:
 mounting a support rail including a pair of movable supports for supporting the guiderail to the conveyor by a mount extending transverse to the conveying direction.

37. The method of item 36, further including the step of fixing the position of the at least one of the movable supports on the support rail.

38. The method of item 36 or item 37, further comprising manually moving a first movable support along a first support rail mounted to the conveyor, and further including the step of manually moving a second movable support along a second support rail mounted to the conveyor, each of the movable supports supporting the guiderail.

Any elements described herein as singular can be pluralized (i.e., anything described as "one" can be more than one), and plural elements can be used individually. Characteristics disclosed of a single variation of an element, the device, the methods, or combinations thereof can be used or apply for other variations, for example, dimensions, shapes, materials, or combinations thereof. The terms "generally," "substantially," "about," or "approximately" are meant to mean as close to the corresponding condition as reasonably possible, and typically not varying from it by more than 10%, unless circumstances indicate otherwise. Any species element of a genus element can have the characteristics or elements of any other species element of that genus. The term "comprising" is not meant to be limiting. The above-described configurations, elements or complete assemblies and methods and their elements for carrying out the invention, and variations of aspects of the invention can be combined and modified with each other in any combination.

The invention claimed is:

1. An apparatus for supporting a guiderail for guiding one or more articles conveyed in a conveying direction along a conveying path of a conveyor, comprising:
 a mount for mounting to the conveyor, the mount including an upper portion forming a support rail having and a lower portion adapted for connecting to the conveyor; and
 a pair of movable supports mounted to the support rail for supporting and adjusting a position of the guiderail relative to the conveyor in a direction transverse to the conveying direction, wherein the moveable supports are adapted to slide along a length of the support rail.

2. The apparatus of claim 1, wherein the upper portion has a length in the conveying direction less than a length of the conveyor.

3. The apparatus of claim 1, wherein the upper portion is generally horizontal and the lower portion is generally vertical.

4. The apparatus of claim 1, wherein the upper portion is bent to correspond to a curvature of the conveyor.

5. The apparatus of claim 4, wherein the upper portion includes a first angled portion for receiving a first movable support of the pair of movable supports and a second angled portion for receiving a second movable support of the second movable support.

6. The apparatus of claim 1, wherein the upper portion of the mount comprises a stop at each end.

7. The apparatus of claim 1, wherein the length of the mount in the conveying direction corresponds to a maximum extension distance of the guiderail in the direction transverse to the conveying direction.

8. The apparatus of claim 1, wherein the upper portion and lower portion are arranged in different vertical planes.

9. The apparatus of claim 1, wherein the upper portion is closer to the conveying path than the lower portion.

10. An apparatus for supporting a guiderail for guiding one or more articles conveyed along a conveyor having a conveying path in a conveying direction, comprising:
    a plurality of mounts according to claim 1 for mounting to the conveyor, each mount including a support rail; and
    a plurality of pairs of movable supports mounted to each support rail of the plurality of mounts for supporting and adjusting a position of the guiderail relative to the conveyor in a direction transverse to the conveying direction.

11. An apparatus for guiding one or more articles conveyed along a curved conveyor having a conveying path in a conveying direction, comprising:
    a mount for mounting to the conveyor, the mount including a support rail having a first portion having a bend in the conveying direction corresponding to the curved conveyor and a second portion adapted to connect to the curved conveyor;
    a guiderail supported by the support rail; and
    a pair of movable supports mounted to the first portion of the support rail for supporting and adjusting a position of the guiderail relative to the conveyor in a direction transverse to the conveying direction.

12. The apparatus of claim 11, wherein the mount further includes a third portion having a bend for connecting the first portion and the second portion.

13. A method of adjusting a position of a guiderail for guiding one or more articles conveyed along a conveyor having a conveying path in a conveying direction, comprising:
    mounting a support rail including a pair of movable supports for supporting the guiderail to the conveyor by a mount extending transverse to the conveying direction; wherein the movable supports are adapted to slide along the support rail.

14. The method of claim 13, further including the step of fixing the position of the at least one of the movable supports on the support rail.

15. The method of claim 13, further comprising manually moving a first movable support of the pair of movable supports along a first support rail mounted to the conveyor, and further including the step of manually moving a second movable support of a second pair of movable supports along a second support rail mounted to the conveyor.

\* \* \* \* \*